United States Patent
Wang et al.

(10) Patent No.: US 11,515,988 B2
(45) Date of Patent: Nov. 29, 2022

(54) METHOD AND DEVICE FOR DETERMINING INITIAL POSITIONS OF DOWNLINK DATA CHANNEL

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN); Xueming Pan, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 57 days.

(21) Appl. No.: 16/476,120

(22) PCT Filed: Feb. 28, 2018

(86) PCT No.: PCT/CN2018/077594
§ 371 (c)(1),
(2) Date: Jul. 5, 2019

(87) PCT Pub. No.: WO2018/127250
PCT Pub. Date: Jul. 12, 2018

(65) Prior Publication Data
US 2019/0356459 A1 Nov. 21, 2019

(30) Foreign Application Priority Data
Jan. 6, 2017 (CN) .......................... 201710011429.4

(51) Int. Cl.
*H04L 5/00* (2006.01)
*H04W 76/27* (2018.01)
(Continued)

(52) U.S. Cl.
CPC .......... *H04L 5/0082* (2013.01); *H04L 5/0007* (2013.01); *H04W 72/005* (2013.01);
(Continued)

(58) Field of Classification Search
CPC ... H04L 5/0082; H04L 5/0007; H04L 5/0053; H04L 5/0094; H04L 5/0078;
(Continued)

(56) References Cited

U.S. PATENT DOCUMENTS

RE47,764 E * 12/2019 Lee .................... H04L 5/0094
2010/0120442 A1 * 5/2010 Zhuang ................ H04L 5/0053
455/450
(Continued)

FOREIGN PATENT DOCUMENTS

CN 103875202 A 6/2014
CN 103959730 A 7/2014
(Continued)

OTHER PUBLICATIONS

3GPP TSG RAN WG1 Meeting #68bis, 'Downlink Control Signalling and Transmission Modes for CoMP', R1-121244, Jeju, Korea, Mar. 26-30, 2012.

*Primary Examiner* — Jeffrey M Rutkowski
*Assistant Examiner* — Sudesh M Patidar
(74) *Attorney, Agent, or Firm* — Kilpatrick Townsend & Stockton, LLP

(57) ABSTRACT

A method and device for determining the initial positions of a downlink data channel are provided. The method includes: a base station transmits to a terminal a generated indication signaling, and the terminal determines, on the basis of the received indication signaling, the time domain initial positions of the downlink data channel in L downlink TTIs. With the method, when the downlink control channel only appears in a part of the positions in a frequency domain or
(Continued)

does not appear at all, and when the downlink control channel does not occupy the complete downlink control area in the time domain or the resources occupied by the downlink control channel in the time domain are variable, the base station can still accurately notify the terminal the time domain initial positions of the downlink data channel.

8 Claims, 20 Drawing Sheets

(52) U.S. Cl.
CPC ..... *H04W 72/042* (2013.01); *H04W 72/0446* (2013.01); *H04W 76/27* (2018.02)

(58) Field of Classification Search
CPC ... H04L 5/0055; H04L 5/0005; H04L 5/0091; H04L 5/003; H04W 72/005; H04W 72/042; H04W 72/0446; H04W 72/0406; H04W 72/1263; H04W 72/1278; H04W 72/1289; H04W 72/044; H04W 72/0453; H04W 72/0413; H04W 72/12; H04W 76/27

See application file for complete search history.

(56) References Cited

U.S. PATENT DOCUMENTS

| | | | | |
|---|---|---|---|---|
| 2013/0039284 A1* | 2/2013 | Marinier | ................. | H04L 5/001 370/329 |
| 2013/0044673 A1* | 2/2013 | Bi | ........................ | H04B 7/2609 370/315 |
| 2013/0194931 A1* | 8/2013 | Lee | ........................ | H04W 72/04 370/241 |
| 2013/0250864 A1* | 9/2013 | Zhang | ................... | H04L 5/0035 370/329 |
| 2014/0056244 A1* | 2/2014 | Frenne | .............. | H04W 72/1289 370/329 |
| 2015/0139136 A1* | 5/2015 | Zhang | ................... | H04L 5/0053 370/329 |
| 2015/0256403 A1* | 9/2015 | Li | ........................ | H04L 27/2602 370/235 |
| 2016/0087774 A1* | 3/2016 | Guo | ........................ | H04L 5/0051 370/329 |
| 2016/0182209 A1* | 6/2016 | Li | ......................... | H04L 5/1469 370/329 |
| 2018/0049203 A1* | 2/2018 | Xue | ...................... | H04L 5/0035 |
| 2018/0109353 A1* | 4/2018 | Kwak | ..................... | H04L 27/26 |
| 2018/0359749 A1* | 12/2018 | Liu | ........................ | H04W 72/02 |
| 2019/0320397 A1* | 10/2019 | Tang | ................... | H04W 56/001 |

FOREIGN PATENT DOCUMENTS

| | | |
|---|---|---|
| CN | 104348579 A | 2/2015 |
| CN | 104871469 A | 8/2015 |
| CN | 105099634 A | 11/2015 |
| JP | 2012235340 A | 11/2012 |
| WO | 2014/069601 A1 | 5/2014 |

* cited by examiner

METHOD AND DEVICE FOR DETERMINING INITIAL POSITIONS OF DOWNLINK DATA CHANNEL

This application is a US National Stage of International Application No. PCT/CN2018/077594, filed Feb. 28, 2018, which claims priority to Chinese Patent Application No. 201710011429.4, filed with the Chinese Patent Office on Jan. 6, 2017, and entitled "Method and device for determining start position of downlink data channel", both of which are hereby incorporated by reference in their entireties.

FIELD

The present invention relates to the field of communications, and particularly to a method and device for determining start position of downlink data channel.

BACKGROUND

With the rapid development of the mobile communication technologies, the mobile Internet is toppling over the legacy mobile communication service mode, and providing its users with an unprecedented use experience. The mobile Internet will promote further upgrading of information interaction in our society, and provide the users with augmented reality, virtual reality, an ultra-high-definition video, a mobile cloud, and other more colorful service experiences. The development of the mobile Internet will bring growing of an amount of mobile traffic by a factor of more than a thousand, and promote new revolution of the mobile communication technologies and industries. Furthermore as the Internet of Things is advancing, a service area of mobile communication is being extended from legacy human-to-human communication to intelligent human-to-object and object-to-object intercommunication so that the mobile communication technologies provide services in more industries and field, and for example, mobile medical treatment, the Internet of Vehicles, intelligent home, industry control, environmental supervision, and other Internet-of-Things industries will promote explosive growing of Internet-of-Things applications, and a huge number of Internet-of-Things devices will access the network so that all the things will intercommunicate with each other. The huge number of Internet-of-Things devices connected with each other, and a diversity of Internet-of-Things services will also pose a new technical challenge to the mobile communication technologies.

As a diversity of devices and services are emerging, higher performance is required of the mobile communication technologies, e.g., a higher peak rate, a higher user experience rate, a shorter delay, higher reliability, high spectrum efficiency, high energy consumption efficiency, etc., and they are required to support more accessing users, and to provide more types of services, so it is necessary to improve the existing mobile communication technologies by configuring uplink and downlink resources flexibly.

In the existing Long Term Evolution (LTE) system, such a frame structure is applicable to both uplink and downlink transmission that a radio frame with the length of 10 ms includes ten sub-frames with the length of 1 ms, and a downlink control region in a sub-frame occupies the same time-frequency resources for each UE. For example, for a Physical Downlink Control Channel (PDCCH), a UE shall receive its own Downlink Control Information (DCI) in a control region indicated by a Physical Control Format Indicator Channel (PCFICH); and for an Enhanced Physical Downlink Control Channel (EPDCCH), the UE shall receive its own DCI in a Physical Resource Block (PRB) configured in Radio Resource Control (RRC) signaling, that is, there are specific time domain start positions, of downlink data channels of the respective UEs, in a transmission time interval in the LTE system.

However in the existing LTE system, resources of a downlink control region and a data region in a TTI are independent of each other in that downlink control channels are mapped so that they occupy all the time positions in the downlink control region, and there are specific start positions of downlink data channels, that is, the downlink data channels are transmitted in the TTI starting with the first Orthogonal Frequency Division Multiplexing (OFDM) symbol other than the control region, or the first OFDM symbol at a different frequency position, so when the downlink control channels are only located at a part of frequency positions, or not located in the frequency domain, and they do not occupy the entire downlink control region in the time domain, or occupy varying resources in the time domain, the start positions of the downlink data channels may not be specific.

In summary, in order to adapt to the development trend of the mobile technologies, it is necessary to design a method for determining a start position of a downlink data channel in the time domain when the resource occupied by the downlink control channel is variable in the time domain.

SUMMARY

Embodiments of the invention provide a method and device for determining a start position of a downlink data channel, so as to address the problem in the prior art that a start position of a downlink data channel in the time domain may not be specific when the resource occupied by the downlink control channel is variable in the time domain in the $5^{th}$-Generation (5G) mobile communication system.

In a first aspect, there is provided a for determining a start position of a downlink data channel, applicable to $5^{th}$-Generation (5G) mobile communication system, the method including:

generating, by a base station, indication signaling, wherein the indication signaling indicates a time domain start position of a downlink data channel in L number of downlink Transmission Time Intervals (TTIs), and L is an integer more than or equal to 1; and transmitting, by the base station, the indication signaling to a UE.

Optionally the indication signaling indicates that a time domain start position of a downlink data channel in L number of downlink TTIs is the X-th time unit in L number of downlink TTIs in a specified bandwidth, wherein the specified bandwidth is a part or all of an operating bandwidth of the base station, X is an integer more than or equal to 1, a time unit includes Y number of Orthogonal Frequency Division Multiplexing (OFDM) symbols, and Y is an integer more than or equal to 1.

Optionally the indication signaling is Downlink Control Signaling (DCI) carrying an information field of N1 bits, wherein N1 is an integer more than or equal to 1, and the information field of N1 bits indicates a time domain start position of a downlink data channel in L number of downlink TTIs, wherein the time domain start position is the X-th time unit in L number of downlink TTIs in the specified bandwidth; or the indication signaling is Radio Resource Control (RRC) signaling carrying an information field of N2 bits, wherein N2 is an integer more than or equal to 1, and the information field of N2 bits indicates a time domain start position of a downlink data channel in L number of downlink TTIs, wherein the time domain start position is the X-th time unit in L number of downlink TTIs in the specified bandwidth; or the indication signaling is broadcast signaling transmitted once in every M1 number of slots, wherein M1 is an integer more than or equal to 1, and a slot includes at least one downlink TTI, and the broadcast signaling indicates a time domain start position of a downlink data channel in all the L number of downlink TTIs in the M1 number of slots, wherein the time domain start position is the X-th time unit in all the L number of downlink TTIs in the specified bandwidth.

Optionally the indication signaling indicates a time domain start position of a downlink data channel in L number of downlink TTIs as a time domain start position of a downlink data channel in L number of downlink TTIs in each sub-band group, wherein the time domain start position is a specified time unit, each sub-band group includes at least one sub-band, a time unit includes Y number of OFDM symbols, and Y is an integer more than or equal to 1.

Optionally the indication signaling is DCI carrying an information field of Q1*N3 bits, wherein Q1 is the number of sub-band groups, and both Q1 and N3 are integers more than or equal to 1, and each information field of N3 bits among the information field of Q1*N3 bits corresponds respectively to one of the sub-band group, wherein an information field of N3 bits indicates a time domain start position of a downlink data channel in L number of downlink TTIs in a corresponding sub-band group, and the time domain start position is the X-th time unit, wherein X is an integer more than or equal to 1; or the indication signaling is RRC signaling carrying the information field of Q2*N4 bits, wherein Q2 is the number of sub-band groups, and both Q2 and N4 are integers more than or equal to 1, and each information field of N4 bits among the information field of Q2*N4 corresponds respectively to one of the sub-band groups, wherein an information field of N4 bits indicates a time domain start position of a downlink data channel in L number of downlink TTIs in a corresponding sub-band group, and the time domain start position is the X-th time unit, wherein X is an integer more than or equal to 1; or the indication signaling is broadcast signaling transmitted once in every M2 number of slots, wherein M2 is an integer more than or equal to 1, and a slot includes at least one downlink TTI, and the broadcast signaling indicates a time domain start position of a downlink data channel in L number of downlink TTIs in each sub-band group, and the time domain start position is the X-th time unit, wherein X is an integer more than or equal to 1.

Optionally the indication signaling is DCI carrying the information field of Q3 bits, wherein Q3 is the number of sub-band groups, and Q3 is an integer more than or equal to 1, and each information bit among the information field of Q3 bits is a flag bit which is set for a sub-band group respectively, wherein a flag bit indicates a time domain start position of a downlink data channel in L number of downlink TTIs in a corresponding sub-band group, and the time domain start position is the first time unit or the Z1-th time unit, wherein Z1 is a preset value, a value signaled in RRC signaling, or a value signaled in broadcast signaling, and Z1 is an integer more than or equal to 2; or the indication signaling is RRC signaling carrying the information field of Q4 bits, wherein Q4 is the number of sub-band groups, and Q4 is an integer more than or equal to 1, and each information bit among the information field of Q4 bits is a flag bit which is set for a sub-band group respectively, wherein a flag bit indicates a time domain start position of a downlink data channel in L number of downlink TTIs in a corresponding sub-band group, and the time domain start position is the first time unit or the Z2-th time unit, wherein Z2 is a preset value, a value signaled in RRC signaling, or a value signaled in broadcast signaling, and Z2 is an integer more than or equal to 2; or the indication signaling is broadcast signaling carrying information field of Q5 bits, wherein Q5 is the number of sub-band groups, and Q5 is an integer more than or equal to 1, and each information bit among the information field of Q5 bits is a flag bit which is set for a sub-band group respectively, wherein a flag bit indicates a time domain start position of a downlink data channel in L number of downlink TTIs in a corresponding sub-band group, and the time domain start position is the first time unit or the Z3-th time unit, wherein Z3 is a preset value, a value signaled in RRC signaling, or a value signaled in broadcast signaling, and Z2 is an integer more than or equal to 3.

Optionally the indication signaling indicates a time domain start position of a downlink data channel in L number of downlink TTIs as follows: the indication signaling is DCI, wherein the DCI indicates resource elements for transmitting downlink data, in a downlink data region in L number of downlink TTIs, and resource elements occupied by DCI corresponding to the other UEs among the resource elements for transmitting downlink data, and triggers the UE to determine a time domain start position of a downlink data channel in L number of downlink TTIs, from the other resource elements than the resource elements occupied by DCI corresponding to the other UEs among the resource elements for transmitting downlink data based upon the indication signaling, wherein the UE defaults a time domain start position of the downlink data region as the first time unit in the L number of downlink TTIs, a time unit includes Y number of OFDM symbols, and Y is an integer more than or equal to 1.

Optionally the indication signaling indicates a time domain start position of a downlink data channel in L number of downlink TTIs as follows: the indication signaling is DCI carrying scheduling information, wherein the scheduling information indicates to the UE the resource elements for transmitting downlink data in a downlink control region in L number of downlink TTIs, and resource elements for transmitting downlink data in a downlink data region, and triggers the UE to determine a time domain start position of a downlink data channel in L number of downlink TTIs based upon the scheduling information carried in the DCI, wherein the downlink control region occupies X number of time units in the time domain, X is an integer more than or equal to 1, a time unit includes Y number of OFDM symbols, Y is an integer more than or equal to 1, and the UE defaults a time domain start position of the downlink data region as the (X+1)-th time unit in the L number of downlink TTIs.

Optionally the scheduling information is scheduling information in a specified bandwidth or each sub-band group, wherein each sub-band group includes at least one sub-band.

Optionally the indication signaling indicates a time domain start position of a downlink data channel in L number of downlink TTIs as follows: the indication signaling is DCI carrying information field in which every one bit is for each sub-band group, wherein each sub-band group includes at least one sub-band; and for each specific sub-band group on which the DCI is transmitted, an information field of one bit corresponding respectively to the each specific sub-band group indicates that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, wherein X is an integer more than or equal to 1, a time unit includes Y number of OFDM symbols, and Y is an integer more than or equal to 1; and for each non-specific sub-band group on which the DCI is not transmitted, an information field of one bit corresponding respectively to the each non-specific sub-band group indicates that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

In a second aspect, there is provided a method for determining a start position of a downlink data channel, applicable to a $5^{th}$-Generation (5G) mobile communication system, the method including: receiving, by a UE, indication signaling transmitted by a base station; and determining, by the UE, a time domain start position of a downlink data channel in L number of downlink Transmission Time Intervals (TTIs) based upon the indication signaling, wherein L is an integer more than or equal to 1.

Optionally determining, by the UE, a time domain start position of a downlink data channel in L number of downlink TTIs based upon the indication signaling includes: determining, by the UE, based upon the indication signaling that a time domain start position of a downlink data channel in L number of downlink TTIs is the X-th time unit in L number of downlink TTIs in a specified bandwidth, wherein the specified bandwidth is a part or all of an operating bandwidth of the base station, X is an integer more than or equal to 1, a time unit includes Y number of Orthogonal Frequency Division Multiplexing (OFDM) symbols, and Y is an integer more than or equal to 1.

Optionally the indication signaling is DCI carrying an information field of N1 bits, wherein N1 is an integer more than or equal to 1, and the information field of N1 bits indicates a time domain start position of a downlink data channel in L number of downlink TTIs, wherein the time domain start position is the X-th time unit in L number of downlink TTIs in the specified bandwidth; or the indication signaling is RRC signaling carrying an information field of N2 bits, wherein N2 is an integer more than or equal to 1, and the information field of N2 bits indicates a time domain start position of a downlink data channel in L number of downlink TTIs, wherein the time domain start position is the X-th time unit in L number of downlink TTIs in the specified bandwidth; or the indication signaling is broadcast signaling transmitted once in every M1 number of slots, wherein M1 is an integer more than or equal to 1, and a slot includes at least one downlink TTI, and the broadcast signaling indicates a time domain start position of a downlink data channel in all the L number of downlink TTIs in the M1 number of slots, wherein the time domain start position is the X-th time unit in all the L number of downlink TTIs in the specified bandwidth.

Optionally determining, by the UE, a time domain start position of a downlink data channel in L number of downlink TTIs based upon the indication signaling includes: determining, by the UE, respectively based upon the indication signaling that a time domain start position of a downlink data channel in L number of downlink TTIs in each sub-band group is a specified time unit, wherein each sub-band group includes at least one sub-band, a time unit includes Y number of OFDM symbols, and Y is an integer more than or equal to 1.

Optionally determining, by the UE, respectively based upon the indication signaling that a time domain start position of a downlink data channel in L number of downlink TTIs in each sub-band group is a specified time unit includes: determining, by the UE, respectively based upon each information field of N3 bits among information field of Q1*N3 bits carried in the indication signaling that a time domain start position of a downlink data channel in L number of downlink TTIs in a corresponding sub-band group is the X-th time unit, wherein the indication signaling is DCI carrying the information field of Q1*N3 bits, Q1 is the number of sub-band groups, Q1 and N3 are integers more than or equal to 1, and X is an integer more than or equal to 1; or determining, by the UE, respectively based upon each information field of N4 bits among the information field of Q2*N4 bits carried in the indication signaling that a time domain start position of a downlink data channel in L number of downlink TTIs in a corresponding sub-band group is the X-th time unit, wherein the indication signaling is RRC carrying the information field of Q2*N4 bits, Q2 is the number of sub-band groups, Q2 and N4 are integers more than or equal to 1, and X is an integer more than or equal to 1; or determining, by the UE, respectively based upon the indication signaling that a time domain start position of a downlink data channel in L number of downlink TTIs in each sub-band group is the X-th time unit, wherein the indication signaling is broadcast signaling transmitted once in every M2 number of slots, M2 is an integer more than or equal to 1, a slot includes at least one downlink TTI, and X is an integer more than or equal to 1.

Optionally determining, by the UE, respectively based upon the indication signaling that a time domain start position of a downlink data channel in L number of downlink TTIs in each sub-band group is a specified time unit includes: determining, by the UE, respectively based upon a flag bit corresponding to each information bit among information field of Q3 bits carried in the indication signaling that a time domain start position of a downlink data channel in L number of downlink TTIs in a corresponding sub-band group is the first time unit or the Z1-th time unit, wherein the indication signaling is DCI carrying the information field of Q3 bits, Q3 is the number of sub-band groups, Q3 is an integer more than or equal to 1, Z1 is a preset value, a value signaled in RRC signaling, or a value signaled in broadcast signaling, and Z1 is an integer more than or equal to 2; or determining, by the UE, respectively based upon a flag bit corresponding to each information bit among information field of Q4 bits carried in the indication signaling that a time domain start position of a downlink data channel in L number of downlink TTIs in a corresponding sub-band group is the first time unit or the Z2-th time unit, wherein the indication signaling is RRC signaling carrying the information field of Q4 bits, Q4 is the number of sub-band groups, Q4 is an integer more than or equal to 1, Z2 is a preset value, a value signaled in RRC signaling, or a value signaled in broadcast signaling, and Z2 is an integer more than or equal to 2; or determining, by the UE, respectively based upon a flag bit corresponding to each information bit among information field of Q5 bits carried in the indication signaling that a time domain start position of a downlink data channel in L number of downlink TTIs in a corresponding sub-band group is the first time unit or the Z3-th time unit, wherein the indication signaling is broadcast signaling carrying the information field of Q5 bits, Q5 is the number of sub-band groups, Q5 is an integer more than or equal to 1, Z3 is a preset value, a value signaled in RRC signaling, or a value signaled in broadcast signaling, and Z3 is an integer more than or equal to 2.

Optionally the indication signaling is DCI, and the DCI indicates resource elements for transmitting downlink data, in a downlink data region in L number of downlink TTIs, and resource elements occupied by DCI corresponding to the other UEs among the resource elements for transmitting downlink data; and determining, by the UE, a time domain start position of a downlink data channel in L number of downlink TTIs based upon the DCI includes: determining, by the UE, a time domain start position of a downlink data channel in L number of downlink TTIs, from the other resource elements than the resource elements occupied by DCI corresponding to the other UEs among the resource elements for transmitting downlink data, based upon the indication signaling, wherein the UE defaults a time domain start position of a downlink data region as the first time unit in the L number of downlink TTIs, a time unit includes Y number of OFDM symbols, Y is an integer more than or equal to 1.

Optionally the indication signaling is DCI carrying the scheduling information, the scheduling information indicates to the UE the resource elements for transmitting downlink data in a downlink control region in L number of downlink TTIs, and resource elements for transmitting downlink data in a downlink data region; and determining, by the UE, a time domain start position of a downlink data channel in L number of downlink TTIs based upon the indication signaling includes: determining, by the UE, a time domain start position of a downlink data channel in L number of downlink TTIs based upon the scheduling information carried in the DCI, wherein the UE defaults that a downlink control region occupies X number of time units in the time domain, wherein X is an integer more than or equal to 1, a time unit includes Y number of OFDM symbols, and Y is an integer more than or equal to 1; and the UE defaults a time domain start position of a downlink data region as the (X+1)-th time unit in the L number of downlink TTIs.

Optionally the scheduling information is scheduling information in a specified bandwidth or each sub-band group, wherein each sub-band group includes at least one sub-band.

Optionally determining, by the UE, a time domain start position of a downlink data channel in L number of downlink TTIs based upon the indication signaling includes: when the indication signaling is DCI, obtaining, by the UE, information field in which every one bit is for each sub-band group, from the DCI, wherein each sub-band group includes at least one sub-band; for each specific sub-band group on which the DCI is transmitted, determining, by the UE, respectively based upon an information field of one bit corresponding to the each specific sub-band group that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, wherein X is an integer more than or equal to 1, a time unit includes Y number of OFDM symbols, and Y is an integer more than or equal to 1; and for each non-specific sub-band group on which the DCI is not transmitted, determining, by the UE, respectively based upon an information field of one bit corresponding to the each non-specific sub-band group that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

In a third aspect, there is provided a method for determining a start position of a downlink data channel, applicable to a $5^{th}$-Generation (5G) mobile communication system, the method including: receiving, by a UE, DCI, and determining resource elements occupied by the DCI in a downlink control region based upon the DCI; and determining, by the UE, a time domain start position of a downlink data channel in L number of downlink Transmission Time Intervals (TTIs) based upon the resource elements occupied by the DCI in the downlink control region, wherein L is an integer more than or equal to 1.

Optionally determining, by the UE, a time domain start position of a downlink data channel in L number of downlink TTIs based upon the resource elements occupied by the DCI in the downlink control region includes: determining, by the UE, specific sub-band groups and non-specific sub-band groups based upon the resource elements occupied by the DCI in the downlink control region, wherein each specific sub-band group is a sub-band group on which the DCI is transmitted, and each non-specific sub-band group is a sub-band group on which the DCI is not transmitted; and each sub-band group includes at least one sub-band, the UE defaults that a downlink control region in each sub-band group occupies X number of time units in the time domain, a time unit includes Y number of Orthogonal Frequency Division Multiplexing (OFDM) symbols, X is a preset value, and X and Y are integers more than or equal to 1; and for each specific sub-band group: determining, by the UE, a time domain start position of a downlink data channel in L number of downlink TTIs in the specific sub-band group, from the other resource elements than the resource elements in the downlink control region in the specific sub-band group; and for each nonspecific sub-band group: determining, by the UE, a time domain start position of a downlink data channel in L number of downlink TTIs in the non-specific sub-band group as the first OFDM symbol in the L number of downlink TTIs in the non-specific sub-band group; or determining, by the UE, a time domain start position of a downlink data channel in L number of downlink TTIs in the non-specific sub-band group as the (X+1)-th time unit in the L number of downlink TTIs in the non-specific sub-band group.

In a fourth aspect, there is provided an apparatus for determining a start position of a downlink data channel, applicable to a $5^{th}$-Generation (5G) mobile communication system, the apparatus including: a generating unit configured to generate indication signaling, wherein the indication signaling indicates a time domain start position of a downlink data channel in L number of downlink Transmission Time Intervals (TTIs), and L is an integer more than or equal to 1; and a transmitting unit configured to transmit the indication signaling to a UE.

Optionally the indication signaling generated by the generating unit indicates a time domain start position of a downlink data channel in L number of downlink TTIs as follows: the indication signaling generated by the generating unit indicates that a time domain start position of a downlink data channel in L number of downlink TTIs is the X-th time unit in L number of downlink TTIs in a specified bandwidth, wherein the specified bandwidth is a part or all of an operating bandwidth of the base station, X is an integer more than or equal to 1, a time unit includes Y number of Orthogonal Frequency Division Multiplexing (OFDM) symbols, and Y is an integer more than or equal to 1.

Optionally the indication signaling generated by the generating unit is DCI carrying an information field of N1 bits, wherein N1 is an integer more than or equal to 1, and the information field of N1 bits indicates a time domain start position of a downlink data channel in L number of downlink TTIs, wherein the time domain start position is the X-th time unit in L number of downlink TTIs in the specified bandwidth; or the indication signaling generated by the generating unit is RRC signaling carrying an information field of N2 bits, wherein N2 is an integer more than or equal to 1, and the information field of N2 bits indicates a time domain start position of a downlink data channel in L number of downlink TTIs, wherein the time domain start position is the X-th time unit in L number of downlink TTIs in the specified bandwidth; or the indication signaling generated by the generating unit is broadcast signaling transmitted once in every M1 number of slots, wherein M1 is an integer more than or equal to 1, and a slot includes at least one downlink TTI, and the broadcast signaling indicates a time domain start position of a downlink data channel in all the L number of downlink TTIs in the M1 number of slots, wherein the time domain start position is the X-th time unit in all the L number of downlink TTIs in the specified bandwidth.

Optionally the indication signaling generated by the generating unit indicates a time domain start position of a downlink data channel in L number of downlink TTIs as follows: the indication signaling generated by the generating unit indicates that a time domain start position of a downlink data channel in L number of downlink TTIs in each sub-band group is a specified time unit, wherein each sub-band group includes at least one sub-band, a time unit includes Y number of OFDM symbols, and Y is an integer more than or equal to 1.

Optionally the indication signaling generated by the generating unit is DCI carrying the information field of Q1*N3 bits, wherein Q1 is the number of sub-band groups, and both Q1 and N3 are integers more than or equal to 1, and each information field of N3 bits among the information field of Q1*N3 bits corresponds respectively to one of the sub-band group, wherein an information field of N3 bits indicates a time domain start position of a downlink data channel in L number of downlink TTIs in a corresponding sub-band group, and the time domain start position is the X-th time unit, wherein X is an integer more than or equal to 1; or the indication signaling generated by the generating unit is RRC signaling carrying the information field of Q2*N4 bits, wherein Q2 is the number of sub-band groups, and both Q2 and N4 are integers more than or equal to 1, and each information field of N4 bits among the information field of Q2*N4 corresponds respectively to one of the sub-band groups, wherein an information field of N4 bits indicates a time domain start position of a downlink data channel in L number of downlink TTIs in a corresponding sub-band group, and the time domain start position is the X-th time unit, wherein X is an integer more than or equal to 1; or the indication signaling generated by the generating unit is broadcast signaling transmitted once in every M2 number of slots, wherein M2 is an integer more than or equal to 1, and a slot includes at least one downlink TTI, and the broadcast signaling indicates that a time domain start position of a downlink data channel in L number of downlink TTIs in each sub-band group, and the time domain start position is the X-th time unit, wherein X is an integer more than or equal to 1.

Optionally the indication signaling generated by the generating unit indicates that a time domain start position of a downlink data channel in L number of downlink TTIs in each sub-band group is a specified time unit as follows: the indication signaling generated by the generating unit is DCI carrying information field of Q3 bits, wherein Q3 is the number of sub-band groups, and Q3 is an integer more than or equal to 1, and each information bit among the information field of Q3 bits is a flag bit which is set for a sub-band group respectively, wherein a flag bit indicates a time domain start position of a downlink data channel in L number of downlink TTIs in a corresponding sub-band group, and the time domain start position is the first time unit or the Z1-th time unit, wherein Z1 is a preset value, a value signaled in RRC signaling, or a value signaled in broadcast signaling, and Z1 is an integer more than or equal to 2; or the indication signaling generated by the generating unit is RRC signaling carrying information field of Q4 bits, wherein Q4 is the number of sub-band groups, and Q4 is an integer more than or equal to 1, and each information bit among the information field of Q4 bits is a flag bit which is set for a sub-band group respectively, wherein a flag bit indicates a time domain start position of a downlink data channel in L number of downlink TTIs in a corresponding sub-band group, and the time domain start position is the first time unit or the Z2-th time unit, wherein Z2 is a preset value, a value signaled in RRC signaling, or a value signaled in broadcast signaling, and Z2 is an integer more than or equal to 2; or the indication signaling generated by the generating unit is broadcast signaling carrying information field of Q5 bits, wherein Q5 is the number of sub-band groups, and Q5 is an integer more than or equal to 1, and each information bit among the information field of Q5 bits is a flag bit which is set for a sub-band group respectively, wherein a flag bit indicates a time domain start position of a downlink data channel in L number of downlink TTIs in a corresponding sub-band group, and the time domain start position is the first time unit or the Z3-th time unit, wherein Z3 is a preset value, a value signaled in RRC signaling, or a value signaled in broadcast signaling, and Z2 is an integer more than or equal to 3.

Optionally the indication signaling generated by the generating unit indicates a time domain start position of a downlink data channel in L number of downlink TTI as follows: the indication signaling generated by the generating unit is DCI, wherein the DCI indicates resource elements for transmitting downlink data, in a downlink data region in L number of downlink TTIs, and resource elements occupied by DCI corresponding to the other UEs among the resource elements for transmitting downlink data, and triggers the UE to determine a time domain start position of a downlink data channel in L number of downlink TTIs, from the other resource elements than the resource elements occupied by DCI corresponding to the other UEs among the resource elements for transmitting downlink data based upon the indication signaling generated by the generating unit, wherein the UE defaults a time domain start position of the downlink data region as the first time unit in the L number of downlink TTIs, a time unit includes Y number of OFDM symbols, and Y is an integer more than or equal to 1.

Optionally the indication signaling generated by the generating unit indicates a time domain start position of a downlink data channel in L number of downlink TTI as follows: the indication signaling generated by the generating unit is DCI carrying scheduling information, wherein the scheduling information indicates to the UE the resource elements for transmitting downlink data in a downlink control region in L number of downlink TTIs, and resource elements for transmitting downlink data in a downlink data region, and triggers the UE to determine a time domain start position of a downlink data channel in L number of downlink TTIs based upon the scheduling information carried in the DCI, wherein the downlink control region occupies X number of time units in the time domain, X is an integer more than or equal to 1, a time unit includes Y number of OFDM symbols, Y is an integer more than or equal to 1, and the UE defaults a time domain start position of the downlink data region as the (X+1)-th time unit in the L number of downlink TTIs.

Optionally the scheduling information is scheduling information in a specified bandwidth or each sub-band group, wherein each sub-band group includes at least one sub-band.

Optionally the indication signaling generated by the generating unit indicates a time domain start position of a downlink data channel in L number of downlink TTIs as follows: the indication signaling generated by the generating unit is DCI carrying information field in which every one bit is for each sub-band group, wherein each sub-band group includes at least one sub-band; and for each specific sub-band group on which the DCI is transmitted, an information field of one bit corresponding respectively to the each specific sub-band group indicates that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, wherein X is an integer more than or equal to 1, a time unit includes Y number of OFDM symbols, and Y is an integer more than or equal to 1; and for each non-specific sub-band group on which the DCI is not transmitted, an information field of one bit corresponding respectively to the each non-specific sub-band group indicates that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

In a fifth aspect, there is provided an apparatus for determining a start position of a downlink data channel, applicable to a $5^{th}$-Generation (5G) mobile communication system, the apparatus including: a first receiving unit configured to receive indication signaling transmitted by a base station; and a first determining unit configured to determine a time domain start position of a downlink data channel in L number of downlink Transmission Time Intervals (TTIs) based upon the indication signaling, wherein L is an integer more than or equal to 1.

Optionally the first determining unit configured to determine a time domain start position of a downlink data channel in L number of downlink TTIs based upon the indication signaling is configured: to determine based upon the indication signaling that a time domain start position of a downlink data channel in L number of downlink TTIs is the X-th time unit in L number of downlink TTIs in a specified bandwidth, wherein the specified bandwidth is a part or all of an operating bandwidth of the base station, X is an integer more than or equal to 1, a time unit includes Y number of OFDM symbols, and Y is an integer more than or equal to 1.

Optionally the indication signaling is DCI carrying an information field of N1 bits, wherein N1 is an integer more than or equal to 1, and the information field of N1 bits indicates a time domain start position of a downlink data channel in L number of downlink TTIs, and the time domain start position is the X-th time unit in L number of downlink TTIs in the specified bandwidth; or the indication signaling is RRC signaling carrying an information field of N2 bits, wherein N2 is an integer more than or equal to 1, and the information field of N2 bits indicates a time domain start position of a downlink data channel in L number of downlink TTIs, and the time domain start position is the X-th time unit in L number of downlink TTIs in the specified bandwidth; or the indication signaling is broadcast signaling transmitted once in every M1 number of slots, wherein M1 is an integer more than or equal to 1, and a slot includes at least one downlink TTI, and the broadcast signaling indicates a time domain start position of a downlink data channel in all the L number of downlink TTIs in the M1 number of slots, and the time domain start position is the X-th time unit in all the L number of downlink TTIs in the specified bandwidth.

Optionally the first determining unit configured to determine a time domain start position of a downlink data channel in L number of downlink TTIs based upon the indication signaling is configured: to determine respectively based upon the indication signaling that a time domain start position of a downlink data channel in L number of downlink TTIs in each sub-band group is a specified time unit, wherein each sub-band group includes at least one sub-band, a time unit includes Y number of OFDM symbols, and Y is an integer more than or equal to 1.

Optionally the first determining unit configured to determine respectively based upon the indication signaling that a time domain start position of a downlink data channel in L number of downlink TTIs in each sub-band group is a specified time unit is configured:

to determine a time domain start position of a downlink data channel in L number of downlink TTIs in a corresponding sub-band group respectively based upon each information field of N3 bits among the information field of Q1*N3 bits carried in the indication signaling, wherein the time domain start position is the X-th time unit, the indication signaling is DCI carrying the information field of Q1*N3 bits, Q1 is the number of sub-band groups, Q1 and N3 are integers more than or equal to 1, and X is an integer more than or equal to 1; or to determine a time domain start position of a downlink data channel in L number of downlink TTIs in a corresponding sub-band group respectively based upon each information field of N4 bits among the information field of Q2*N4 bits carried in the indication signaling, wherein the time domain start position is the X-th time unit, the indication signaling is RRC carrying the information field of Q2*N4 bits, Q2 is the number of sub-band groups, Q2 and N4 are integers more than or equal to 1, and X is an integer more than or equal to 1; or to determine a time domain start position of a downlink data channel in L number of downlink TTIs in each sub-band group respectively based upon the indication signaling, wherein the time domain start position is the X-th time unit, the indication signaling is broadcast signaling transmitted once in every M2 number of slots, M2 is an integer more than or equal to 1, a slot includes at least one downlink TTI, and X is an integer more than or equal to 1.

Optionally the first determining unit configured to determine respectively based upon the indication signaling that a time domain start position of a downlink data channel in L number of downlink TTIs in each sub-band group is a specified time unit is configured: to determine a time domain start position of a downlink data channel in L number of downlink TTIs in a corresponding sub-band group respectively based upon a flag bit corresponding to each information bit among information field of Q3 bits carried in the indication signaling, wherein the time domain start position is the first time unit or the Z1-th time unit, the indication signaling is DCI carrying the information field of Q3 bits, Q3 is the number of sub-band groups, Q3 is an integer more than or equal to 1, Z1 is a preset value, a value signaled in RRC signaling, or a value signaled in broadcast signaling, and Z1 is an integer more than or equal to 2; or to determine a time domain start position of a downlink data channel in L number of downlink TTIs in a corresponding sub-band group respectively based upon a flag bit corresponding to each information bit among information field of Q4 bits carried in the indication signaling, wherein the time domain start position is the first time unit or the Z2-th time unit, the indication signaling is RRC signaling carrying the information field of Q4 bits, Q4 is the number of sub-band groups, Q4 is an integer more than or equal to 1, Z2 is a preset value, a value signaled in RRC signaling, or a value signaled in broadcast signaling, and Z2 is an integer more than or equal to 2; or to determine a time domain start position of a downlink data channel in L number of downlink TTIs in a corresponding sub-band group respectively based upon a flag bit corresponding to each information bit among information field of Q5 bits carried in the indication signaling, wherein the time domain start position is the first time unit or the Z3-th time unit, the indication signaling is broadcast signaling carrying the information field of Q5 bits, Q5 is the number of sub-band groups, Q5 is an integer more than or equal to 1, Z3 is a preset value, a value signaled in RRC signaling, or a value signaled in broadcast signaling, and Z3 is an integer more than or equal to 2.

Optionally the first determining unit configured to determine a time domain start position of a downlink data channel in L number of downlink TTIs based upon the indication signaling is configured: to determine a time domain start position of a downlink data channel in L number of downlink TTIs, from the other resource elements than resource elements occupied by DCI corresponding to the other apparatuses among resource elements for transmitting downlink data, based upon the indication signaling, wherein the apparatus defaults a time domain start position of a downlink data region as the first time unit in the L number of downlink TTIs, a time unit includes Y number of OFDM symbols, Y is an integer more than or equal to 1, the indication signaling is DCI, and the DCI indicates the resource elements for transmitting downlink data, in the downlink data region in L number of downlink TTIs, and the resource elements occupied by DCI corresponding to the other apparatuses among the resource elements for transmitting downlink data.

Optionally the first determining unit configured to determine a time domain start position of a downlink data channel in L number of downlink TTIs based upon the indication signaling is configured: to determine a time domain start position of a downlink data channel in L number of downlink TTIs based upon scheduling information carried in the indication signaling, wherein the apparatus defaults that a downlink control region occupies X number of time units in the time domain, wherein X is an integer more than or equal to 1, a time unit includes Y number of OFDM symbols, and Y is an integer more than or equal to 1; and the apparatus defaults a time domain start position of a downlink data region as the (X+1)-th time unit in the L number of downlink TTIs, the indication signaling is DCI carrying the scheduling information, the scheduling information indicates to the apparatus the resource elements for transmitting downlink data in the downlink control region in the L downlink TTIs, and resource elements for transmitting downlink data in the downlink data region.

Optionally the scheduling information is scheduling information in a specified bandwidth or each sub-band group, wherein each sub-band group includes at least one sub-band.

Optionally the first determining unit configured to determine a time domain start position of a downlink data channel in L number of downlink TTIs based upon the indication signaling is configured: when the indication signaling is DCI, to obtain information field in which every one bit is for each sub-band group, from the DCI, wherein each sub-band group includes at least one sub-band; for each specific sub-band group on which the DCI is transmitted, to determine respectively based upon an information field of one bit corresponding to the each specific sub-band group that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X time units in the time domain, in L number of downlink TTIs in the corresponding specific sub-band group, wherein X is an integer more than or equal to 1, a time unit includes Y number of OFDM symbols, and Y is an integer more than or equal to 1; and for each non-specific sub-band group on which the DCI is not transmitted, to determine respectively based upon an information field of one bit corresponding to the each non-specific sub-band group that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

In a sixth aspect, there is provided an apparatus for determining a start position of a downlink data channel, applicable to a $5^{th}$-Generation (5G) mobile communication system, the apparatus including: a second receiving unit configured to receive Downlink Control Signaling (DCI), and to determine resource elements occupied by the DCI in a downlink control region based upon the DCI; and a second determining unit configured to determine a time domain start position of a downlink data channel in L number of downlink Transmission Time Intervals (TTIs) based upon the resource elements occupied by the DCI in the downlink control region, wherein L is an integer more than or equal to 1.

Optionally the second determining unit configured to determine a time domain start position of a downlink data channel in L number of downlink TTIs based upon the resource elements occupied by the DCI in the downlink control region is configured: to determine at least one specific sub-band group and at least one non-specific sub-band group based upon the resource elements occupied by the DCI in the downlink control region, wherein the specific sub-band group is a sub-band group on which the DCI is transmitted, and the non-specific sub-band group is a sub-band group on which the DCI is not transmitted; and each sub-band group includes at least one sub-band, the apparatus defaults that a downlink control region in each sub-band group occupies X time units in the time domain, a time domain unit includes Y number of OFDM symbols, X is a preset value, and X and Y are integers more than or equal to 1; for each specific sub-band group, the second determining unit is configured: to determine a time domain start position of a downlink data channel in L number of downlink TTIs in the specific sub-band group, from the other resource elements than the resource elements in the downlink control region in the specific sub-band group; and for each nonspecific sub-band group, the second determining unit is configured: to determine a time domain start position of a downlink data channel in L number of downlink TTIs in the non-specific sub-band group as the first OFDM symbol in the L number of downlink TTIs in the non-specific sub-band group; or to determine a time domain start position of a downlink data channel in L number of downlink TTIs in the non-specific sub-band group as the (X+1)-th time unit in the L number of downlink TTIs in the non-specific sub-band group.

In a seventh aspect, there is provided a base station including: a processor, a transceiver, and a memory, wherein the transceiver is configured to receive and transmit data under the control of the processor, and the processor is configured to read and execute program in the memory to perform the method according to any one of the solutions in the first aspect above.

In an eighth aspect, there is provided a UE including: a processor, a transceiver, and a memory, wherein the transceiver is configured to receive and transmit data under the control of the processor, and the processor is configured to read and execute program in the memory to perform the method according to any one of the solutions in the second aspect above.

In a ninth aspect, there is provided a UE including: a processor, a transceiver, and a memory, wherein the transceiver is configured to receive and transmit data under the control of the processor, and the processor is configured to read and execute program in the memory to perform the method according to any one of the solutions in the third aspect above.

In a tenth aspect, there is provided a computer storage medium storing computer executable instructions configured to cause the computer to perform the method according to any one of the solutions in the first aspect above.

In an eleventh aspect, there is provided a computer storage medium storing computer executable instructions configured to cause the computer to perform the method according to any one of the solutions in the second aspect above.

In a twelfth aspect, there is provided a computer storage medium storing computer executable instructions configured to cause the computer to perform the method according to any one of the solutions in the third aspect above.

In summary, in the embodiments of the invention, in order to determine a time domain start position of a downlink data channel in L number of downlink TTIs, a base station transmits generated indication signaling to a UE, and the UE determines a time domain start position of a downlink data channel in L number of downlink TTIs based upon the indication signaling upon reception of the indication signaling. With this method, when a downlink control channel only appears at a part positions of frequency domain, or does not appear in the frequency domain, and does not occupy the entire downlink control region in the time domain, or occupies varying resource elements in the time domain, the base station can notify accurately the UE of a time domain start position of a downlink data channel so that the UE can receive downlink data accurately to thereby improve the efficiency and reliability of receiving the downlink data by the UE so as to improve both the spectrum efficiency and a user experience.

DETAILED DESCRIPTION

The technical solutions according to the embodiments of the invention will be described below clearly and fully with reference to the drawings in the embodiments of the invention, and apparently the embodiments to be described are only a part but not all of the embodiments of the invention. Based upon the embodiments of the invention, all the other embodiments which can occur to those ordinarily skilled in the art without any inventive effort shall fall into the claimed scope of the invention.

The solutions according to the invention will be described below in details in connection with specific embodiments thereof, and of course, the invention will not be limited to the following embodiments.

Figure 1:
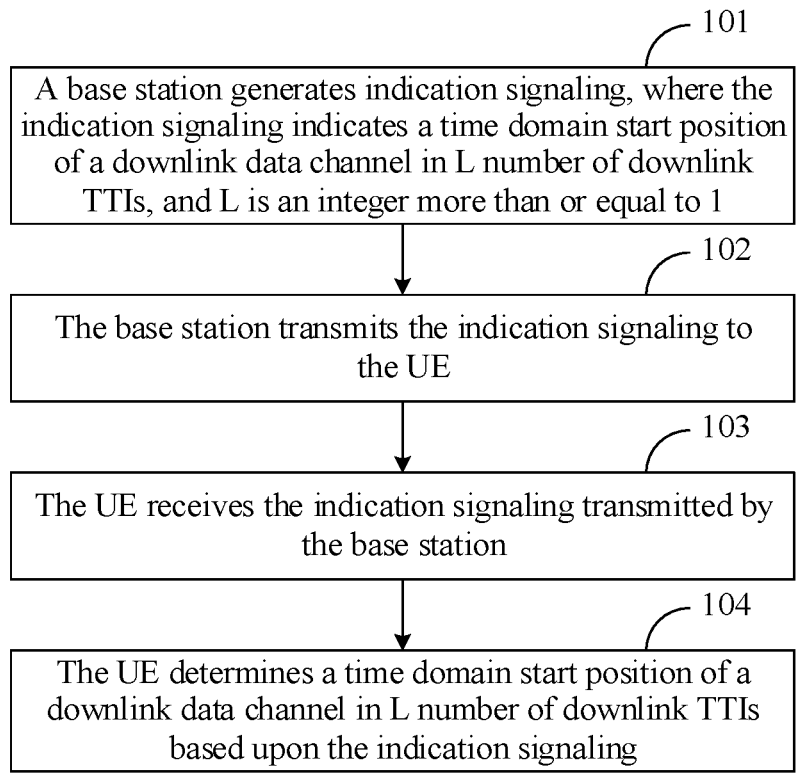
FIG. 1 is a schematic flow chart of a first method for determining a start position of a downlink data channel according to an embodiment of the invention.

As illustrated in FIG. 1, a detailed flow of a method for determining a start position of a downlink data channel according to an embodiment of the invention is as follows.

In the step 101, a base station generates indication signaling, where the indication signaling indicates a time domain start position of a downlink data channel in L number of downlink Transmission Time Intervals (TTIs), and L is an integer more than or equal to 1.

The base station generates corresponding indication signaling upon determining that there are data to be transmitted to a UE through an operating bandwidth of the base station, where the indication signaling can indicate a time domain start position of a downlink data channel in L number of downlink TTIs.

In a real application, the indication signaling indicates a time domain start position of a downlink data channel in L number of downlink TTIs in the following five instances without any limitation thereto.

In a first instance, the indication signaling indicates that a time domain start position of a downlink data channel in L number of downlink TTIs is the X-th time unit in L number of downlink TTIs in a specified bandwidth, where the specified bandwidth is a part or all of an operating bandwidth of the base station, X is an integer more than or equal to 1, one time unit includes Y number of OFDM symbols, and Y is an integer more than or equal to 1.

In a real application, the indication signaling can be any one of Downlink Control Information (DCI), Radio Resource Control (RRC) signaling, or broadcast signaling.

Specifically when the indication signaling is DCI, the DCI carries an information field with the length of N1 bits, where N1 is an integer more than or equal to 1, then the information field of N1 bits may indicate a time domain start position of a downlink data channel in L number of downlink TTIs, where the time domain start position is the X-th time unit in L number of downlink TTIs in the specified bandwidth.

For example, when the base station transmits indication signaling of "DCI 1" to a "UE 1", then the "DCI 1" can carry an information field of two bits, where the information field of two bits indicates that a time domain start position of a downlink data channel of the "UE 1" in L number of downlink TTIs is the fourth time unit in L number of downlink TTIs in the specified bandwidth.

When the indication signaling is RRC signaling, the RRC signaling carries an information field of N2 bits, where N2 is an integer more than or equal to 1, then the information field of N2 bits can indicate a time domain start position of a downlink data channel in L number of downlink TTIs, where the a time domain start position is the X-th time unit in L number of downlink TTIs in the specified bandwidth.

For example, when the base station transmits indication signaling of "RRC signaling 2" to a "UE 2", where the "RRC signaling 2" carries an information field of one bit, then the information field of one bits can indicate that a time domain start position of a downlink data channel of the "UE 2" in L number of downlink TTIs is the second time unit in L number of downlink TTIs in the specified bandwidth.

When the indication signaling is broadcast signaling, the broadcast signaling is transmitted once every M1 number of slots, where M1 is an integer more than or equal to 1, and one slot includes at least one downlink TTI, then the broadcast signaling can indicate a time domain start position of a downlink data channel in all the L number of downlink TTIs in the M1 number of slots, where the time domain start position is the X-th time unit in all the L number of downlink TTIs in the specified bandwidth.

For example, when the base station transmits indication signaling of "broadcast signaling 3" to a "UE 3", where the "broadcast signaling 3" carries an information field of one bit, then the information field of one bit can indicate that a time domain start position of a downlink channel of the "UE 3" in L number of downlink TTIs is the first domain time unit in L downlink TTIs in the specified bandwidth.

In a second instance, the indication signaling indicates a specified time unit of a downlink data channel in L number of downlink TTIs in each sub-band group, where each sub-band group includes at least one sub-band, one time unit includes Y number of OFDM symbols, and Y is an integer more than or equal to 1.

In a real application, the indication signaling can be any one of DCI, RRC signaling, or a broadcast signaling.

Furthermore the indication signaling indicates that a time domain start position of a downlink data channel in L number of downlink TTIs in each sub-band group is a specific time unit, in the following two implementations without any limitation thereto.

In a first implementation, the indication signaling indicates that a time domain start position of a downlink data channel in L number of downlink TTIs in each sub-band group is the X-th time unit.

Specifically when the indication signaling is DCI, the DCI carries information field with the length of Q1*N3 bits, where Q1 is the number of sub-band groups, and both Q1 and N3 are integers more than or equal to 1, then each information field of N3 bits among the information field of Q1*N3 bits corresponds respectively to one of the sub-band groups, where an information field of N3 bits indicates a time domain start position of a downlink data channel in L downlink TTIs in a corresponding sub-band group, and the time domain start position is the X-th time unit, where X is an integer more than or equal to 1.

For example, when the base station transmits indication signaling of "DCI" to a "UE 1", and the specified bandwidth is divided into three "sub-band groups", where the "DCI" carries information field of every two bits for each sub-band group, that is, the "DCI" carries information field of 3*2 bits, then the information field of two bits corresponding to a "sub-band group 1" indicates that a time domain start position of a downlink data channel in L number of downlink TTIs in the "sub-band group 1" is the third time unit, the information field of two bits corresponding to a "sub-band group 2" indicates that a time domain start position of a downlink data channel in L number of downlink TTIs in the "sub-band group 2" is the second time unit, and the information field of two bits corresponding to a "sub-band group 3" indicates that a time domain start position of a downlink data channel in L number of downlink TTIs in the "sub-band group 3" is the fourth time unit.

When the indication signaling is RRC signaling, the RRC signaling carries an information field of Q2*N4 bits, where Q2 is the number of sub-band groups, and both Q2 and N4 are integers more than or equal to 1, then an information field of N4 bits among the information field of Q2*N4 corresponds respectively to one of the sub-band groups, where an information field of N4 bits indicates a time domain start position of a downlink data channel in L number of downlink TTIs in a corresponding sub-band group, and the start position is the X-th time unit, where X is an integer more than or equal to 1.

For example, when the base station transmits indication signaling of "RRC signaling" to a "UE 2", and the specified bandwidth is divided into two "sub-band groups", where the "RRC signaling" carries information field of three bits of each sub-band group, that is, the "RRC signaling" carries information field of 2*3 bits, then an information field of three bits corresponding to a "sub-band group 1" indicates that a time domain start position of a downlink data channel in L number of downlink TTIs in the "sub-band group 1" is the fifth time unit, and an information field of three bits corresponding to a "sub-band group 2" indicates that a time domain start position of a downlink data channel in L number of downlink TTIs in the "sub-band group 2" is the fourth time unit.

When the indication signaling is broadcast signaling, the broadcast signaling is transmitted once in every M2 slots, where M2 is an integer more than or equal to 1, and one slot includes at least one downlink TTI, then the broadcast signaling indicates a time domain start position of a downlink data channel in L number of downlink TTIs in each sub-band group, where the time domain start position is the X-th time unit, where X is an integer more than or equal to 1.

For example, when the base station transmits indication signaling of "broadcast signaling" to a "UE 3", where the "broadcast signaling" is transmitted once in every five slots, the five slots including L number of downlink TTIs, then the "broadcast signaling" indicates that a time domain start position of a downlink data channel in L number of downlink TTIs in a "sub-band group 1" is the first time unit, and a time domain start position of a downlink data channel in L number of downlink TTIs in a "sub-band group 2" is the third time unit.

In a second implementation, the indication signaling indicates that a time domain start position of a downlink data channel in L number of downlink TTIs in each sub-band group is the first time unit or the Z-th time unit.

Specifically when the indication signaling is DCI, the DCI carries information field of Q3 bits, where Q3 is the number of sub-band groups, and Q3 is an integer more than or equal to 1, then each information bit among the information field of Q3 bits is a flag bit which is set for a sub-band group respectively, where one flag bit indicates a time domain start position of a downlink data channel in L number of downlink TTIs in a corresponding sub-band group, and the time domain start position is the first time unit or the Z1-th time unit, where Z1 is a preset value, a value signaled in RRC signaling, or a value signaled in broadcast signaling, and Z1 is an integer more than or equal to 2.

For example, when the base station transmits indication signaling of "DCI" to a "UE 1", where the "DCI" carries information field of one bit of each sub-band group, then when a flag bit corresponding to an information field of one bit for a "sub-band group 1" is 1, then the flag bit indicates that a time domain start position of a downlink data channel in L number of downlink TTIs in the "sub-band group 1" is the third time unit; and when the flag bit corresponding to the information field of one bit for the "sub-band group 1" is 0, then the flag bit indicates that a time domain start position of a downlink data channel in L number of downlink TTIs in the "sub-band group 1" is the first time unit, where the preset value is 3.

When the indication signaling is RRC signaling, the RRC signaling carries information field of Q4 bits, where Q4 is the number of sub-band groups, and Q4 is an integer more than or equal to 1, then each information bit among the information field of Q4 bits is a flag bit which is set for a sub-band group, where a flag bit indicates a time domain start position of a downlink data channel in L number of downlink TTIs in a corresponding sub-band group, and the time domain start position is the first time unit or the Z2-th time unit, where Z2 is a preset value, a value signaled in RRC signaling, or a value signaled in broadcast signaling, and Z2 is an integer more than or equal to 2.

For example, when the base station transmits indication signaling of "RRC signaling" to a "UE 2", where the "RRC signaling" carries information field of one bit of each sub-band group, then when a flag bit corresponding to an information field of one bit for a "sub-band group 2" is 1, then the flag bit indicates that a time domain start position of a downlink data channel in L number of downlink TTIs in the "sub-band group 2" is the third time unit; and when the flag bit corresponding to the information bit for the "sub-band group 2" is 0, then the flag bit indicates that a time domain start position of a downlink data channel in L number of downlink TTIs in the "sub-band group 2" is the first time unit, where the value signaled in the RRC signaling is 3.

When the indication signaling is broadcast signaling, the broadcasting signaling carries information field of Q5 bits, where Q5 is the number of sub-band groups, and Q5 is an integer more than or equal to 1, then each information bit among the information field of Q5 bits is a corresponding flag bit which is set for a sub-band group respectively, where a flag bit indicates a time domain start position of a downlink data channel in L number of downlink TTIs in a corresponding sub-band group, and the time domain start position is the first time unit or the Z3-th time unit, where Z3 is a preset value, a value signaled in RRC signaling, or a value signaled in broadcast signaling, and Z2 is an integer more than or equal to 3.

For example, when the base station transmits indication signaling of "broadcast signaling" to a "UE 3", where the "broadcast signaling" carries information field of one bit of sub-band group, then when a flag bit corresponding to an information field of one bit for a "sub-band group 3" is 1, then the flag bit indicates that a time domain start position of a downlink data channel in L number of downlink TTIs in the "sub-band group 3" is the third time unit; and when the flag bit corresponding to the information field of one bit for the "sub-band group 3" is 0, then the flag bit indicates that a time domain start position of a downlink data channel in L number of downlink TTIs in the "sub-band group 3" is the first time unit, where the value signaled in the broadcast signaling is 3.

In a third instance, the indication signaling indicates to the UE that a time domain start position of a downlink data channel in L number of downlink TTIs is determined from the other resource elements than resource elements occupied by DCI corresponding to the other UEs among resource elements for transmitting downlink data.

Specifically the base station transmits the indication signaling to the UE, where the indication signaling indicates resource elements for transmitting downlink data in a downlink data region in L number of downlink TTIs, and resource elements occupied by DCI corresponding to the other UEs among the resource elements for transmitting downlink data, and triggers the UE to determine a time domain start position of a downlink data channel in L number of downlink TTIs, from the other resource elements than the resource elements occupied by DCI corresponding to the other UEs among the resource elements for transmitting downlink data based upon the indication signaling, where the UE defaults a time domain start position of the downlink data region as the first time unit in the L number of downlink TTIs, one time unit includes Y number of OFDM symbols, and Y is an integer more than or equal to 1.

For example, when the base station transmits indication signaling of "DCI 1" to a "UE 1", where the "DCI 1" indicates that resource elements for transmitting downlink data in a downlink data region in L downlink TTIs are "resource element 1", "resource element 2", and "resource element 3", and indicates that "DCI 2" corresponding to a "UE 2" occupies the "resource element 2", then the "DCI 1" triggers the "UE 1" to determine a time domain start position of a downlink data channel in L number of downlink TTIs from the "resource element 1" and the "resource element 3".

In a fourth instance, the indication signaling indicates to the UE that a time domain start position of a downlink data channel in L number of downlink TTIs is determined based upon scheduling information carried in the indication signaling.

Specifically the indication signaling is DCI, the DCI carries scheduling information, where the scheduling information indicates resource elements for the UE to transmit downlink data in a downlink control region in L number of downlink TTIs, and resource elements for the UE to transmit downlink data in a downlink data region in L number of downlink TTIs, and triggers the UE to determine a time domain start position of a downlink data channel in L number of downlink TTIs based upon the scheduling information carried in the DCI, where the UE defaults a time domain start position of the downlink data region as the (X+1)-th time unit in the L number of downlink TTIs, the downlink control region occupies X number of time units in the time domain, X is an integer more than or equal to 1, one time unit includes Y number of OFDM symbols, and Y is an integer more than or equal to 1.

For example, when the base station transmits indication signaling of "DCI 1" to a "UE 1", where the "DCI 1" carries "scheduling information 1", and the "scheduling information 1" indicates that a resource element for the "UE 1" to transmit downlink data in a downlink control region in L number of downlink TTIs is a "resource element 1", and a resource element for the "UE 1" to transmit downlink data in a downlink data region in L number of downlink TTIs is a "resource element 2", and triggers the "UE 1" to determine a time domain start position of a downlink data channel in L number of downlink TTIs from the "resource element 1" and/or the "resource element 2" based upon the "scheduling information 1".

Furthermore the indication signaling is scheduling information in a specified bandwidth or each sub-band group, where each sub-band group includes at least one sub-band, that is, the scheduling information carried in the DCI can be a piece of scheduling information for the specified bandwidth, or can be a plurality of pieces of scheduling information corresponding to the respective sub-band groups.

In a fifth instance, the indication signaling indicates a time domain start position of a downlink data channel in L number of downlink TTIs in any one sub-band group for transmitting downlink data.

Specifically the indication signaling is DCI, the DCI carries information field of one bit for each sub-band group, where each sub-band group includes at least one sub-band.

In a real application, for each specific sub-band group for transmitting the DCI, an information field of one bit corresponding to the each specific sub-band group indicates that: a time domain start position of a downlink data channel in L number of downlink TTIs in the corresponding specific sub-band group is determined from the other resource elements than resource elements occupied for transmitting the DCI, in a downlink control region occupying X time units in the time domain, in the corresponding specific sub-band group, or a time domain start position of a downlink data channel in L number of downlink TTIs in the corresponding specific sub-band group is determined as the first resource element after a downlink control region occupying X time units in the time domain, in L number of downlink TTIs in the corresponding specific sub-band group, where X is an integer more than or equal to 1, one time unit includes Y number of OFDM symbols, and Y is an integer more than or equal to 1.

For example, when the base station transmits indication signaling of "DCI" to the UE, and a "sub-band group 1" is a specific sub-band group for transmitting the "DCI", then when the value of one bit corresponding to the "sub-band group 1" is 1, a time domain start position of a downlink data channel in L number of downlink TTIs in the "sub-band group 1" can be determined from the other resource elements than resource elements occupied for transmitting the DCI, in a downlink control region occupying X time units in the time domain, in the "sub-band group 1".

In another example, when the base station transmits indication signaling of "DCI" to the UE, and a "sub-band group 1" is a specific sub-band group for transmitting the "DCI", then when the value of one bit corresponding to the "sub-band group 1" is 0, a time domain start position of a downlink data channel in L number of downlink TTIs in the "sub-band group 1" can be determined as the first resource element after a downlink control region occupying three time units in the time domain, in the L number of downlink TTIs in the "sub-band group 1".

Furthermore for each non-specific sub-band group on which the DCI is not transmitted, each information field of one bit corresponding respectively to the each non-specific sub-band group indicates that a time domain start position of a downlink data channel in L number of downlink TTIs in the corresponding non-specific sub-band group is determined as the first time unit in a downlink control region occupying X time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

For example, if the base station transmits indication signaling of "DCI" to the UE, and a "sub-band group 2" is a non-specific sub-band group on which the "DCI" is not transmitted, then when the value of one bit corresponding to the "sub-band group 2" is 1, a time domain start position of a downlink data channel in L number of downlink TTIs in the "sub-band group 2" can be determined in a downlink control region occupying X number of time units in the time domain, in the "sub-band group 2".

In another example, when the base station transmits indication signaling of "DCI" to the UE, and a "sub-band group 2" is a non-specific sub-band group on which the "DCI" is not transmitted, then when the value of one bit corresponding to the "sub-band group 2" is 0, a time domain start position of a downlink data channel in L number of downlink TTIs in the "sub-band group 2" can be determined as the first resource element after a downlink control region occupying three time units in the time domain, in the L number of downlink TTIs in the "sub-band group 2".

Of course, the resource element can be any one of a Physical Resource Block (PRB), a PRB group, a Control Channel Element (CCE), or a CCE group.

In the step 102, the base station transmits the indication signaling to the UE.

Specifically the base station transmits the indication signaling to the UE over a time-frequency resource in the operating bandwidth after generating the indication signaling.

For example, the base station transmits DCI to the UE 1; in another example, the base station transmits RRC signaling to the UE 2; and in still another example, the base station transmits broadcast signaling to the UE 3.

In the step 103, the UE receives the indication signaling transmitted by the base station.

Specifically the UE receives the indication signaling transmitted by the base station on the time-frequency resource in the operating bandwidth.

For example, the UE 1 receives the DCI transmitted by the base station; in another example, the UE 2 receives the RRC signaling transmitted by the base station; and in still another example, the UE 3 receives the broadcast signaling transmitted by the base station.

In the step 104, the UE determines a time domain start position of a downlink data channel in L number of downlink TTIs based upon the indication signaling, where L is an integer more than or equal to 1.

The UE determines a time domain start position of a downlink data channel in L number of downlink TTIs based upon indication information carried in the indication signaling transmitted by the base station upon reception of the indication signaling.

In a real application, the UE determines a time domain start position of a downlink data channel in L number of downlink TTIs based upon the indication signaling in the following five instances without any limitation thereto.

In a first instance, the UE determines, based upon the indication signaling, that a time domain start position of a downlink data channel in L number of downlink TTIs is the X-th time unit in L number of downlink TTIs in a specified bandwidth, where the specified bandwidth is a part or all of an operating bandwidth of the base station, X is an integer more than or equal to 1, one time unit includes Y number of OFDM symbols, and Y is an integer more than or equal to 1.

In a real application, the indication signaling can be any one of DCI, RRC signaling, or broadcast signaling.

Specifically when the indication signaling is DCI, the DCI carries an information field of N1 bits, where N1 is an integer more than or equal to 1, then the information field of N1 bits indicates that a time domain start position of a downlink data channel in L number of downlink TTIs is the X-th time unit in L number of downlink TTIs in the specified bandwidth.

For example, when a "UE 1" receives indication signaling of "DCI 1" carrying an information field of two bits, then the "UE 1" determines based upon the information field of two bits that a time domain start position of a downlink data channel in L number of downlink TTIs is the fourth time unit in L number of downlink TTIs in the specified bandwidth.

When the indication signaling is RRC signaling carrying an information field of N2 bits, where N2 is an integer more than or equal to 1, then the information field of N2 bits indicates that a time domain start position of a downlink data channel in L number of downlink TTIs is the X-th time unit in L number of downlink TTIs in the specified bandwidth.

For example, when a "UE 2" receives indication signaling of "RRC signaling 2" carrying an information field of one bit, then the "UE 2" determines based upon the information field of one bit that a time domain start position of a downlink data channel in L number of downlink TTIs is the second time unit in L number of downlink TTIs in the specified bandwidth.

When the indication signaling is broadcast signaling transmitted once in every M1 slots, where M1 is an integer more than or equal to 1, and a slot includes at least one downlink TTI, then the broadcast signaling indicates that a time domain start position of a downlink data channel in all L number of downlink TTIs in the M1 slots is the X-th time unit in all L number of downlink TTIs in the specified bandwidth.

For example, when a "UE 3" receives indication signaling of "broadcast signaling 3" carrying an information field of one bit, then the "UE 3" determines based upon the information field of one bit that a time domain start position of a downlink channel in L number of downlink TTIs is the first time unit in L number of downlink TTIs in the specified bandwidth.

In a second instance, the UE determines based upon the indication signaling that a time domain start position of a downlink data channel in L number of downlink TTIs in each sub-band group is a specified time unit, where each sub-band group includes at least one sub-band, one time unit includes Y number of OFDM symbols, and Y is an integer more than or equal to 1.

In a real application, the indication signaling can be any one of DCI, RRC signaling, or a broadcast signaling.

Furthermore the UE determines based upon the indication signaling that a time domain start position of a downlink data channel in L number of downlink TTIs in each sub-band group is a specified time unit, in the following two implementations without any limitation thereto.

In a first implementation, the UE determines based upon the indication signaling that that a time domain start position of a downlink data channel in L number of downlink TTIs in each sub-band group is the X-th time unit.

Specifically the UE determines respectively based upon each information field of N3 bits among information field of Q1*N3 bits carried in the indication signaling that a time domain start position of a downlink data channel in L number of downlink TTIs in a corresponding sub-band group is the X-th time unit, where the indication signaling is DCI carrying the information field of Q1*N3 bits, Q1 is the number of sub-band groups, Q1 and N3 are integers more than or equal to 1, and X is an integer more than or equal to 1.

For example, when a "UE 1" receives indication signaling of "DCI", and the specified bandwidth is divided into three "sub-band groups", where the "DCI" carries information field of two bits for each sub-band group, that is, the "DCI" carries information field of 3*2 bits, then the "UE 1" determines based upon an information field of two bits corresponding to a "sub-band group 1" that a time domain start position of a downlink data channel in L number of downlink TTIs in the "sub-band group 1" is the third time unit, the "UE 1" determines based upon an information field of two bits corresponding to a "sub-band group 2" that a time domain start position of a downlink data channel in L number of downlink TTIs in the "sub-band group 2" is the second time unit, and the "UE 1" determines based upon an information field of two bits corresponding to a "sub-band group 3" that a time domain start position of a downlink data channel in L number of downlink TTIs in the "sub-band group 3" is the fourth time unit.

The UE determines respectively based upon each information field of N4 bits among information field of Q2*N4 bits carried in the indication signaling that a time domain start position of a downlink data channel in L number of downlink TTIs in a corresponding sub-band group is the X-th time unit, where the indication signaling is RRC carrying the information field of Q2*N4 bits, Q2 is the number of sub-band groups, Q2 and N4 are integers more than or equal to 1, and X is an integer more than or equal to 1.

For example, when a "UE 2" receives indication signaling of "RRC signaling", and the specified bandwidth is divided into two "sub-band groups", where the "RRC signaling" carries information field of three bits for each sub-band group, that is, the "RRC signaling" carries information field of 2*3 bits, then the "UE 2" determines based upon an information field of three bits corresponding to a "sub-band group 1" that a time domain start position of a downlink data channel in L number of downlink TTIs in the "sub-band group 1" is the fifth time unit, and the "UE 2" determines based upon an information field of three bits corresponding to a "sub-band group 2" that a time domain start position of a downlink data channel in L number of downlink TTIs in the "sub-band group 2" is the fourth time unit.

The UE determines respectively based upon the indication signaling that a time domain start position of a downlink data channel in L number of downlink TTIs in each sub-band group is the X-th time unit, where the indication signaling is broadcast signaling transmitted once in every M2 slots, M2 is an integer more than or equal to 1, a slot includes at least one downlink TTI, and X is an integer more than or equal to 1.

For example, when a "UE 3" receives indication signaling of "broadcast signaling" transmitted once in every five slots including L downlink TTIs, then the "UE 3" determines based upon the "broadcast signaling" that a time domain start position of a downlink data channel in L number of downlink TTIs in a "sub-band group 1" is the first time unit, and the "UE 3" determines based upon the "broadcast signaling" that a time domain start position of a downlink data channel in L number of downlink TTIs in a "sub-band group 2" is the third time unit.

In a second implementation, the UE determines based upon the indication signaling that a time domain start position of a downlink data channel in L number of downlink TTIs in each sub-band group is the first time unit or the Z-th time unit.

Specifically the UE determines respectively based upon a flag bit corresponding to each information bit among information field of Q3 bits carried in the indication signaling that a time domain start position of a downlink data channel in L number of downlink TTIs in a corresponding sub-band group is the first time unit or the Z1-th time unit, where the indication signaling is DCI carrying the information field of Q3 bits, Q3 is the number of sub-band groups, Q3 is an integer more than or equal to 1, Z1 is a preset value, a value signaled in RRC signaling, or a value signaled in broadcast signaling, and Z1 is an integer more than or equal to 2.

For example, when a "UE 1" receives indication signaling of "DCI" carrying information field of one bit for each sub-band group, then when a flag bit corresponding to an information field of one bit for a "sub-band group 1" is 1, then the "UE 1" determines based upon the flag bit that a time domain start position of a downlink data channel in L number of downlink TTIs in the "sub-band group 1" is the third time unit; and when the flag bit corresponding to the information field of one bit for the "sub-band group 1" is 0, then the "UE 1" determines based upon the flag bit that a time domain start position of a downlink data channel in L number of downlink TTIs in the "sub-band group 1" is the first time unit, where the preset value is 3.

The UE determines respectively based upon a flag bit corresponding to each information field of one bit among information field of Q4 bits carried in the indication signaling that a time domain start position of a downlink data channel in L number of downlink TTIs in a corresponding sub-band group is the first time unit or the Z2-th time unit, where the indication signaling is RRC signaling carrying the information field of Q4 bits, Q4 is the number of sub-band groups, Q4 is an integer more than or equal to 1, Z2 is a preset value, a value signaled in RRC signaling, or a value signaled in broadcast signaling, and Z2 is an integer more than or equal to 2.

For example, when a "UE 2" receives indication signaling of "RRC signaling" carrying information field of one bit for each sub-band group, then when a flag bit corresponding to an information field of one bit for a "sub-band group 2" is 1, then the "UE 2" determines based upon the flag bit that a time domain start position of a downlink data channel in L number of downlink TTIs in the "sub-band group 2" is the third time unit; and when the flag bit corresponding to the information field of one bit for the "sub-band group 2" is 0, the "UE 2" determines based upon the flag bit that a time domain start position of a downlink data channel in L downlink TTIs in the "sub-band group 2" is the first time unit, where the value signaled in the RRC signaling is 3.

The UE determines respectively based upon a flag bit corresponding to each information bit among information field of Q5 bits carried in the indication signaling that a time domain start position of a downlink data channel in L number of downlink TTIs in a corresponding sub-band group is the first time unit or the Z3-th time unit, where the indication signaling is broadcast signaling carrying the information field of Q5 bits, Q5 is the number of sub-band groups, Q5 is an integer more than or equal to 1, Z3 is a preset value, a value signaled in RRC signaling, or a value signaled in broadcast signaling, and Z3 is an integer more than or equal to 2.

For example, when a "UE 3" receives indication signaling of "broadcast signaling" carrying information field of one bit for each sub-band group, then when a flag bit corresponding to an information field of one bit for a "sub-band group 3" is 1, then the "UE 3" determines based upon the flag bit that a time domain start position of a downlink data channel in L number of downlink TTIs in the "sub-band group 3" is the third time unit; and when the flag bit corresponding to the information field of one bit for the "sub-band group 3" is 0, the "UE 3" determines based upon the flag bit that a time domain start position of a downlink data channel in L number of downlink TTIs in the "sub-band group 3" is the first time unit, where the value signaled in the broadcast signaling is 3.

In a third instance, the UE determines a time domain start position of a downlink data channel in L number of downlink TTIs, from the other resource elements than resource elements occupied by DCI corresponding to the other UEs among resource elements for transmitting downlink data, based upon the indication signaling.

Specifically the UE determines a time domain start position of a downlink data channel in L number of downlink TTIs, from the other resource elements than the resource elements occupied by DCI corresponding to the other UEs among the resource elements for transmitting downlink data, based upon the indication signaling, where the UE defaults a time domain start position of a downlink data region as the first time unit in the L number of downlink TTIs, one time unit includes Y number of OFDM symbols, Y is an integer more than or equal to 1, the indication signaling is DCI, and the DCI indicates the resource elements for transmitting downlink data, in the downlink data region in L number of downlink TTIs, and the resource elements occupied by DCI corresponding to the other UEs among the resource elements for transmitting downlink data.

For example, when a "UE 1" receives indication signaling of "DCI 1", where the "DCI 1" indicates that resource elements for transmitting downlink data, in a downlink data region in L downlink TTIs are a "resource element 1", a "resource element 2", and a "resource element 3", and indicates that "DCI 2" corresponding to a "UE 2" occupies the "resource element 2", then the "UE 1" determines a time domain start position of a downlink data channel in L number of downlink TTIs from the "resource element 1" and the "resource element 3" based upon the "DCI 1".

In a fourth instance, the UE determines a time domain start position of a downlink data channel in L number of downlink TTIs based upon scheduling information carried in the indication signaling.

Specifically the UE determines a time domain start position of a downlink data channel in L number of downlink TTIs based upon scheduling information carried in the indication signaling, where the UE defaults a time domain start position of a downlink data region as the (X+1)-th time unit in the L number of downlink TTIs, the indication signaling is DCI carrying the scheduling information, the scheduling information indicates resource elements for transmitting downlink data, in a downlink control region in L number of downlink TTIs, and resource elements for transmitting downlink data, in the downlink data region in L number of downlink TTIs, the downlink control region occupies X time units in the time domain, X is an integer more than or equal to 1, one time unit includes Y number of OFDM symbols, and Y is an integer more than or equal to 1.

For example, when a "UE 1" receives an indication signaling of "DCI 1" carrying "scheduling information 1", and the "scheduling information 1" indicates that a resource element for the "UE 1" to transmit downlink data, in a downlink control region in L number of downlink TTIs is a "resource element 1", and a resource element for the "UE 1" to transmit downlink data, in a downlink data region in L number of downlink TTIs is a "resource element 2", then the "UE 1" determines a time domain start position of a downlink data channel in L number of downlink TTIs from the "resource element 1" and/or the "resource element 2" based upon the "scheduling information 1".

In a fifth instance, the UE determines a time domain start position of a downlink data channel in L number of downlink TTIs in each sub-band group respectively based upon the indication signaling.

In a real application, the UE firstly obtains information field of one bit for each sub-band group from the indication signaling, where the indication signaling is DCI, and each sub-band group includes at least one sub-band.

For example, a "UE 1" obtains information field carrying one bit for a "sub-band group 1", a "sub-band group 2", and a "sub-band group 3" respectively from received "DCI 1".

Next for each specific sub-band group for transmitting the DCI, the UE determines respectively based upon an information field of one bit corresponding to the each specific sub-band group that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, where X is an integer more than or equal to 1, a time unit includes Y number of OFDM symbols, and Y is an integer more than or equal to 1.

For example, when a "sub-band group 1" is a specific sub-band group for transmitting the "DCI 1", and the value of one bit corresponding to the "sub-band group 1" is 1, then the "UE 1" determines a time domain start position of a downlink data channel in L number of downlink TTIs in the "sub-band group 1", from the other resource elements than resource elements occupied for transmitting the "DCI 1", in a downlink control region occupying three time units in the time domain, in the "sub-band group 1".

In another example, when a "sub-band group 2" is a specific sub-band group for transmitting the "DCI 1", and the value of one bit corresponding to the "sub-band group 2" is 0, then the "UE 1" determines a time domain start position of a downlink data channel in L number of downlink TTIs in the corresponding specific sub-band group as the first resource element after a downlink control region occupying X number of time units in the time domain, in the L number of downlink TTIs in the "sub-band group 2".

Furthermore for each non-specific sub-band group on which the DCI is not transmitted, the UE determines respectively based upon an information field of one bit corresponding to the each non-specific sub-band group that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

For example, when a "sub-band group 3" is a non-specific sub-band group on which the "DCI" is not transmitted, and the value of one bit corresponding to the "sub-band group 3" is 1, then the "UE 1" determines a time domain start position of a downlink data channel in L number of downlink TTIs in the "sub-band group 3" as the first time unit in a downlink control region occupying five time units in the time domain, in the "sub-band group 3".

In another example, when a "sub-band group 4" is a non-specific sub-band group on which the "DCI" is not transmitted, and the value of one bit corresponding to the "sub-band group 4" is 0, then the "UE 1" determines a time domain start position of a downlink data channel in L number of downlink TTIs in the "sub-band group 4" as the first resource element after a downlink control region occupying X number of time units in the time domain, in the L number of downlink TTIs in the "sub-band group 4".

A time domain start position of a downlink data channel has been determined as described above by transmitting the indication signaling from the base station to the UE to instruct the UE to receive downlink data in a specific region, and a time domain start position of a downlink data channel will be determined as described below by the UE receiving DCI through blind detection, and determining a time domain start position of a downlink data channel according to the received DCI.

Figure 2:
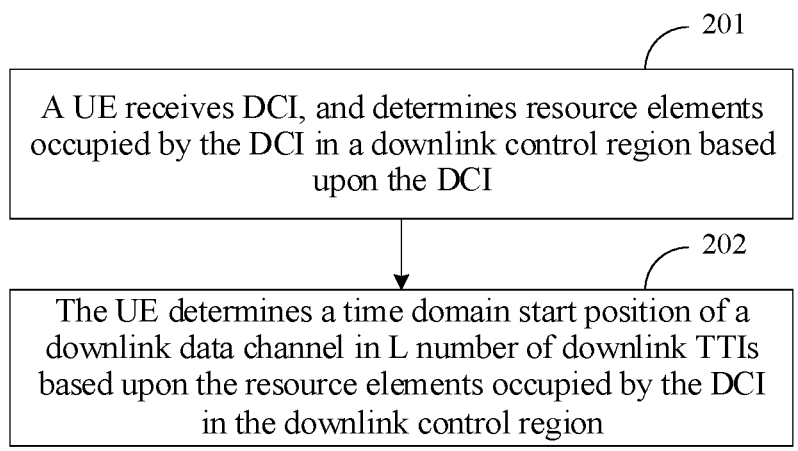
FIG. 2 is a schematic flow chart of a second method for determining a start position of a downlink data channel according to an embodiment of the invention.

As illustrated in FIG. 2, a detailed flow of a method for determining a start position of a downlink data channel according to an embodiment of the invention is as follows.

In the step 201, a UE receives DCI, and determines resource elements occupied by the DCI in a downlink control region based upon the DCI.

In the step 202, the UE determines a time domain start position of a downlink data channel in L number of downlink TTIs based upon the resource elements occupied by the DCI in the downlink control region, where L is an integer more than or equal to 1.

Specifically the UE determines specific sub-band group and non-specific sub-band group based upon the resource element occupied by the DCI in the downlink control region, where the specific sub-band group is a sub-band for transmitting DCI, the non-specific sub-band group is a sub-band group on which the DCI is not transmitted, each sub-band group includes at least one sub-band, the UE defaults that a downlink control region in each sub-band group occupies X number of time units in the time domain, one time unit includes Y number of OFDM symbols, X is a preset value, and X and Y are integers more than or equal to 1.

In a real application, the specific sub-band group includes at least one sub-band, and the non-specific sub-band group includes at least one sub-band.

For example, after the UE receives "DCI 1", the UE firstly determines resource elements occupied by the "DCI 1" in the downlink control region, and then determines according to the resource elements occupied by the "DCI 1" in the downlink control region that a "sub-band group 1" and a "sub-band group 3" are specific sub-bands for transmitting the "DCI 1", and the other sub-bands are non-specific sub-band groups on which the "DCI 1" is not transmitted.

For each specific sub-band group, the UE determines a time domain start position of a downlink data channel in L number of downlink TTIs in each specific sub-band group respectively in such a way that a time domain start position of a downlink data channel in L number of downlink TTIs in the specific sub-band group is determined from the other resource elements than the resource elements occupied by the DCI in the downlink control region in the specific sub-band group.

For example, upon reception of the "DCI", if the UE determines that a "sub-band group 1" is a specific sub-band group, and resource elements in a downlink control region in the "sub-band group 1" include a "resource element 1" and a "resource element 2", then the UE can determine that resource elements occupied by the "DCI" in the "sub-band group 1" is the "resource element 1", and determine a time domain start position of a downlink data channel in L number of downlink TTIs in the "sub-band group 1", from the "resource element 2" in the downlink control region in the "sub-band group 1".

For each non-specific sub-band group, the UE determines a time domain start position of a downlink data channel in L number of downlink TTIs in each non-specific sub-band group respectively in the following two implementations without any limitation thereto.

In a first implementation, a time domain start position of a downlink data channel in L number of downlink TTIs in the non-specific sub-band group is determined as the first OFDM symbol in the L number of downlink TTIs in the non-specific sub-band group.

For example, upon reception of the "DCI", if the UE determines that a "sub-band group 2" is a non-specific sub-band group, then the UE can determine a time domain start position of a downlink data channel in L number of downlink TTIs in the "sub-band group 2" as the first OFDM symbol in the L number of downlink TTIs.

In a second implementation, a time domain start position of a downlink data channel in L number of downlink TTIs in the non-specific sub-band group is determined as the (X+1)-th time unit in the L number of downlink TTIs in the non-specific sub-band group.

For example, upon reception of the "DCI", if the UE determines that a "sub-band group 2" is a non-specific sub-band group, then the UE can determine a time domain start position of a downlink data channel in L number of downlink TTIs in the "sub-band group 2" as the (X+1)-th time unit in the L number of downlink TTIs.

The respective embodiments above of the invention will be described below in further details in connection with their particular implementation scenarios.

In a first scenario, the base station notifies the UE of that a time domain start position of a downlink data channel is the X-th time unit in L number of downlink TTIs, where one time unit includes Y number of OFDM symbols.

In the embodiment of the invention, for example, L=1, and a time unit is defined as an OFDM symbol, that is, Y=1; and for example, a slot includes a downlink TTI, and a downlink TTI includes seven OFDM symbols, where a downlink control region occupies two OFDM symbols.

Then the base station can transmit downlink indication signaling (simply indication signaling) to the UE, where the indication signaling carries indication information of one bit, and furthermore, for example, no downlink data are carried in a frequency band in which the indication signaling is carried, that is, the downlink control region and a downlink data region do not overlap with each other in the frequency domain.

The UE determines a time domain start position of a downlink data channel in one downlink TTI based upon the indication information of one bit carried in the indication signaling transmitted by the base station upon reception of the indication signaling.

Figure 3A:
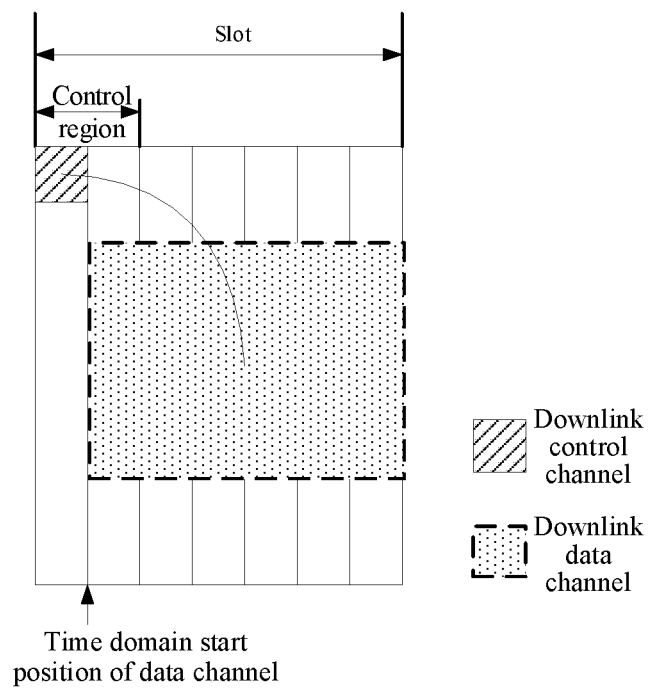
FIG. 3a to FIG. 3c are schematic diagrams of determining a start position of a downlink data channel in a first implementation scenario according to an embodiment of the invention.

As illustrated in FIG. 3a, for example, a downlink control region occupies the first two OFDM symbols in a downlink TTI in the entire bandwidth, so the base station can transmit indication signaling to the UE in at least one of the these two OFDM symbols, and when the value of indication information of one bit carried in the indication signaling is 0, it indicates that the base station notifies the UE of that a time domain start position of a downlink data channel in one downlink TTI is the second OFDM symbol.

Figure 3B:
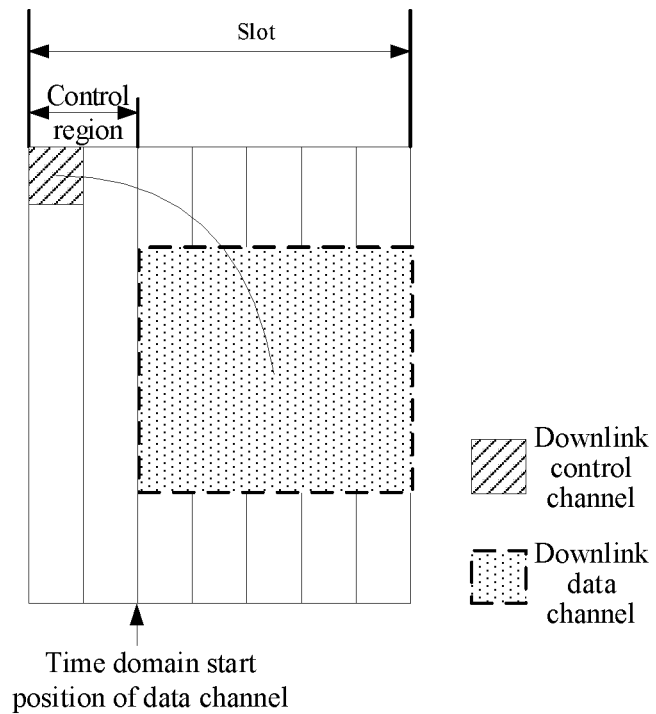

As illustrated in FIG. 3b, in another example, a downlink control region occupies the first two OFDM symbols in a downlink TTI in the entire bandwidth, so the base station can transmit indication signaling to the UE in at least one of the these two OFDM symbols, and when the value of indication information of one bit carried in the indication signaling is 1, it indicates that the base station notifies the UE of that a time domain start position of a downlink data channel in one downlink TTI is the third OFDM symbol.

Figure 3C:
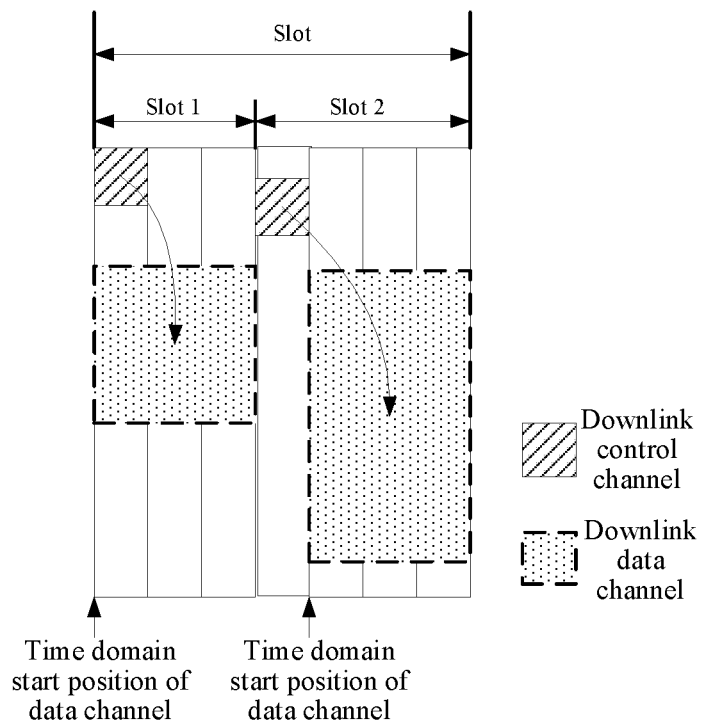

As illustrated in FIG. 3c, in still another example, a slot can be further divided into two mini-slots, i.e., a slot 1 and a slot 2, where the slot 1 occupies the first, second, and third OFDM symbols, and the slot 2 occupies the fourth, fifth, sixth, and seventh OFDM symbols; and a downlink control region occupies the first OFDM symbol and the fourth OFDM symbol in a downlink TTI in the entire bandwidth, i.e., the respective first OFDM symbols in the slot 1 and the slot 2.

Then the base station can transmit indication signaling to the UE respectively in the first OFDM symbol and the fourth OFDM symbol, where indication information of one bit carried in the indication signaling transmitted in the first OFDM symbol indicates that the base station notifies the UE of that a time domain start position of a downlink data channel in the slot 1 is the first OFDM symbol; and indication information of one bit carried in the indication signaling transmitted in the fourth OFDM symbol indicates that the base station notifies the UE of that a time domain start position of a downlink data channel in the slot 2 is the fifth OFDM symbol.

Of course, the indication signaling can be any one of DCI, RRC signaling, or broadcast signaling.

In a second scenario, the base station notifies the UE of that a time domain start position of a downlink data channel is the X-th time unit in L number of downlink TTIs, where a time unit includes Y number of OFDM symbols.

In the embodiment of the invention, for example, L=1, and a time unit is defined as an OFDM symbol, that is, Y=1; and for example, a slot includes a downlink TTI, and a downlink TTI includes seven OFDM symbols, where a downlink control region occupies two OFDM symbols.

Then the base station can transmit indication signaling to the UE, where the indication signaling carries indication information of one bit, and furthermore, for example, downlink data are carried in a frequency band in which the indication signaling is carried, that is, the downlink control region and a downlink data region overlap with each other in the frequency domain.

The UE determines a time domain start position of a downlink data channel in one downlink TTI based upon the indication information of one bit carried in the indication signaling transmitted by the base station upon reception of the indication signaling.

Figure 4A:
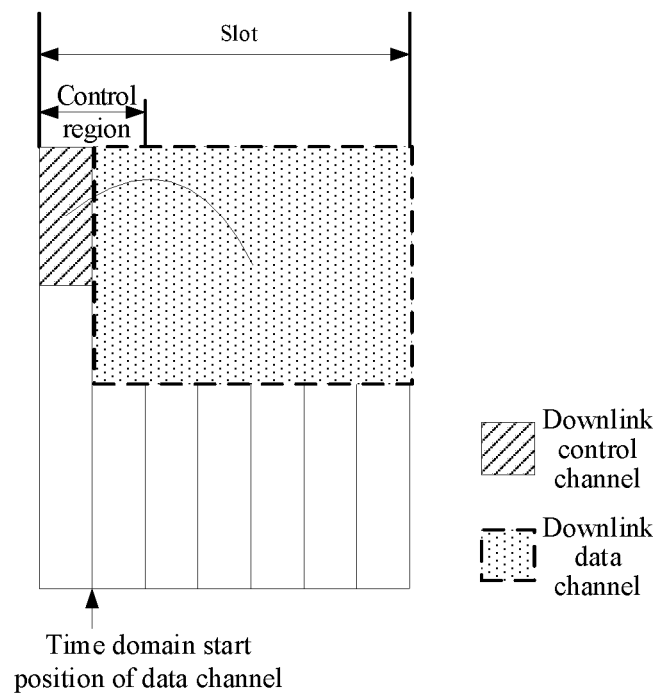
FIG. 4a to FIG. 4c are schematic diagrams of determining a start position of a downlink data channel in a second implementation scenario according to an embodiment of the invention.

As illustrated in FIG. 4a, for example, a downlink control region occupies the first two OFDM symbols in a downlink TTI in the entire bandwidth, so the base station can transmit indication signaling to the UE in at least one of the these two OFDM symbols, and when the value of indication information of one bit carried in the indication signaling is 0, it indicates that the base station notifies the UE of that a time domain start position of a downlink data channel in one downlink TTI is the second OFDM symbol.

Figure 4B:
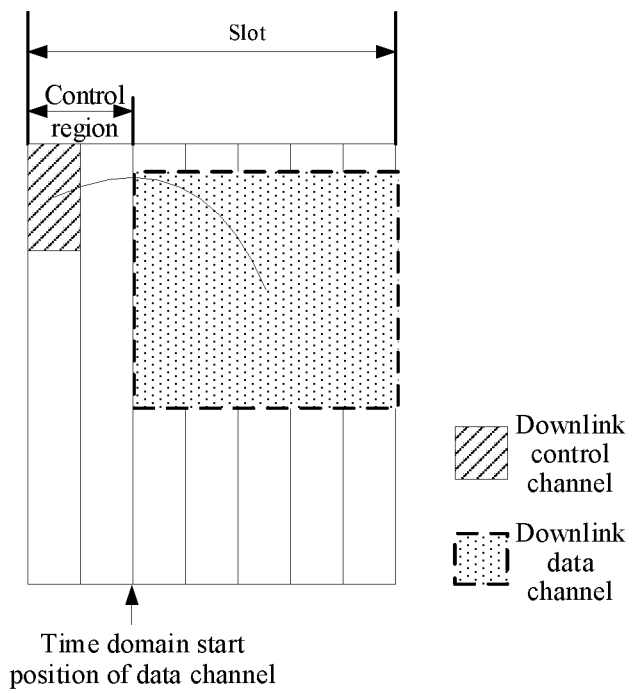

As illustrated in FIG. 4b, in another example, a downlink control region occupies the first two OFDM symbols in a downlink TTI in the entire bandwidth, so the base station can transmit indication signaling to the UE in at least one of the these two OFDM symbols, and when the value of indication information of one bit carried in the indication signaling is 1, it indicates that the base station notifies the UE of that a time domain start position of a downlink data channel in one downlink TTI is the third OFDM symbol.

Figure 4C:
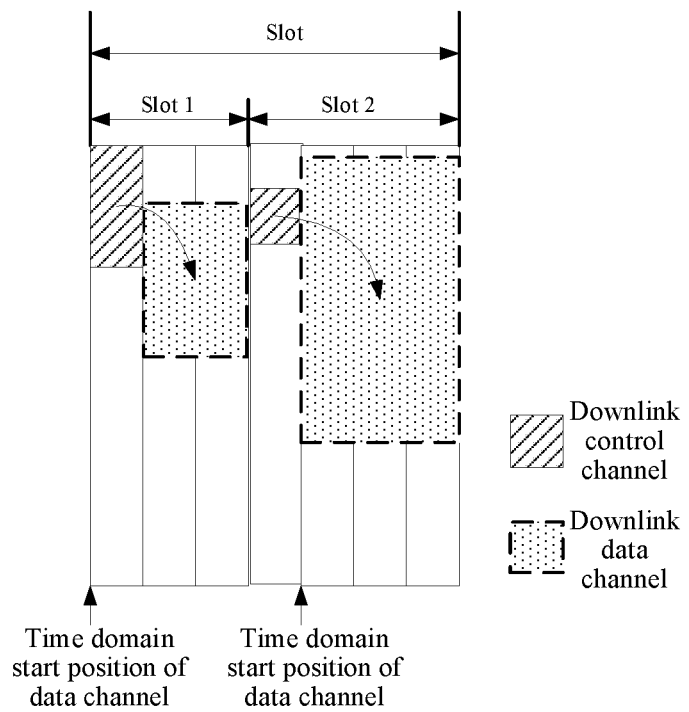

As illustrated in FIG. 4c, in still another example, a slot can be further divided into two mini-slots, i.e., a slot 1 and a slot 2, where the slot 1 occupies the first, second, and third OFDM symbols, and the slot 2 occupies the fourth, fifth, sixth, and seventh OFDM symbols; and a downlink control region occupies the first OFDM symbol and the fourth OFDM symbol in a downlink TTI in the entire bandwidth, i.e., the respective first OFDM symbols in the slot 1 and the slot 2.

Then the base station can transmit indication signaling to the UE respectively in the first OFDM symbol and the fourth OFDM symbol, where indication information of one bit carried in the indication signaling transmitted in the first OFDM symbol indicates that the base station notifies the UE of that a time domain start position of a downlink data channel in the slot 1 is the second OFDM symbol; and indication information of one bit carried in the indication signaling transmitted in the fourth OFDM symbol indicates that the base station notifies the UE of that a time domain start position of a downlink data channel in the slot 2 is the fifth OFDM symbol.

Of course, the indication signaling can be any one of DCI, RRC signaling, or broadcast signaling.

In a third scenario, the base station notifies the UE of that a time domain start position of a downlink data channel in L number of downlink TTIs in each sub-band group is a specified time unit, where a time unit includes Y number of OFDM symbols.

In the embodiment of the invention, for example, a slot includes L number of downlink TTIs, a downlink TTI includes Y number of OFDM symbols, and the entire bandwidth is divided into Q sub-band groups, where L, Q, and Y are integers more than or equal to 1, and each sub-band group includes at least one sub-band.

Then the base station can transmit indication signaling to the UE, where the indication signaling carries indication information of Q*N bits, N is an integer more than or equal to 1, and a piece of indication information of N bits indicates that a time domain start position of a downlink data channel in L number of downlink TTIs in a corresponding sub-band group is a specified time unit.

The UE determines that downlink data are only transmitted in a sub-band group carrying the indication signaling, based upon the indication signaling transmitted by the base station upon reception of the indication signaling, and then determines a time domain start position of a downlink data channel in the L number of downlink TTIs, that is, N=1.

Figure 5A:
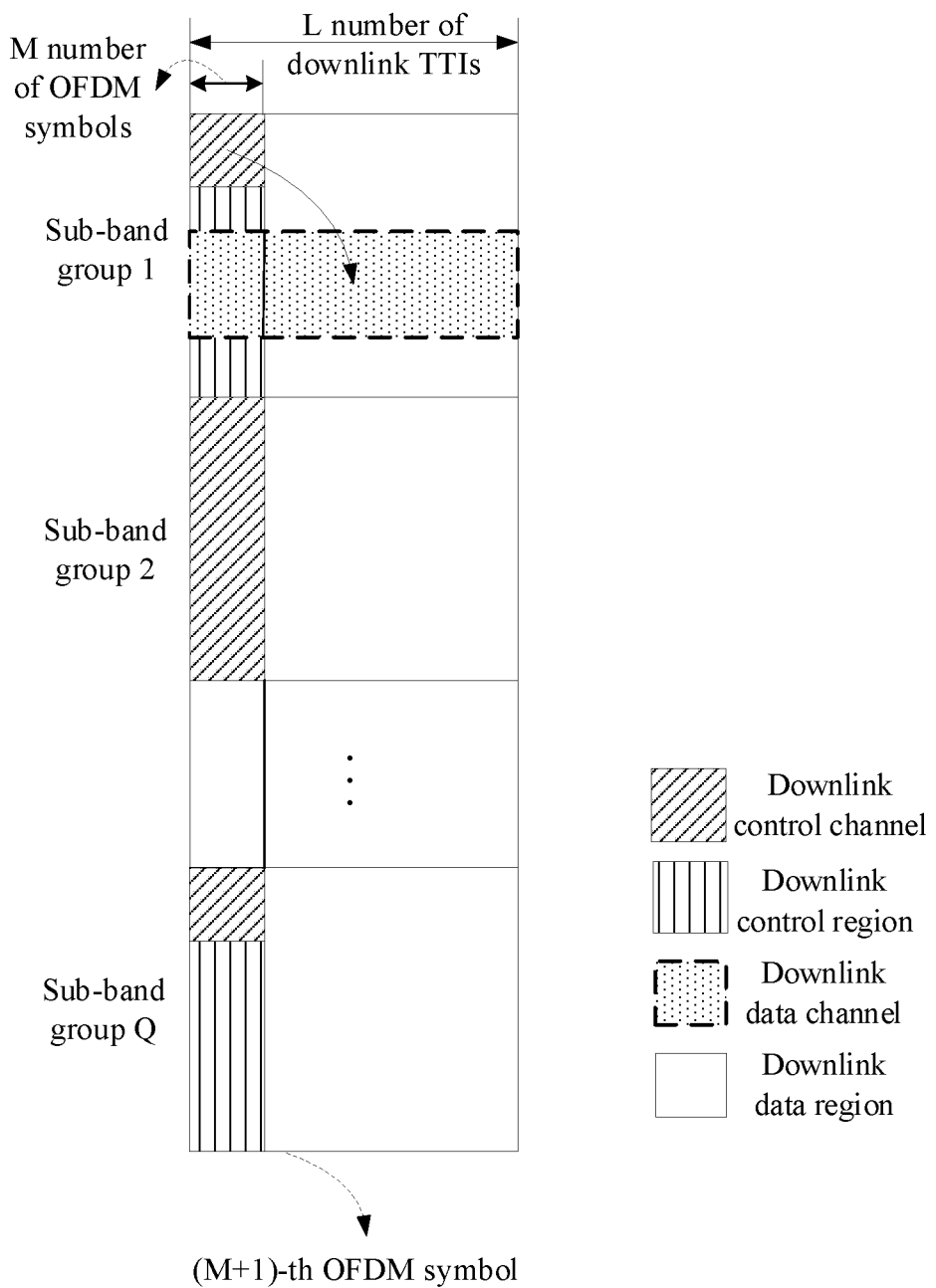
FIG. 5a and FIG. 5b are schematic diagrams of determining a start position of a downlink data channel in a third implementation scenario according to an embodiment of the invention.

As illustrated in FIG. 5a, for example, a downlink control region occupies M number of OFDM symbols in the entire bandwidth, where M is an integer more than or equal to 1, the base station can transmit indication signaling to the UE in these M number of OFDM symbols, and downlink data are carried in a frequency band in which the indication signaling is carried, that is, the downlink control region and a downlink data region overlap with each other in the frequency domain, so indication information carried in the indication signaling indicates that a time domain start position of a downlink data channel in L number of downlink TTIs in a sub-band group (i.e., a sub-band group 1) carrying the indication signaling is the (M+1)-th OFDM symbol.

Figure 5B:
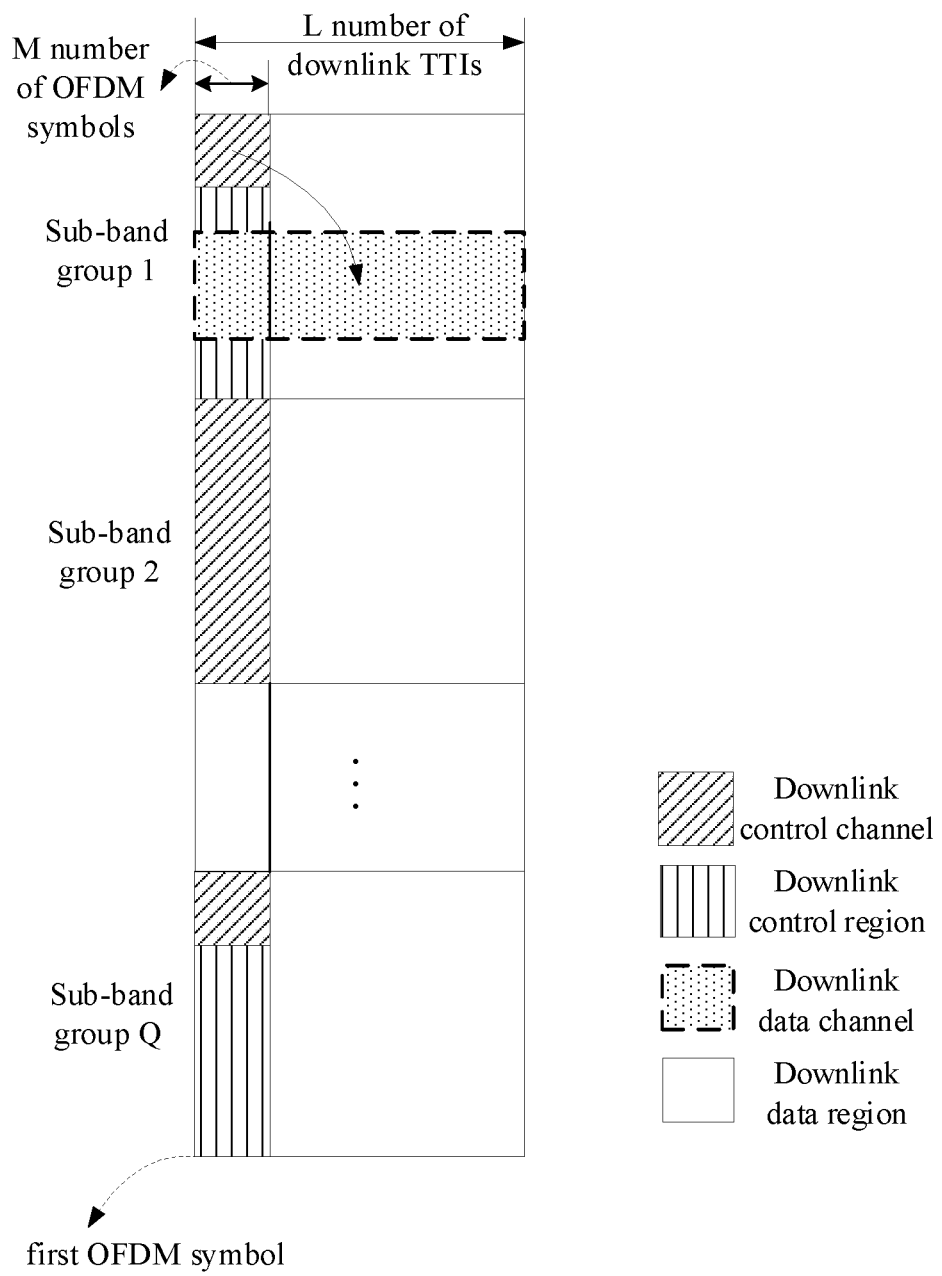

As illustrated in FIG. 5b, in another example, a downlink control region occupies M number of OFDM symbols in the entire bandwidth, where M is an integer more than or equal to 1, the base station can transmit indication signaling to the UE in these M number of OFDM symbols, and no downlink data are carried in a frequency band in which the indication signaling is carried, that is, the downlink control region and a downlink data region do overlap with each other in the frequency domain, so indication information carried in the indication signaling indicates that a time domain start position of a downlink data channel in L number of downlink TTIs in a sub-band group carrying the indication signaling is the first OFDM symbol.

In a fourth scenario, the base station notifies the UE of that a time domain start position of a downlink data channel in L number of downlink TTIs in each sub-band group is a specified time unit, where a time unit includes Y number of OFDM symbols.

In the embodiment of the invention, for example, a slot includes L number of downlink TTIs, a downlink TTI includes Y number of OFDM symbols, and the entire bandwidth is divided into Q sub-band groups, where L, Q, and Y are integers more than or equal to 1, and each sub-band group includes at least one sub-band.

Then the base station can transmit indication signaling to the UE, where the indication signaling carries indication information of Q*N bits, N is an integer more than or equal to 1, and a piece of indication information of N bits indicates that a time domain start position of a downlink data channel in L number of downlink TTIs in a corresponding sub-band group is a specified time unit.

The UE determines that downlink data are only transmitted in a sub-band group carrying the indication signaling, based upon the indication signaling transmitted by the base station upon reception of the indication signaling, and then determines a time domain start position of a downlink data channel in the L number of downlink TTIs.

Figure 6A:
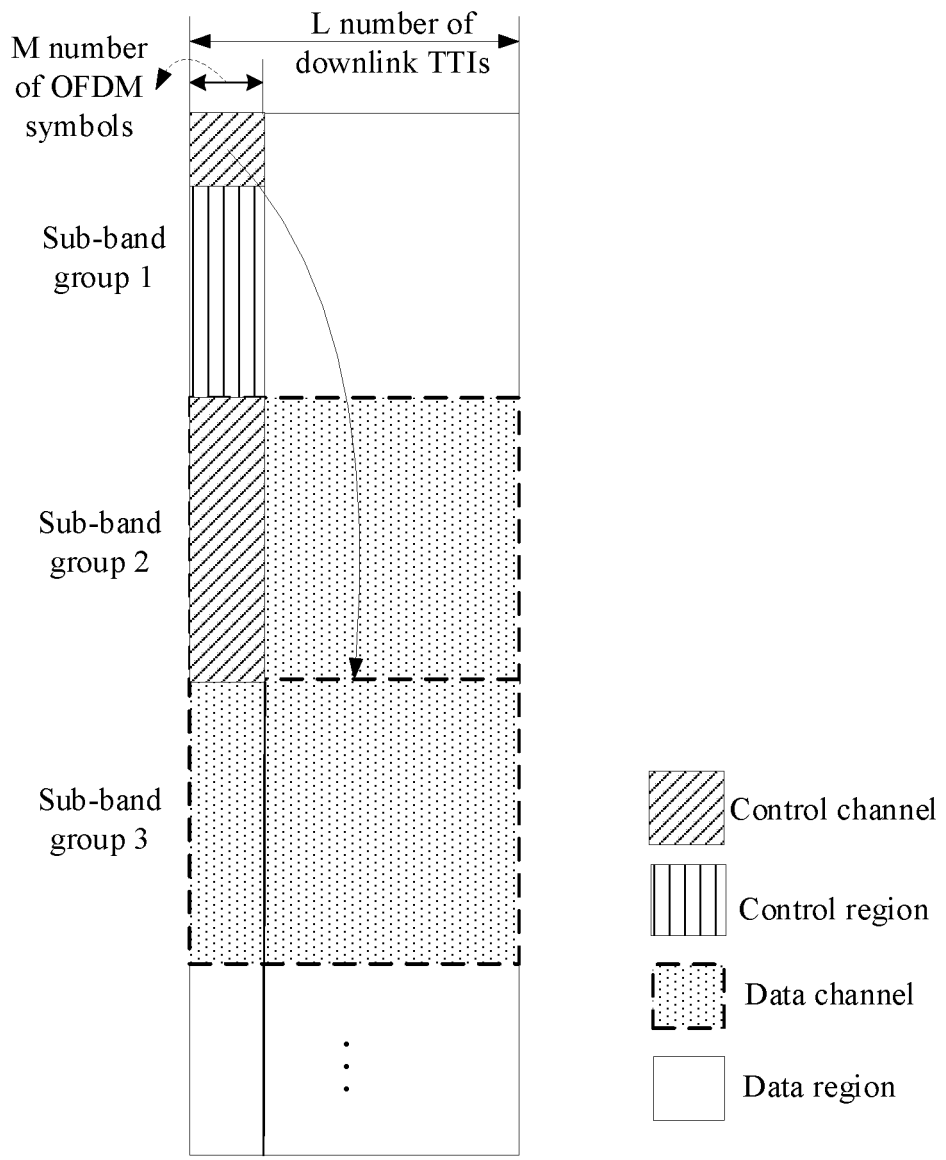
FIG. 6a and FIG. 6b are schematic diagrams of determining a start position of a downlink data channel in a fourth implementation scenario according to an embodiment of the invention.

As illustrated in FIG. 6a, for example, a downlink control region occupies M number of OFDM symbols in the entire bandwidth, where M is an integer more than or equal to 1, and the base station can transmit indication signaling to the UE in these M number of OFDM symbols, so indication information carried in the indication signaling indicates that a time domain start position of a downlink data channel in L number of downlink TTIs in a sub-band group (i.e., a sub-band group 2) which does not carry the indication signaling but carries indication signaling corresponding to another UE is the (M+1)-th OFDM symbol, and a time domain start position of a downlink data channel in L number of downlink TTIs in a sub-band group (i.e., a sub-band group 3) carrying neither the indication signaling nor indication signaling corresponding to any other UE is the first OFDM symbol.

Figure 6B:
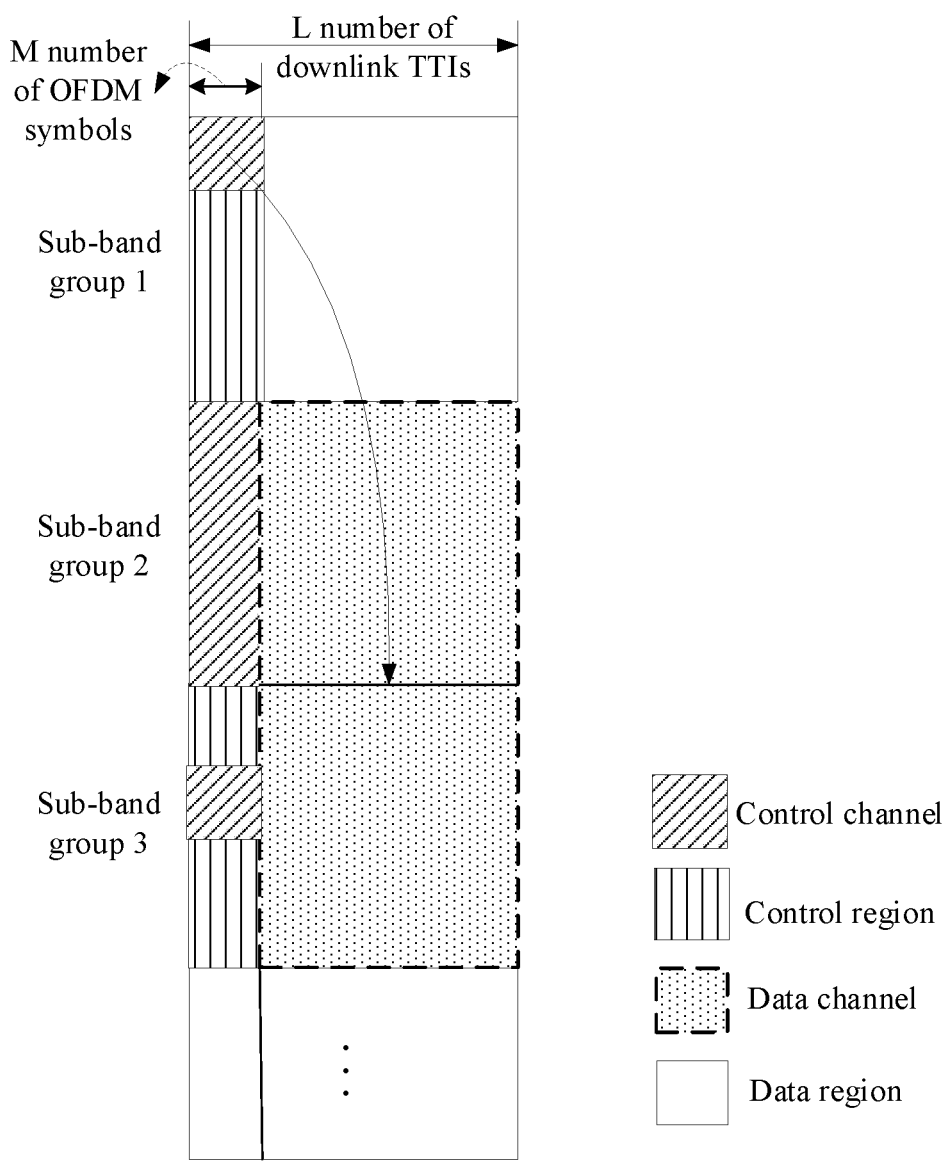

As illustrated in FIG. 6b, for example, a downlink control region occupies M number of OFDM symbols in the entire bandwidth, where M is an integer more than or equal to 1, and the base station can transmit indication signaling to the UE in these M number of OFDM symbols, so indication information carried in the indication signaling indicates that a time domain start position of a downlink data channel in L number of downlink TTIs in a sub-band group (i.e., a sub-band group 2 and a sub-band group 3) which does not carry the indication signaling but carries indication signaling corresponding to another UE is the (M+1)-th OFDM symbol.

Of course, the indication signaling can be any one of DCI, RRC signaling, or broadcast signaling.

In a fifth scenario, the base station notifies the UE of that a time domain start position of a downlink data channel in L number of downlink TTIs in each sub-band group is a specified time unit, where a time unit includes Y number of OFDM symbols, and the UE defaults a start position of a downlink data region is the first OFDM symbol in L number of downlink TTIs.

In the embodiment of the invention, for example, L number of downlink TTIs include M number of OFDM symbols, and the entire bandwidth is divided into Q sub-band groups, where L, M, and Q are integers more than or equal to 1, and each sub-band group includes at least one sub-band.

Then the base station can transmit indication signaling to the UE, where the indication signaling carries indication information of Q bits, N is an integer more than or equal to 1, and a piece of indication information of one bit indicates that a time domain start position of a downlink data channel in L number of downlink TTIs in a corresponding sub-band group is the first time unit or the Z-th time unit, where Z is a predefined value, a value signaled in RRC signaling, or a value signaled in broadcast signaling.

The UE determines a time domain start position of a downlink data channel in L number of downlink TTIs in each sub-band group respectively based upon the indication information of one bit carried in the indication signaling transmitted by the base station upon reception of the indication signaling.

Figure 7A:
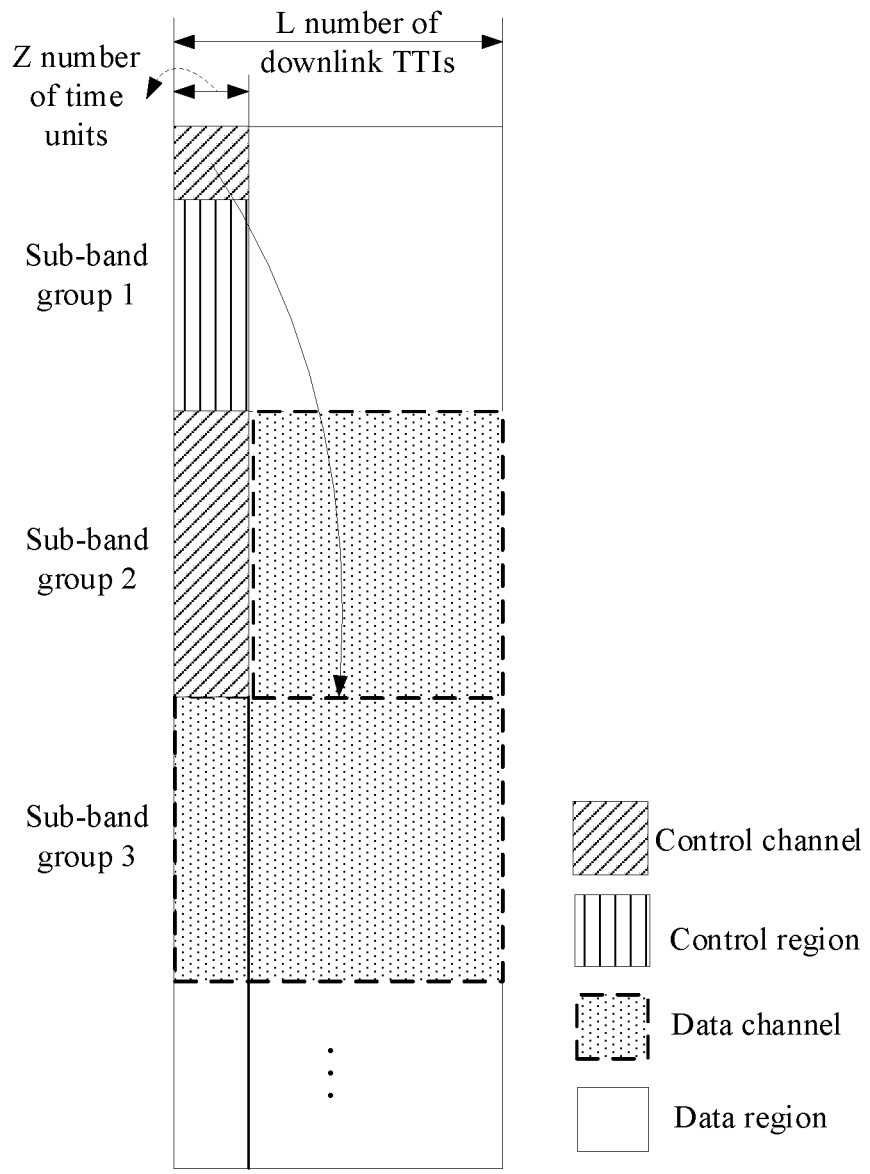
FIG. 7a to FIG. 7c are schematic diagrams of determining a start position of a downlink data channel in a fifth implementation scenario according to an embodiment of the invention.

As illustrated in FIG. 7a, for example, the entire bandwidth is divided into Q sub-band groups (e.g., a sub-band group 1, a sub-band group 2, a sub-band group 3, . . . , and a sub-band group Q), a downlink control region occupies Z OFDM symbols in each sub-band group, where Z is an integer more than or equal to 1, the base station can transmit indication signaling to the UE in at least one of these Z OFDM symbols, the indication signaling is carried in the sub-band group 1 and the sub-band group 2, and the indication signaling is not carried in the sub-band group 3, so indication information of one bit, corresponding to the sub-band group 2, carried in the indication signaling indicates that a time domain start position of a downlink data channel in L number of downlink TTIs in the corresponding sub-band group 2 is the Z-th OFDM symbol, and indication information of one bit, corresponding to the sub-band group 3, carried in the indication signaling indicates that a time domain start position of a downlink data channel in L number of downlink TTIs in the corresponding sub-band group 3 is the first OFDM symbol.

Figure 7B:
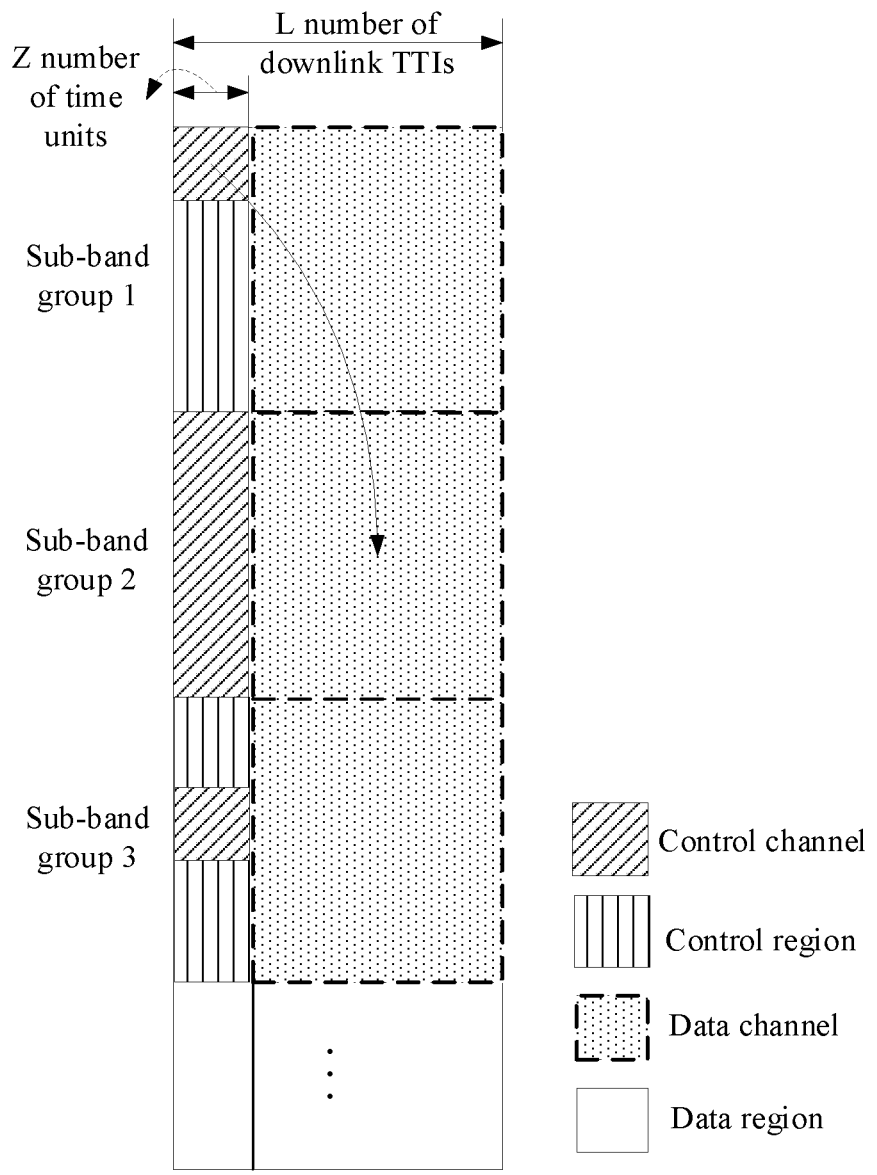

As illustrated in FIG. 7b, in another example, the entire bandwidth is divided into Q sub-band groups (e.g., a sub-band group 1, a sub-band group 2, a sub-band group 3, . . . , and a sub-band group Q), a downlink control region occupies Z OFDM symbols in each sub-band group, where Z is an integer more than or equal to 1, the base station can transmit indication signaling to the UE in at least one of these Z OFDM symbols, and the indication signaling is carried in all of the sub-band group 1, the sub-band group 2, and the sub-band group 3, so indication information of one bit, corresponding to the sub-band group 1, carried in the indication signaling indicates that a time domain start position of a downlink data channel in L number of downlink TTIs in the corresponding sub-band group 1 is the Z-th OFDM symbol, indication information of one bit, corresponding to the sub-band group 2, carried in the indication signaling indicates that a time domain start position of a downlink data channel in L number of downlink TTIs in the corresponding sub-band group 2 is the Z-th OFDM symbol, and indication information of one bit, corresponding to the sub-band group 3, carried in the indication signaling indicates that a time domain start position of a downlink data channel in L number of downlink TTIs in the corresponding sub-band group 3 is the Z-th OFDM symbol.

Figure 7C:
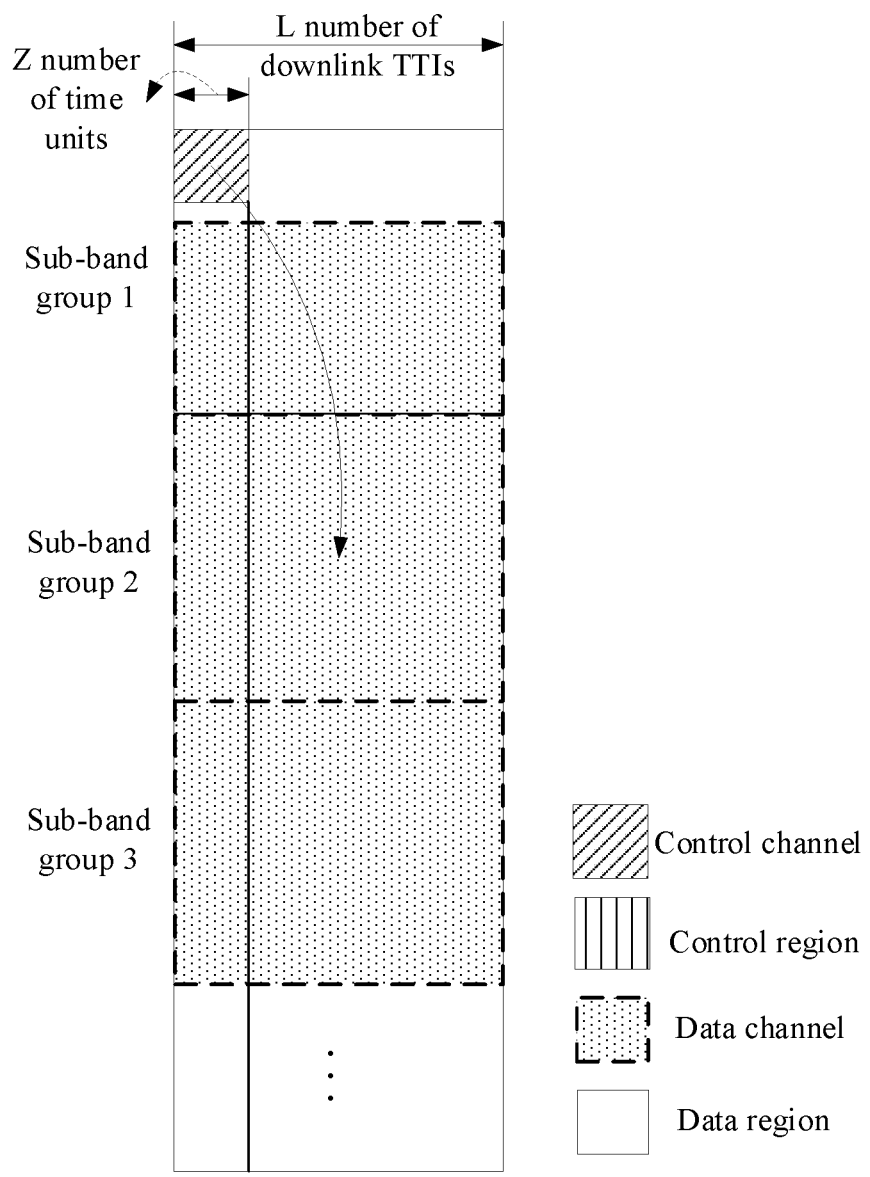

As illustrated in FIG. 7c, in still another example, the entire bandwidth is divided into Q sub-band groups (e.g., a sub-band group 1, a sub-band group 2, a sub-band group 3, . . . , and a sub-band group Q), a downlink control region occupies Z OFDM symbols in each sub-band group, where Z is an integer more than or equal to 1, the base station can transmit indication signaling to the UE in at least one of these Z OFDM symbols, the indication signaling is carried in the sub-band group 1, and the indication signaling is not carried in the sub-band group 2 and the sub-band group 3, so indication information of one bit, corresponding to the sub-band group 1, carried in the indication signaling indicates that a time domain start position of a downlink data channel in L number of downlink TTIs in the corresponding sub-band group 1 is the Z-th OFDM symbol, indication information of one bit, corresponding to the sub-band group 2, carried in the indication signaling indicates that a time domain start position of a downlink data channel in L number of downlink TTIs in the corresponding sub-band group 2 is the Z-th OFDM symbol, and indication information of one bit, corresponding to the sub-band group 3, carried in the indication signaling indicates that a time domain start position of a downlink data channel in L number of downlink TTIs in the corresponding sub-band group 3 is the Z-th OFDM symbol.

Of course, the indication signaling can be any one of DCI, RRC signaling, or broadcast signaling.

In a sixth scenario, the base station notifies the UE of that a time domain start position of a downlink data channel in L number of downlink TTIs in each sub-band group is specified one of the other resource elements than resource elements occupied by DCI corresponding to the other UEs among resource elements for transmitting downlink data.

In the embodiment of the invention, for example, L number of downlink TTIs include M number of OFDM symbols, and the entire bandwidth is divided into Q sub-band groups, where L, M, and Q are integers more than or equal to 1, each sub-band group includes at least one sub-band, a downlink control region occupies X number of time units in the time domain, X is an integer more than or equal to 1, a time unit includes Y number of OFDM symbols, Y is an integer more than or equal to 1, and the UE defaults a time domain start position of a downlink data region as the first time unit in L number of downlink TTIs.

Then the base station can transmit DCI to the UE, where the DCI indicates resource elements for transmitting downlink data, in a downlink data region in L number of downlink TTIs, and resource elements occupied by DCI corresponding to the other UEs among the resource elements for transmitting downlink data.

The UE determines a time domain start position of a downlink data channel in L number of downlink TTIs, from the other resource elements than the resource elements occupied by DCI corresponding to the other UEs among the resource elements for transmitting downlink data based upon indication information carried in the indication signaling transmitted by the base station upon reception of the indication signaling.

Figure 8:
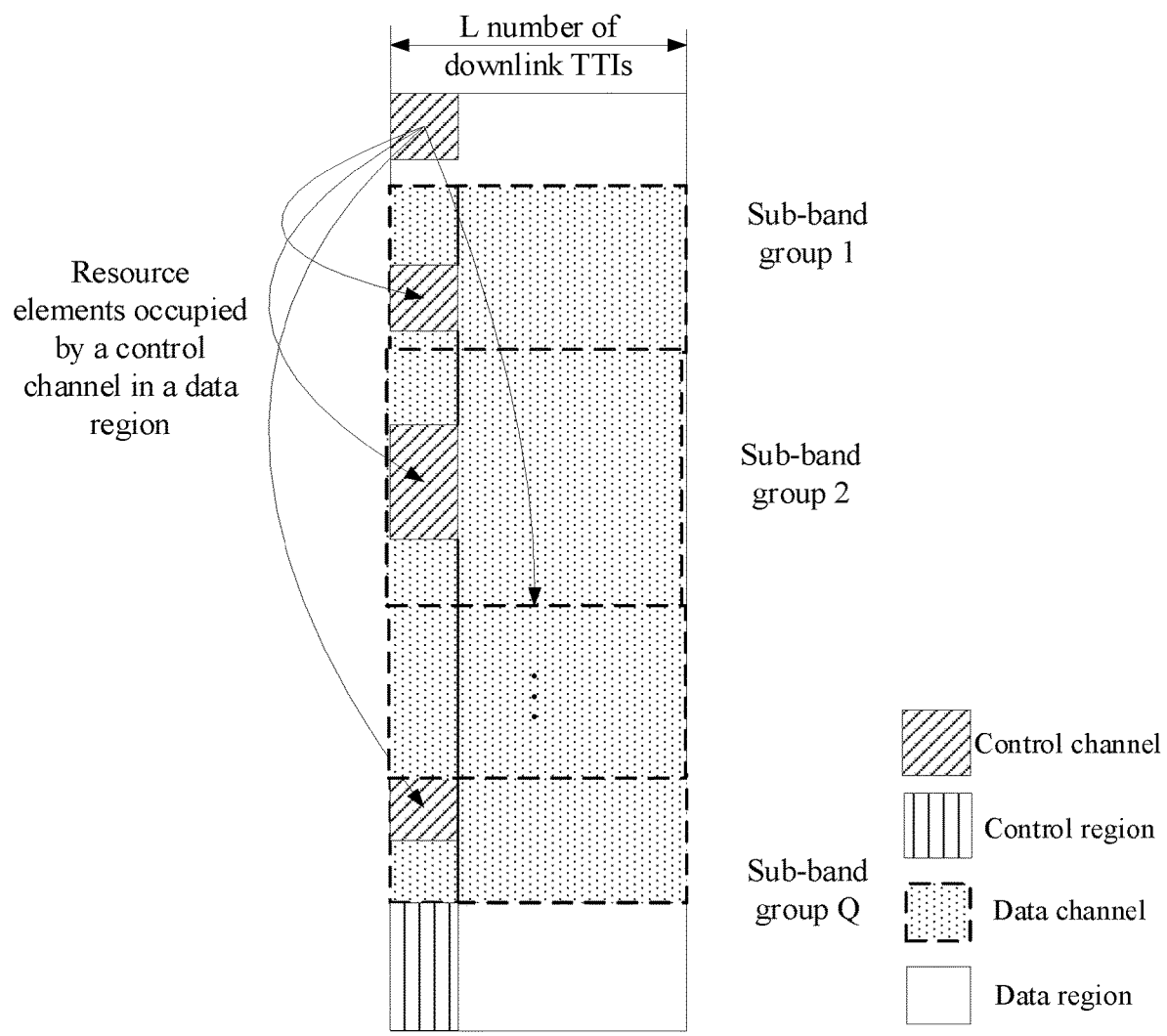
FIG. 8 is a schematic diagram of determining a start position of a downlink data channel in a sixth implementation scenario according to an embodiment of the invention.

As illustrated in FIG. 8, for example, the entire bandwidth is divided into Q sub-band groups (e.g., a sub-band group 1, a sub-band group 2, a sub-band group 3, . . . , and a sub-band group Q), the UE defaults a time domain start position of a downlink data region in L number of downlink TTIs as the first time unit, and the UE receives DCI in the downlink data region, determines resource elements for transmitting downlink data, in the downlink data region in L number of downlink TTIs, and resource elements occupied by DCI corresponding to the other UEs, based upon the DCI, and determines a time domain start position of a downlink data channel in the L number of downlink TTIs, from the other resource elements than the resource elements occupied by DCI corresponding to the other UEs among the resource elements for transmitting downlink data.

In a seventh scenario, the base station notifies the UE of a time domain start position of a downlink data channel in L number of downlink TTIs.

In the embodiment of the invention, for example, L number of downlink TTIs occupy M number of OFDM symbols, and the entire bandwidth is divided into Q sub-band groups, where L, M, and Q are integers more than or equal to 1, each sub-band group includes at least one sub-band, a downlink control region occupies X number of time units in the time domain, X is an integer more than or equal to 1, a time unit includes Y number of OFDM symbols, Y is an integer more than or equal to 1, and the UE defaults a time domain start position of a downlink data region as the (X+1)-th time unit in L number of downlink TTIs.

Then the base station can transmit DCI to the UE, where the DCI carries scheduling information indicating the scheduled UE of resource elements for transmitting downlink data in a downlink control region in L number of downlink TTIs, and indicating the scheduled UE of resource elements for transmitting data in the downlink data region.

The scheduled UE determines a time domain start position of a downlink data channel in L number of downlink TTIs based upon the scheduling information carried in the DCI upon reception of the DCI.

Figure 9:
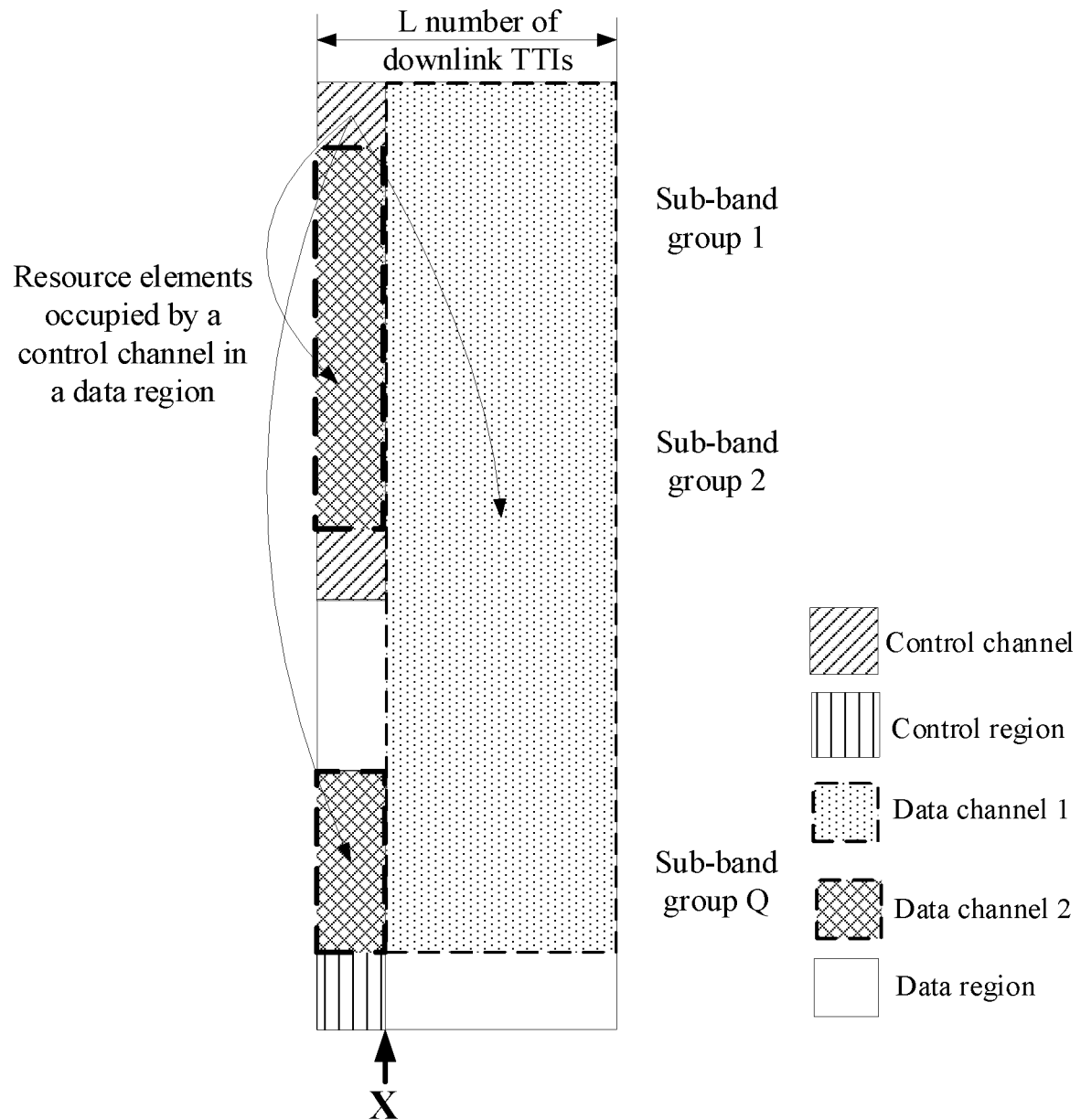
FIG. 9 is a schematic diagram of determining a start position of a downlink data channel in a seventh implementation scenario according to an embodiment of the invention.

As illustrated in FIG. 9, for example, the entire bandwidth is divided into Q sub-band groups (e.g., a sub-band group 1, a sub-band group 2, a sub-band group 3, . . . , and a sub-band group Q), the UE defaults a time domain start position of a downlink data region in L number of downlink TTIs as the (X+1)-th time unit, a downlink data channel of the UE can be transmitted in a sub-band in which a downlink control channel thereof is transmitted, or can be transmitted in a sub-band in which a downlink control channel thereof is not transmitted, and the UE determines that a time domain start position in a downlink control region occupying X time units in the time domain is the first time unit, and a time domain start position in the downlink data region is the (X+1)-th time unit, based upon scheduling information carried in DCI transmitted by the base station upon reception of the DCI. Of course, a downlink data channel of the scheduled UE in L number of downlink TTIs in the downlink control region can not occupy a downlink control channel occupied for transmitting the DCI.

In an eighth scenario, the base station notifies the UE of a time domain start position of a downlink data channel in L number of downlink TTIs in each specific sub-band group, and/or a time domain start position of a downlink data channel in L number of downlink TTIs in each non-specific sub-band group.

In the embodiment of the invention, for example, L number of downlink TTIs include M number of OFDM symbols, and the entire bandwidth is divided into Q sub-band groups, where L, M, and Q are integers more than or equal to 1, each sub-band group includes at least one sub-band, a downlink control region occupies X number of time units in the time domain, X is an integer more than or equal to 1, a time unit includes Y number of OFDM symbols, Y is an integer more than or equal to 1, and the UE defaults a time domain start position of a downlink data region as the (X+1)-th time unit in L number of downlink TTIs.

Then the base station can transmit DCI to the UE, where the DCI is indication information carrying bits, each of which corresponds to one of the sub-band groups.

For each specific sub-band group on which the DCI is transmitted, indication information of one bit corresponding to each specific sub-band group indicates a time domain start position of a downlink data channel in a downlink control region occupying X number of time units in the time domain, in the corresponding specific sub-band group, or a time domain start position of a downlink data channel in L number of downlink TTIs in the downlink data region.

For each non-specific sub-band group on which the DCI is not transmitted, each information field of one bit corresponding to each non-specific sub-band group indicates a time domain start position of a downlink data channel in a downlink control region occupying X number of time units in the time domain, in the corresponding non-specific sub-band group, or a time domain start position of a downlink data channel in L number of downlink TTIs in the downlink data region.

Figure 10A:
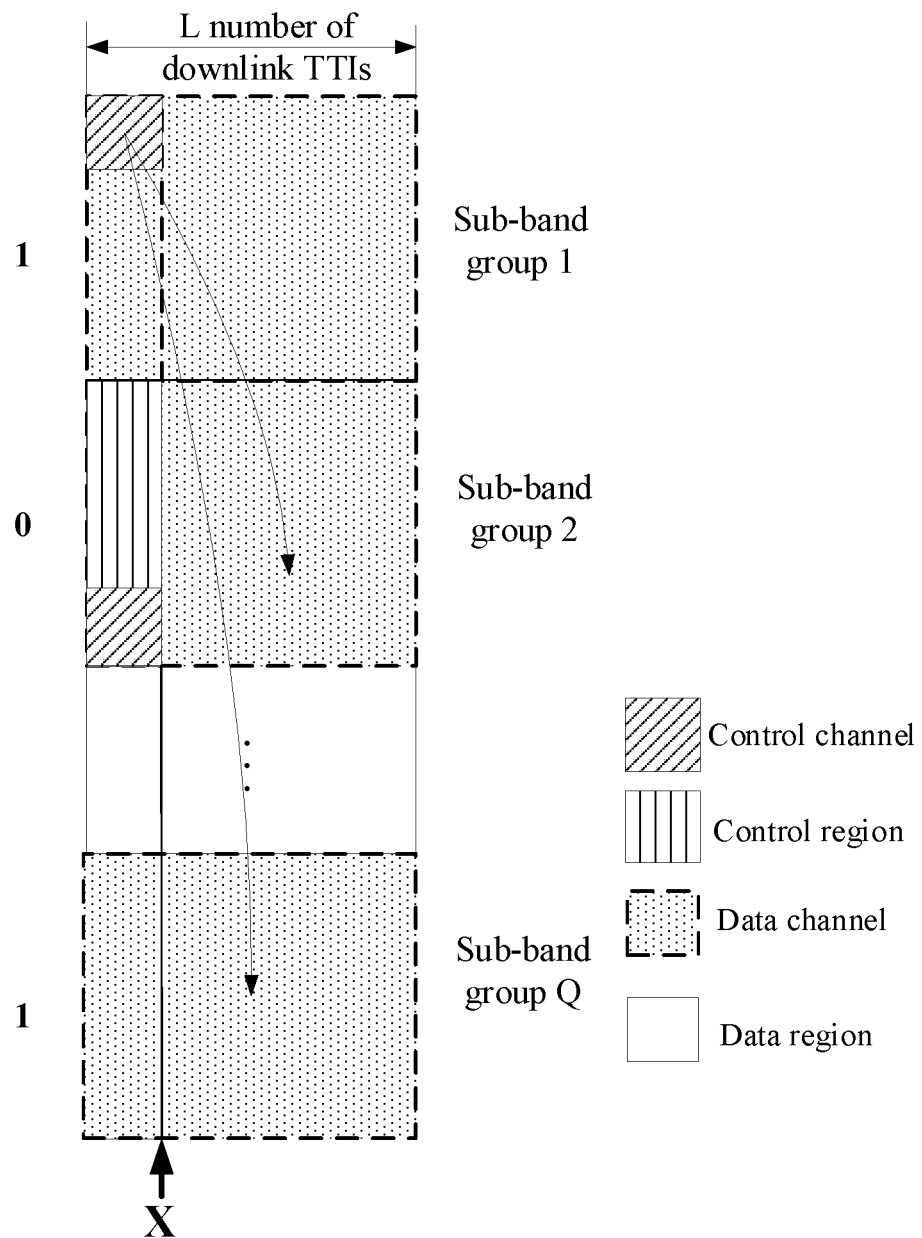
FIG. 10a and FIG. 10b are schematic diagrams of determining a start position of a downlink data channel in an eighth implementation scenario according to an embodiment of the invention.

As illustrated in FIG. 10a, for example, a sub-band group 1 is a specific sub-band group on which DCI is transmitted, and the value of indication information of one bit corresponding to the sub-band group 1 is 1, so a time domain start position of a downlink data channel in L number of downlink TTIs in the sub-band group 1 is the first time unit, and of course, a downlink data channel for transmitting downlink data can not overlap with a downlink control channel for transmitting the DCI; a sub-band group 2 is a specific sub-band group on which the DCI is transmitted, and the value of indication information of one bit corresponding to the sub-band group 2 is 0, so a time domain start position of a downlink data channel in L number of downlink TTIs in the sub-band group 2 is the X-th time unit; and a sub-band group 3 is a non-specific sub-band group on which the DCI is not transmitted, and the value of indication information of one bit corresponding to the sub-band group 3 is 1, so a time domain start position of a downlink data channel in L number of downlink TTIs in the sub-band group 3 is the first time unit.

Figure 10B:
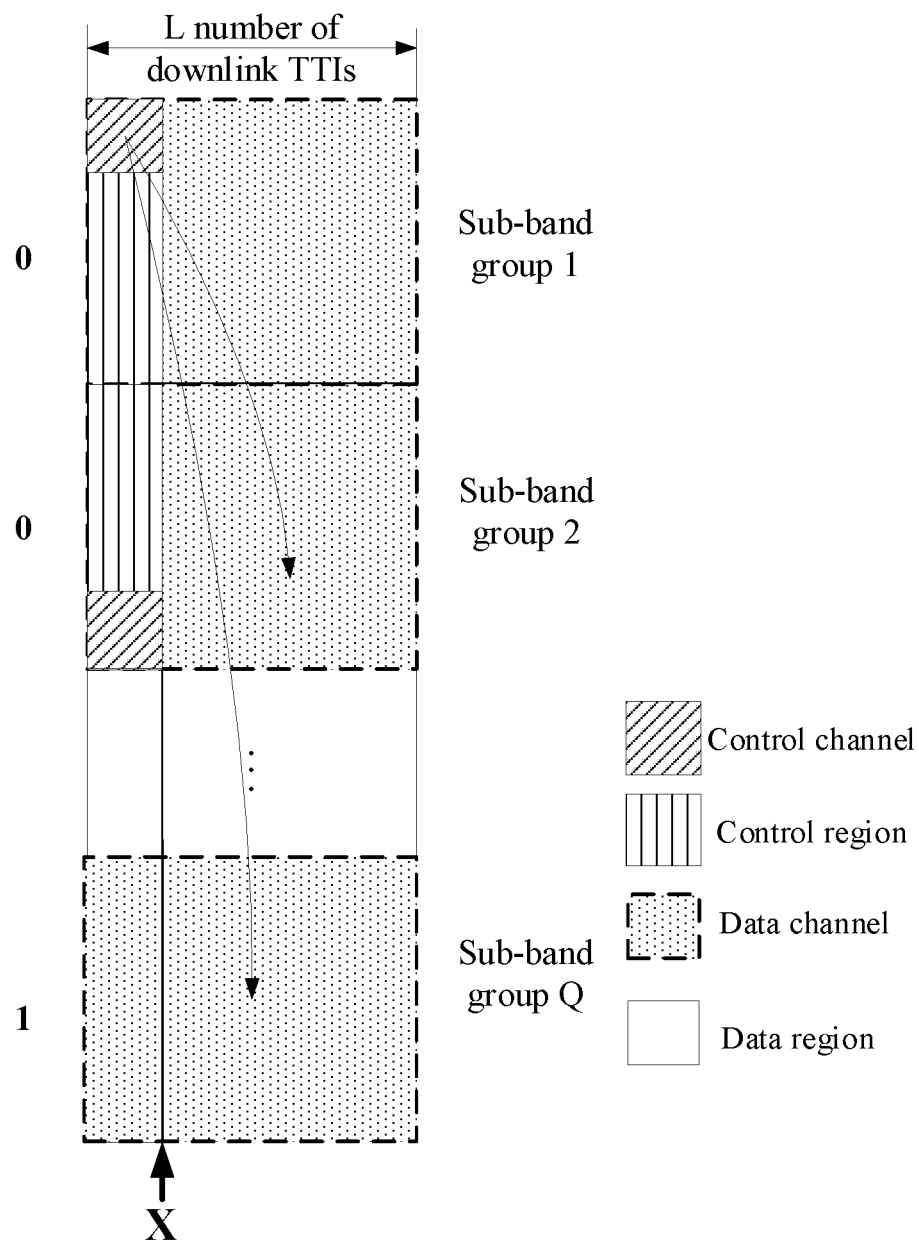

As illustrated in FIG. 10b, in another example, a sub-band group 1 is a specific sub-band group on which DCI is transmitted, and the value of indication information of one bit corresponding to the sub-band group 1 is 0, so a time domain start position of a downlink data channel in L number of downlink TTIs in the sub-band group 1 is the X-th time unit, and of course, a downlink data channel for transmitting downlink data can not overlap with a downlink control channel for transmitting the DCI; a sub-band group 2 is a specific sub-band group on which the DCI is transmitted, and the value of indication information of one bit corresponding to the sub-band group 2 is 0, so a time domain start position of a downlink data channel in L number of downlink TTIs in the sub-band group 2 is the X-th time unit; and a sub-band group 3 is a non-specific sub-band group on which the DCI is not transmitted, and the value of indication information of one bit corresponding to the sub-band group 3 is 1, so a time domain start position of a downlink data channel in L number of downlink TTIs in the sub-band group 3 is the first time unit.

In a ninth scenario, the UE determines resource elements occupied by received DCI in a downlink control region based upon the DCI, and determines a time domain start position of a downlink data channel in L number of downlink TTIs based upon the resource elements occupied by the DCI in the downlink control region, where L is an integer more than or equal to 1.

In the embodiment of the invention, for example, L number of downlink TTIs include M number of OFDM symbols, and the entire bandwidth is divided into Q sub-band groups, where L, M, and Q are integers more than or equal to 1, each sub-band group includes at least one sub-band, a downlink control region occupies X number of time units in the time domain, X is an integer more than or equal to 1, a time unit occupies Y number of OFDM symbols, Y is an integer more than or equal to 1, and the UE defaults a time domain start position of a downlink data region as the (X+1)-th time unit in L number of downlink TTIs.

The UE determines specific sub-band groups on which the DCI is transmitted, and non-specific sub-band groups on which the DCI is not transmitted, based upon the resource elements occupied by the received DCI in the downlink control region, and determines a time domain start position of a downlink data channel in L number of downlink TTIs in each specific sub-band group, and in each non-specific sub-band group.

Figure 11A:
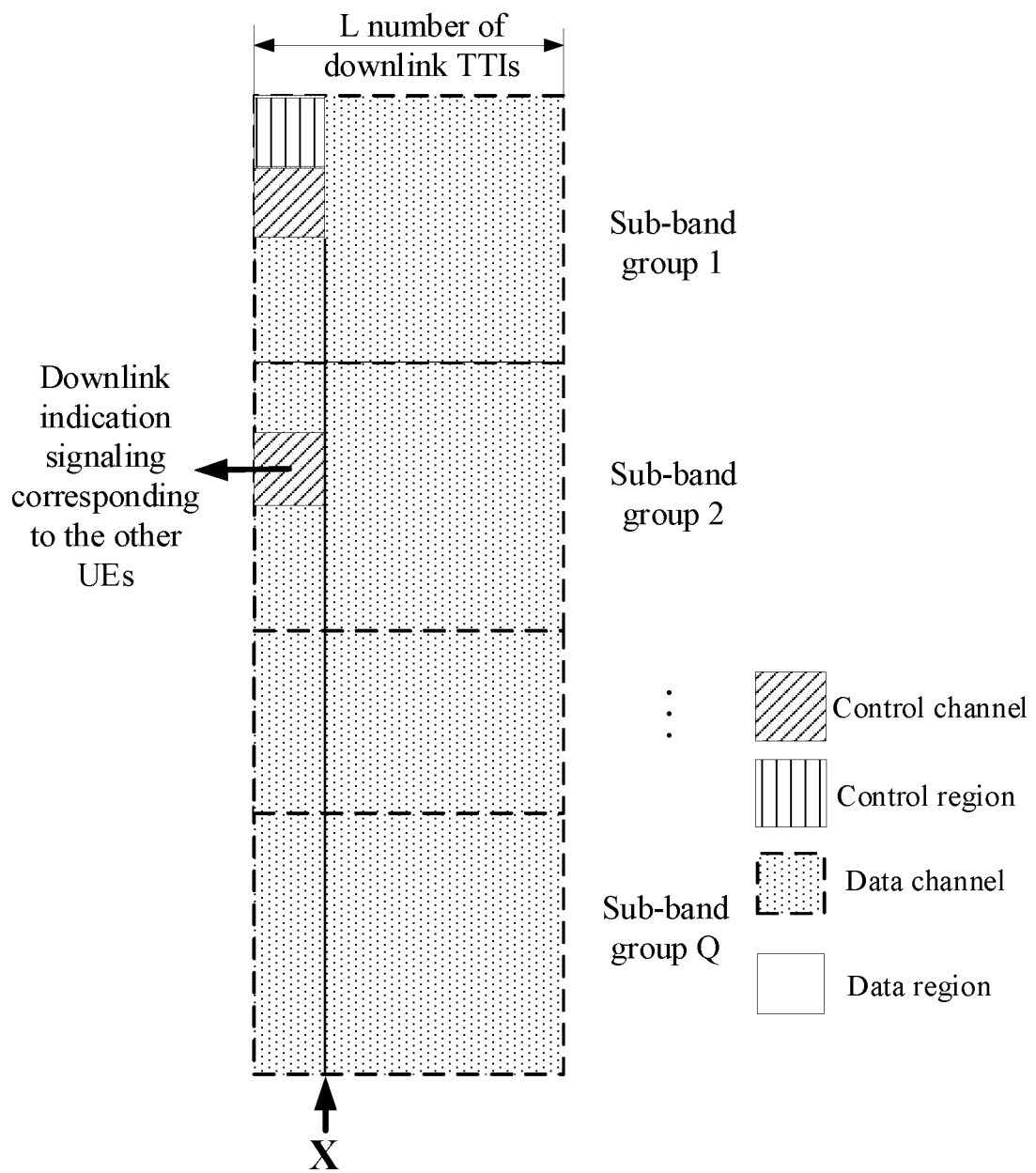
FIG. 11a and FIG. 11b are schematic diagrams of determining a start position of a downlink data channel in a ninth implementation scenario according to an embodiment of the invention.

As illustrated in FIG. 11a, for example, a sub-band group 1 is a specific sub-band group on which DCI corresponding to the scheduled UE is transmitted, and a sub-band group 2, . . . , and a sub-band group Q are non-specific sub-band group on which the DCI corresponding to the scheduled UE is not transmitted, where DCI corresponding to the other UEs is carried in the sub-band group 2, so the scheduled UE determines resource elements occupied by the corresponding DCI thereof in a downlink control region occupying X number of time units in the time domain, and determines a time domain start position of a downlink data channel in L number of downlink TTIs as the first time unit in the sub-band group 1; and the sub-band group 2 to the sub-band group Q are non-specific sub-band groups on which the DCI corresponding to the scheduled UE is not transmitted, so the scheduled UE determines a time domain start position of a downlink data channel in L number of downlink TTIs as the first time unit in the sub-band group 2 to the sub-band group Q. Of course, for the non-specific sub-band groups on which the DCI corresponding to the scheduled UE is not transmitted, the scheduled UE can alternatively determine a time domain start position of a downlink data channel in L number of downlink TTIs as the (X+1)-th time unit.

Figure 11B:
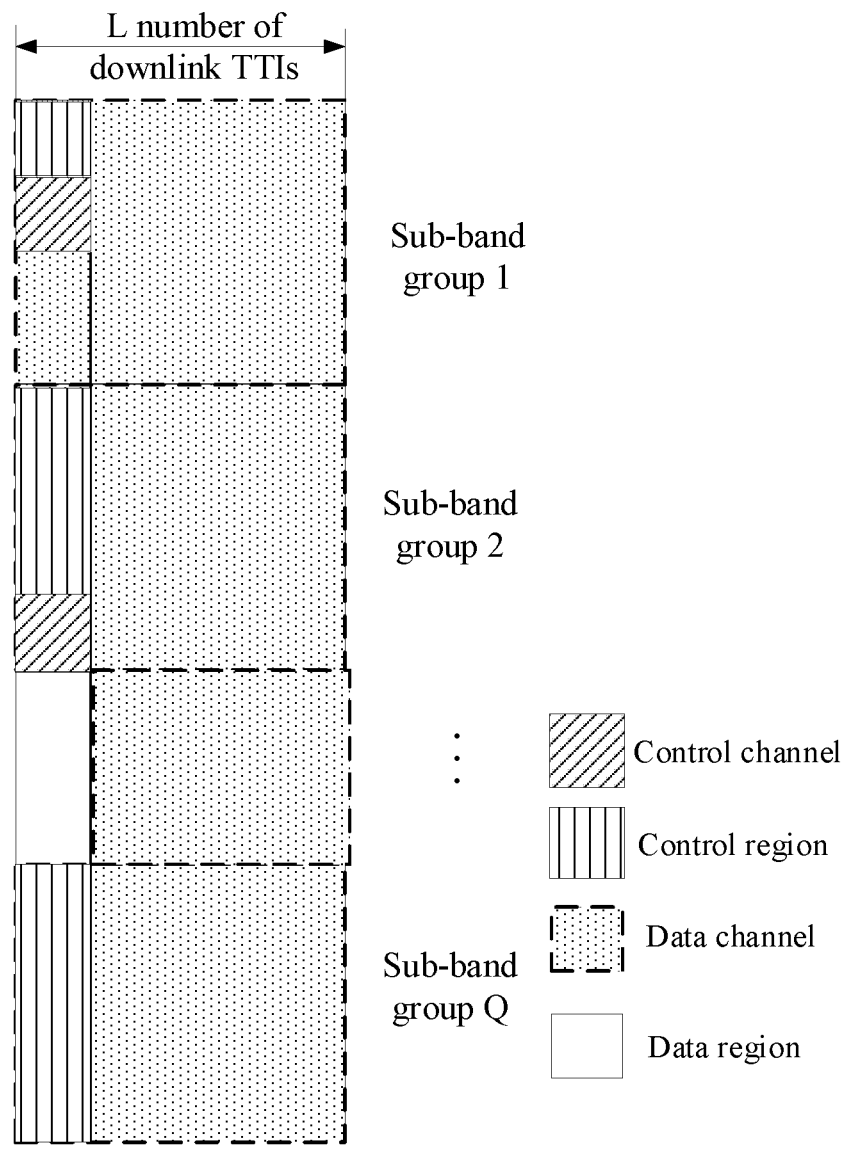

As illustrated in FIG. 11b, in another example, a sub-band group 1 and a sub-band group 2 are specific sub-band groups on which DCI corresponding to the scheduled UE is transmitted, and the other sub-band groups are non-specific sub-band groups on which the DCI corresponding to the scheduled UE is not transmitted, so for the sub-band group 1, the scheduled UE determines a time domain start position of a downlink data channel in L number of downlink TTIs as the first time unit, and of course, the downlink data channel can not overlap with a downlink control channel occupied by the DCI corresponding to the scheduled UE; for the sub-band group 2, the scheduled UE determines a time domain start position of a downlink data channel in L number of downlink TTIs as the (X+1)-th time unit; and for the other non-specific sub-band groups than the sub-band group 1 and the sub-band group 2, the scheduled UE determines a time domain start position of a downlink data channel in L number of downlink TTIs as the (X+1)-th time unit.

Figure 12:
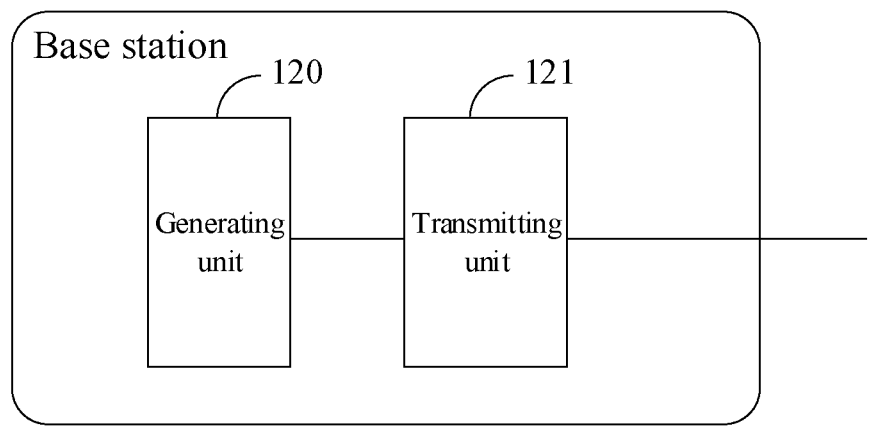
FIG. 12 is a schematic functional structure diagram of a base station according to an embodiment of the invention.

Based upon the embodiments above, as illustrated in FIG. 12, an apparatus for determining a start position of a downlink data channel (e.g., a base station) according to an embodiment of the invention includes at least a generating unit 120 and a transmitting unit 121.

The generating unit 120 is configured to generate indication signaling, where the indication signaling generated by the generating unit 120 indicates a time domain start position of a downlink data channel in L number of downlink Transmission Time Intervals (TTIs), and L is an integer more than or equal to 1.

The transmitting unit 121 is configured to transmit the indication signaling generated by the generating unit 120 to a UE.

Optionally the indication signaling generated by the generating unit 120 indicates a time domain start position of a downlink data channel in L number of downlink TTIs as follows.

The indication signaling generated by the generating unit 120 indicates that a time domain start position of a downlink data channel in L number of downlink TTIs is the X-th time unit in L number of downlink TTIs in a specified bandwidth, where the specified bandwidth is a part or all of an operating bandwidth of the base station, X is an integer more than or equal to 1, a time unit includes Y number of OFDM symbols, and Y is an integer more than or equal to 1.

Optionally the indication signaling generated by the generating unit 120 is DCI carrying an information field of N1 bits, where N1 is an integer more than or equal to 1, and the information field of N1 bits indicates that a time domain start position of a downlink data channel in L number of downlink TTIs is the X-th time unit in L number of downlink TTIs in the specified bandwidth.

Or, the indication signaling generated by the generating unit 120 is RRC signaling carrying an information field of N2 bits, where N2 is an integer more than or equal to 1, and the information field of N2 bits indicates that a time domain start position of a downlink data channel in L number of downlink TTIs is the X-th time unit in L number of downlink TTIs in the specified bandwidth.

Or, the indication signaling generated by the generating unit 120 is broadcast signaling transmitted once in every M1 slots, where M1 is an integer more than or equal to 1, and a slot includes at least one downlink TTI, and the broadcast signaling indicates that a time domain start position of a downlink data channel in all the L number of downlink TTIs in the M1 slots is the X-th time unit in all the L number of downlink TTIs in the specified bandwidth.

Optionally the indication signaling generated by the generating unit 120 indicates a time domain start position of a downlink data channel in L number of downlink TTIs as follows.

The indication signaling generated by the generating unit 120 indicates that a time domain start position of a downlink data channel in L number of downlink TTIs in each sub-band group is a specified time unit, where each sub-band group includes at least one sub-band, a time unit includes Y number of OFDM symbols, and Y is an integer more than or equal to 1.

Optionally the indication signaling generated by the generating unit 120 indicates that a time domain start position of a downlink data channel in L number of downlink TTIs in each sub-band group is a specified time unit as follows.

The indication signaling generated by the generating unit 120 is DCI carrying information field of Q1*N3 bits, where Q1 is the number of sub-band groups, and both Q1 and N3 are integers more than or equal to 1, and each information field of N3 bits among the information field of Q1*N3 bits corresponds respectively to one of the sub-band group, where an information field of N3 bits indicates a time domain start position of a downlink data channel in L number of downlink TTIs in a corresponding sub-band group, and the time domain start position is the X-th time unit, where X is an integer more than or equal to 1.

Or, the indication signaling generated by the generating unit 120 is RRC signaling carrying information field of Q2*N4 bits, where Q2 is the number of sub-band groups, and both Q2 and N4 are integers more than or equal to 1, and each information field of N4 bits among the information field of Q2*N4 corresponds respectively to one of the sub-band groups, where an information field of N4 bits indicates that a time domain start position of a downlink data channel in L number of downlink TTIs in a corresponding sub-band group is the X-th time unit, where X is an integer more than or equal to 1.

Or, the indication signaling generated by the generating unit 120 is broadcast signaling transmitted once in every M2 slots, where M2 is an integer more than or equal to 1, and a slot includes at least one downlink TTI, and the broadcast signaling indicates that a time domain start position of a downlink data channel in L number of downlink TTIs in each sub-band group is the X-th time unit, where X is an integer more than or equal to 1.

Optionally the indication signaling generated by the generating unit 120 indicates that a time domain start position of a downlink data channel in L number of downlink TTIs in each sub-band is a specified time unit as follows.

The indication signaling generated by the generating unit 120 is DCI carrying information field of Q3 bits, where Q3 is the number of sub-band groups, and Q3 is an integer more than or equal to 1, and each information field of one bit among the information field of Q3 bits indicates a corresponding flag bit which is set for a sub-band group respectively, where a flag bit indicates that a time domain start position of a downlink data channel in L number of downlink TTIs in a corresponding sub-band group is the first time unit or the Z1-th time unit, where Z1 is a preset value, a value signaled in RRC signaling, or a value signaled in broadcast signaling, and Z1 is an integer more than or equal to 2.

Or, the indication signaling generated by the generating unit 120 is RRC signaling carrying information field of Q4 bits, where Q4 is the number of sub-band groups, and Q4 is an integer more than or equal to 1, and each information bit among the information field of Q4 bits indicates a corresponding flag bit which is set for a sub-band group respectively, where a flag bit indicates that a time domain start position of a downlink data channel in L number of downlink TTIs in a corresponding sub-band group is the first time unit or the Z2-th time unit, where Z2 is a preset value, a value signaled in RRC signaling, or a value signaled in broadcast signaling, and Z2 is an integer more than or equal to 2.

Or, the indication signaling generated by the generating unit 120 is broadcast signaling carrying information field of Q5 bits, where Q5 is the number of sub-band groups, and Q5 is an integer more than or equal to 1, and each information bit among the information field of Q5 bits indicates a corresponding flag bit which is set for a sub-band group respectively, where a flag bit indicates that a time domain start position of a downlink data channel in L number of downlink TTIs in a corresponding sub-band group is the first time unit or the Z3-th time unit, where Z3 is a preset value, a value signaled in RRC signaling, or a value signaled in broadcast signaling, and Z2 is an integer more than or equal to 3.

Optionally the indication signaling generated by the generating unit 120 indicates a time domain start position of a downlink data channel in L number of downlink TTIs as follows.

The indication signaling generated by the generating unit 120 is DCI, where the DCI indicates resource elements for transmitting downlink data, in a downlink data region in L number of downlink TTIs, and resource elements occupied by DCI corresponding to the other UEs among the resource elements for transmitting downlink data, and triggers the UE to determine a time domain start position of a downlink data channel in L number of downlink TTIs, from the other resource elements than the resource elements occupied by DCI corresponding to the other UEs among the resource elements for transmitting downlink data based upon the indication signaling generated by the generating unit 120, where the UE defaults a time domain start position of the downlink data region as the first time unit in the L number of downlink TTIs, a time unit includes Y number of OFDM symbols, and Y is an integer more than or equal to 1.

Optionally the indication signaling generated by the generating unit 120 indicates a time domain start position of a downlink data channel in L number of downlink TTIs as follows.

The indication signaling generated by the generating unit 120 is DCI carrying scheduling information, where the scheduling information indicates to the UE the resource elements for transmitting downlink data in a downlink control region in L number of downlink TTIs, and resource elements for transmitting downlink data in a downlink data region, and triggers the UE to determine a time domain start position of a downlink data channel in L number of downlink TTIs based upon the scheduling information carried in the DCI, where the downlink control region occupies X number of time units in the time domain, X is an integer more than or equal to 1, a time unit includes Y number of OFDM symbols, Y is an integer more than or equal to 1, and the UE defaults a time domain start position of the downlink data region as the (X+1)-th time unit in the L number of downlink TTIs.

Optionally the scheduling information is scheduling information in a specified bandwidth or each sub-band group, where each sub-band group includes at least one sub-band.

Optionally the indication signaling generated by the generating unit 120 indicates a time domain start position of a downlink data channel in L number of downlink TTIs as follows.

The indication signaling generated by the generating unit 120 is DCI carrying information field in which every one bit is for each sub-band group, where each sub-band group includes at least one sub-band.

For each specific sub-band group on which the DCI is transmitted, an information field of one bit corresponding respectively to the each specific sub-band group indicates that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, where X is an integer more than or equal to 1, a time unit includes Y number of OFDM symbols, and Y is an integer more than or equal to 1.

For each non-specific sub-band group on which the DCI is not transmitted, an information field of one bit corresponding respectively to the each non-specific sub-band group indicates that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

Figure 13:
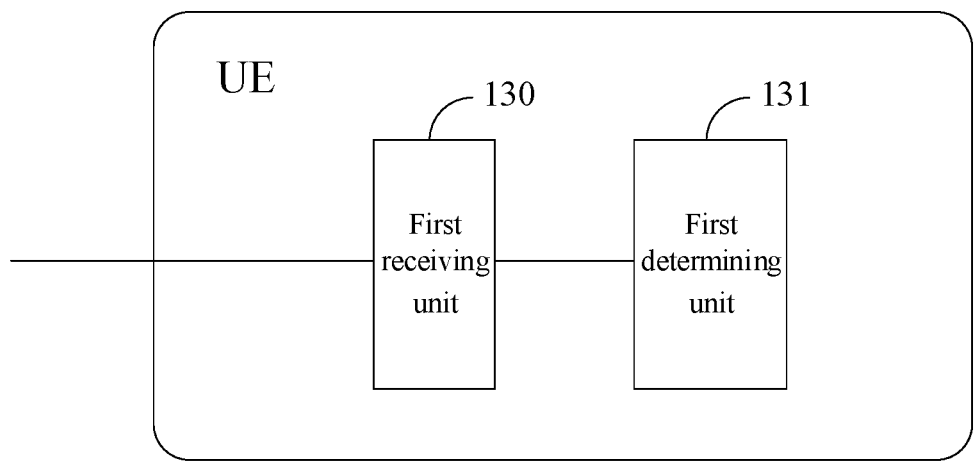
FIG. 13 is a first functional structure diagram of a UE according to an embodiment of the invention.

As illustrated in FIG. 13, an apparatus for determining a start position of a downlink data channel (e.g., a UE) according to an embodiment of the invention includes at least a first receiving unit 130 and a first determining unit 131.

The first receiving unit 130 is configured to receive indication signaling transmitted by a base station.

The first determining unit 131 is configured to determine a time domain start position of a downlink data channel in L number of downlink Transmission Time Intervals (TTIs) based upon the indication signaling, where L is an integer more than or equal to 1.

Optionally the first determining unit 131 configured to determine a time domain start position of a downlink data channel in L number of downlink TTIs based upon the indication signaling is configured: to determine based upon the indication signaling that a time domain start position of a downlink data channel in L number of downlink TTIs is the X-th time unit in L number of downlink TTIs in a specified bandwidth, where the specified bandwidth is a part or all of an operating bandwidth of the base station, X is an integer more than or equal to 1, a time unit includes Y number of OFDM symbols, and Y is an integer more than or equal to 1.

Optionally the indication signaling is DCI carrying an information field of N1 bits, where N1 is an integer more than or equal to 1, and the information field of N1 bits indicates that a time domain start position of a downlink data channel in L number of downlink TTIs is the X-th time unit in L number of downlink TTIs in the specified bandwidth.

Or, the indication signaling is RRC signaling carrying an information field of N2 bits, where N2 is an integer more than or equal to 1, and the information field of N2 bits indicates that a time domain start position of a downlink data channel in L number of downlink TTIs is the X-th time unit in L number of downlink TTIs in the specified bandwidth.

Or, the indication signaling is broadcast signaling transmitted once in every M1 number of slots, where M1 is an integer more than or equal to 1, and a slot includes at least one downlink TTI, and the broadcast signaling indicates that a time domain start position of a downlink data channel in all the L number of downlink TTIs in the M1 number of slots is the X-th time unit in all the L number of downlink TTIs in the specified bandwidth.

Optionally the first determining unit 131 configured to determine a time domain start position of a downlink data channel in L number of downlink TTIs based upon the indication signaling is configured: to determine respectively based upon the indication signaling that a time domain start position of a downlink data channel in L number of downlink TTIs in each sub-band group is a specified time unit, where each sub-band group includes at least one sub-band, a time unit includes Y number of OFDM symbols, and Y is an integer more than or equal to 1.

Optionally the first determining unit 131 configured to determine respectively based upon the indication signaling that a time domain start position of a downlink data channel in L number of downlink TTIs in each sub-band group is a specified time unit is configured: to determine respectively based upon each information field of N3 bits among information field of Q1*N3 bits carried in the indication signaling that a time domain start position of a downlink data channel in L number of downlink TTIs in a corresponding sub-band group is the X-th time unit, where the indication signaling is DCI carrying the information field of Q1*N3 bits, Q1 is the number of sub-band groups, Q1 and N3 are integers more than or equal to 1, and X is an integer more than or equal to 1; or to determine respectively based upon each information field of N4 bits among information field of Q2*N4 bits carried in the indication signaling that a time domain start position of a downlink data channel in L number of downlink TTIs in a corresponding sub-band group is the X-th time unit, where the indication signaling is RRC carrying the information field of Q2*N4 bits, Q2 is the number of sub-band groups, Q2 and N4 are integers more than or equal to 1, and X is an integer more than or equal to 1; or to determine respectively based upon the indication signaling that a time domain start position of a downlink data channel in L number of downlink TTIs in each sub-band group is the X-th time unit, where the indication signaling is broadcast signaling transmitted once in every M2 number of slots, M2 is an integer more than or equal to 1, a slot includes at least one downlink TTI, and X is an integer more than or equal to 1.

Optionally the first determining unit 131 configured to determine respectively based upon the indication signaling that a time domain start position of a downlink data channel in L number of downlink TTIs in each sub-band group is a specified time unit is configured: to determine respectively based upon a flag bit corresponding to each information bit among information field of Q3 bits carried in the indication signaling that a time domain start position of a downlink data channel in L number of downlink TTIs in a corresponding sub-band group is the first time unit or the Z1-th time unit, where the indication signaling is DCI carrying the information field of Q3 bits, Q3 is the number of sub-band groups, Q3 is an integer more than or equal to 1, Z1 is a preset value, a value signaled in RRC signaling, or a value signaled in broadcast signaling, and Z1 is an integer more than or equal to 2; or to determine respectively based upon a flag bit corresponding to each information bit among information field of Q4 bits carried in the indication signaling that a time domain start position of a downlink data channel in L number of downlink TTIs in a corresponding sub-band group is the first time unit or the Z2-th time unit, where the indication signaling is RRC signaling carrying the information field of Q4 bits, Q4 is the number of sub-band groups, Q4 is an integer more than or equal to 1, Z2 is a preset value, a value signaled in RRC signaling, or a value signaled in broadcast signaling, and Z2 is an integer more than or equal to 2; or to determine respectively based upon a flag bit corresponding to each information bit among information field of Q5 bits carried in the indication signaling that a time domain start position of a downlink data channel in L number of downlink TTIs in a corresponding sub-band group is the first time unit or the Z3-th time unit, where the indication signaling is broadcast signaling carrying the information field of Q5 bits, Q5 is the number of sub-band groups, Q5 is an integer more than or equal to 1, Z3 is a preset value, a value signaled in RRC signaling, or a value signaled in broadcast signaling, and Z3 is an integer more than or equal to 2.

Optionally the first determining unit 131 configured to determine a time domain start position of a downlink data channel in L number of downlink TTIs based upon the indication signaling is configured: to determine a time domain start position of a downlink data channel in L number of downlink TTIs, from the other resource elements than resource elements occupied by DCI corresponding to the other apparatuses among resource elements for transmitting downlink data, based upon the indication signaling, where the apparatus defaults a time domain start position of a downlink data region as the first time unit in the L number of downlink TTIs, a time unit includes Y number of OFDM symbols, Y is an integer more than or equal to 1, the indication signaling is DCI, and the DCI indicates the resource elements for transmitting downlink data, in the downlink data region in L number of downlink TTIs, and the resource elements occupied by DCI corresponding to the other apparatuses among the resource elements for transmitting downlink data.

Optionally the first determining unit 131 configured to determine a time domain start position of a downlink data channel in L number of downlink TTIs based upon the indication signaling is configured: to determine a time domain start position of a downlink data channel in L number of downlink TTIs based upon scheduling information carried in the indication signaling, where the apparatus defaults that a downlink control region occupies X number of time units in the time domain, where X is an integer more than or equal to 1, a time unit includes Y number of OFDM symbols, and Y is an integer more than or equal to 1; and the apparatus defaults a time domain start position of a downlink data region as the (X+1)-th time unit in the L number of downlink TTIs, the indication signaling is DCI carrying the scheduling information, the scheduling information indicates to the apparatus the resource elements for transmitting downlink data in the downlink control region in the L number of downlink TTIs, and resource elements for transmitting downlink data in the downlink data region.

Optionally the scheduling information is scheduling information in a specified bandwidth or each sub-band group, where each sub-band group includes at least one sub-band.

Optionally the first determining unit 131 configured to determine a time domain start position of a downlink data channel in L number of downlink TTIs based upon the indication signaling is configured: when the indication signaling is DCI, to obtain information field in which every one bit is for each sub-band group, from the DCI, where each sub-band group includes at least one sub-band; for each specific sub-band group on which the DCI is transmitted, to determine respectively based upon an information field of one bit corresponding to the each specific sub-band group that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, where X is an integer more than or equal to 1, a time unit includes Y number of OFDM symbols, and Y is an integer more than or equal to 1; and for each non-specific sub-band group on which the DCI is not transmitted, to determine respectively based upon an information field of one bit corresponding to the each non-specific sub-band group that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

Figure 14:
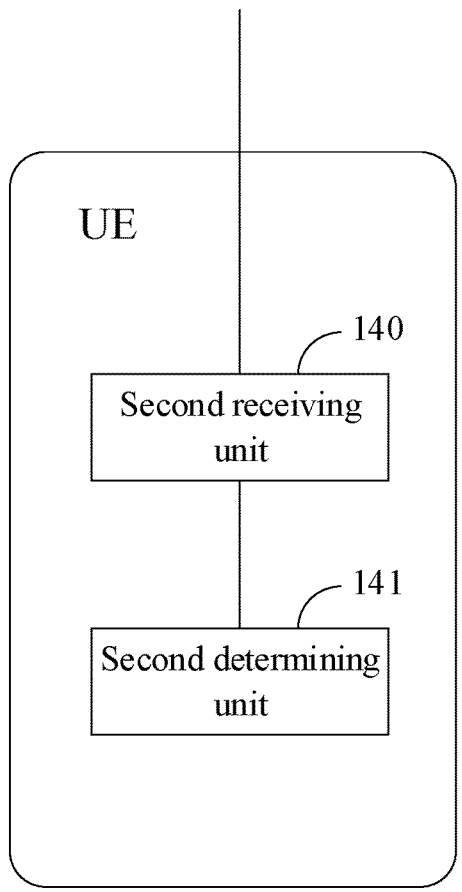
FIG. 14 is a second functional structure diagram of a UE according to an embodiment of the invention.

As illustrated in FIG. 14, another apparatus for determining a start position of a downlink data channel (e.g., a UE) according to an embodiment of the invention includes at least a second receiving unit 140 and a second determining unit 141.

The second receiving unit 140 is configured to receive DCI, and to determine resource elements occupied by the DCI in a downlink control region based upon the DCI.

The second determining unit 141 is configured to determine a time domain start position of a downlink data channel in L number of downlink Transmission Time Intervals (TTIs) based upon the resource elements occupied by the DCI in the downlink control region, where L is an integer more than or equal to 1.

Optionally the second determining unit 141 configured to determine a time domain start position of a downlink data channel in L number of downlink TTIs based upon the resource elements occupied by the DCI in the downlink control region is configured: to determine at least one specific sub-band group and at least one non-specific sub-band group based upon the resource elements occupied by the DCI in the downlink control region, where the specific sub-band group is a sub-band group on which the DCI is transmitted, and the non-specific sub-band group is a sub-band group on which the DCI is not transmitted; and each sub-band group includes at least one sub-band, the apparatus defaults that a downlink control region in each sub-band group occupies X number of time units in the time domain, a time unit includes Y number of OFDM symbols, X is a preset value, and X and Y are integers more than or equal to 1.

For each specific sub-band group, the second determining unit 141 is configured: to determine a time domain start position of a downlink data channel in L number of downlink TTIs in the specific sub-band group, from the other resource elements than the resource elements in the downlink control region in the specific sub-band group.

For each nonspecific sub-band group, the second determining unit 141 is configured: to determine a time domain start position of a downlink data channel in L number of downlink TTIs in the non-specific sub-band group as the first OFDM symbol in the L number of downlink TTIs in the non-specific sub-band group; or to determine a time domain start position of a downlink data channel in L number of downlink TTIs in the non-specific sub-band group as the (X+1)-th time unit in the L number of downlink TTIs in the non-specific sub-band group.

Figure 15:
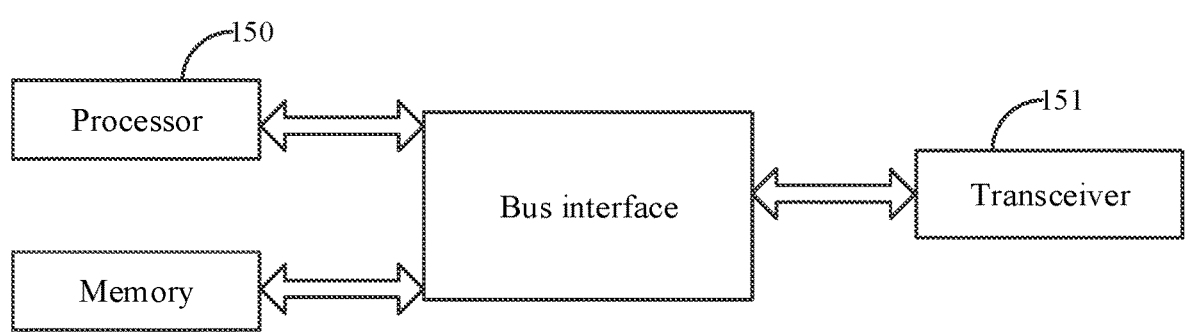
FIG. 15 is a schematic structural diagram of a base station according to another embodiment of the invention.

As illustrated in FIG. 15, a base station according to an embodiment of the invention provides a processor 150 and a transceiver.

The processor 150 is configured to read and execute program in a memory: to generate indication signaling, where the indication signaling indicates a time domain start position of a downlink data channel in L number of downlink Transmission Time Intervals (TTIs), and L is an integer more than or equal to 1.

The transceiver 151 is configured to transmit the indication signaling under the control of the processor 150.

Optionally the indication signaling generated by the processor 150 indicates that a time domain start position of a downlink data channel in L number of downlink TTIs is the X-th time unit in L number of downlink TTIs in a specified bandwidth, where the specified bandwidth is a part or all of an operating bandwidth of the base station, X is an integer more than or equal to 1, a time unit includes Y number of OFDM symbols, and Y is an integer more than or equal to 1.

Optionally the indication signaling generated by the processor 150 is DCI carrying an information field of N1 bits, where N1 is an integer more than or equal to 1, and the information field of N1 bits indicates that a time domain start position of a downlink data channel in L number of downlink TTIs is the X-th time unit in L number of downlink TTIs in the specified bandwidth.

Or, the indication signaling generated by the processor 150 is RRC signaling carrying an information field of N2 bits, where N2 is an integer more than or equal to 1, and the information field of N2 bits indicates that a time domain start position of a downlink data channel in L number of downlink TTIs is the X-th time unit in L number of downlink TTIs in the specified bandwidth.

Or, the indication signaling generated by the processor 150 is broadcast signaling transmitted once in every M1 slots, where M1 is an integer more than or equal to 1, and a slot includes at least one downlink TTI, and the broadcast signaling indicates that a time domain start position of a downlink data channel in all the L number of downlink TTIs in the M1 slots is the X-th time unit in all the L number of downlink TTIs in the specified bandwidth.

Optionally the indication signaling generated by the processor 150 indicates a time domain start position of a downlink data channel in L number of downlink TTIs as follows.

The indication signaling generated by the processor 150 indicates that a time domain start position of a downlink data channel in L number of downlink TTIs in each sub-band group is a specified time unit, where each sub-band group includes at least one sub-band, a time unit includes Y number of OFDM symbols, and Y is an integer more than or equal to 1.

Optionally the indication signaling generated by the processor 150 indicates that a time domain start position of a downlink data channel in L number of downlink TTIs in each sub-band group is a specified time unit as follows.

The indication signaling generated by the processor 150 is DCI carrying information field of Q1*N3 bits, where Q1 is the number of sub-band groups, and both Q1 and N3 are integers more than or equal to 1, and each information field of N3 bits among the information field of Q1*N3 bits corresponds respectively to one of the sub-band group, where an information field of N3 bits indicates a time domain start position of a downlink data channel in L number of downlink TTIs in a corresponding sub-band group, and the time domain start position is the X-th time unit, where X is an integer more than or equal to 1.

Or, the indication signaling generated by the processor 150 is RRC signaling carrying information field of Q2*N4 bits, where Q2 is the number of sub-band groups, and both Q2 and N4 are integers more than or equal to 1, and each information field of N4 bits among the information field of Q2*N4 corresponds respectively to one of the sub-band groups, where an information field of N4 bits indicates that a time domain start position of a downlink data channel in L number of downlink TTIs in a corresponding sub-band group is the X-th time unit, where X is an integer more than or equal to 1.

Or, the indication signaling generated by the processor 150 is broadcast signaling transmitted once in every M2 slots, where M2 is an integer more than or equal to 1, and a slot includes at least one downlink TTI, and the broadcast signaling indicates that a time domain start position of a downlink data channel in L number of downlink TTIs in each sub-band group is the X-th time unit, where X is an integer more than or equal to 1.

Optionally the indication signaling generated by the processor 150 indicates that a time domain start position of a downlink data channel in L number of downlink TTIs in each sub-band is a specified time unit as follows.

The indication signaling generated by the processor 150 is DCI carrying information field of Q3 bits, where Q3 is the number of sub-band groups, and Q3 is an integer more than or equal to 1, and each information bit among the information field of Q3 bits indicates a corresponding flag bit which is set for a sub-band group respectively, where a flag bit indicates that a time domain start position of a downlink data channel in L number of downlink TTIs in a corresponding sub-band group is the first time unit or the Z1-th time unit, where Z1 is a preset value, a value signaled in RRC signaling, or a value signaled in broadcast signaling, and Z1 is an integer more than or equal to 2.

Or, the indication signaling generated by the processor 150 is RRC signaling carrying information field of Q4 bits, where Q4 is the number of sub-band groups, and Q4 is an integer more than or equal to 1, and each information bit among the information field of Q4 bits indicates a corresponding flag bit which is set for a sub-band group respectively, where a flag bit indicates that a time domain start position of a downlink data channel in L number of downlink TTIs in a corresponding sub-band group is the first time unit or the Z2-th time unit, where Z2 is a preset value, a value signaled in RRC signaling, or a value signaled in broadcast signaling, and Z2 is an integer more than or equal to 2.

Or, the indication signaling generated by the processor 150 is broadcast signaling carrying information field of Q5 bits, where Q5 is the number of sub-band groups, and Q5 is an integer more than or equal to 1, and each information bit among the information field of Q5 bits indicates a corresponding flag bit which is set for a sub-band group respectively, where a flag bit indicates that a time domain start position of a downlink data channel in L number of downlink TTIs in a corresponding sub-band group is the first time unit or the Z3-th time unit, where Z3 is a preset value, a value signaled in RRC signaling, or a value signaled in broadcast signaling, and Z2 is an integer more than or equal to 3.

Optionally the indication signaling generated by the processor 150 indicates a time domain start position of a downlink data channel in L number of downlink TTIs as follows.

The indication signaling generated by the processor 150 is DCI, where the DCI indicates resource elements for transmitting downlink data, in a downlink data region in L number of downlink TTIs, and resource elements occupied by DCI corresponding to the other UEs among the resource elements for transmitting downlink data, and triggers a UE to determine a time domain start position of a downlink data channel in L number of downlink TTIs, from the other resource elements than the resource elements occupied by DCI corresponding to the other UEs among the resource elements for transmitting downlink data based upon the indication signaling generated by the processor 150, where the UE defaults a time domain start position of the downlink data region as the first time unit in the L number of downlink TTIs, a time unit includes Y number of OFDM symbols, and Y is an integer more than or equal to 1.

Optionally the indication signaling generated by the processor 150 indicates a time domain start position of a downlink data channel in L number of downlink TTIs as follows.

The indication signaling generated by the processor 150 is DCI carrying scheduling information, where the scheduling information indicates to the UE the resource elements for transmitting downlink data in a downlink control region in L number of downlink TTIs, and resource elements for transmitting downlink data in a downlink data region, and triggers the UE to determine a time domain start position of a downlink data channel in L number of downlink TTIs based upon the scheduling information carried in the DCI, where the downlink control region occupies X number of time units in the time domain, X is an integer more than or equal to 1, a time unit includes Y number of OFDM symbols, Y is an integer more than or equal to 1, and the UE defaults a time domain start position of the downlink data region as the (X+1)-th time unit in the L number of downlink TTIs.

Optionally the scheduling information is scheduling information in a specified bandwidth or each sub-band group, where each sub-band group includes at least one sub-band.

Optionally the indication signaling generated by the processor 150 indicates a time domain start position of a downlink data channel in L number of downlink TTIs as follows.

The indication signaling generated by the processor 150 is DCI carrying information field in which every one bit is for each sub-band group, where each sub-band group includes at least one sub-band; and for each specific sub-band group on which the DCI is transmitted, an information field of one bit corresponding respectively to the each specific sub-band group indicates that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, where X is an integer more than or equal to 1, a time unit includes Y number of OFDM symbols, and Y is an integer more than or equal to 1; and for each non-specific sub-band group on which the DCI is not transmitted, an information field of one bit corresponding respectively to the each non-specific sub-band group indicates that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

Here in FIG. 15, the bus architecture can include any number of interconnecting buses and bridges to link together various circuits including one or more processors represented by the processor 150, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 151 can be a number of elements, e.g., a transmitter and a receiver, which are units for communication with various other devices over a transmission medium.

Figure 16:
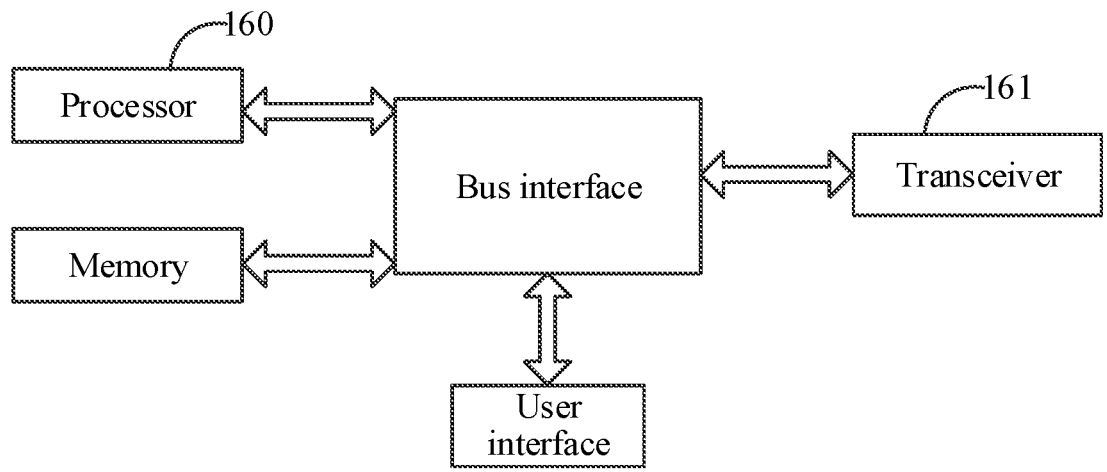
FIG. 16 is a schematic structural diagram of a UE according to another embodiment of the invention.

As illustrated in FIG. 16, a UE according to an embodiment of the invention includes a processor 160 and a transceiver 161.

The transceiver 161 is configured to receive indication signaling under the control of the processor 160.

The processor 160 is configured to read and execute program in a memory: to determine a time domain start position of a downlink data channel in L number of downlink Transmission Time Intervals (TTIs) based upon the indication signaling, where L is an integer more than or equal to 1.

Optionally the processor 160 configured to determine a time domain start position of a downlink data channel in L number of downlink TTIs based upon the indication signaling is configured: to determine based upon the indication signaling that a time domain start position of a downlink data channel in L number of downlink TTIs is the X-th time unit in L number of downlink TTIs in a specified bandwidth, where the specified bandwidth is a part or all of an operating bandwidth of a base station, X is an integer more than or equal to 1, a time unit includes Y number of OFDM symbols, and Y is an integer more than or equal to 1.

Optionally the indication signaling is DCI carrying an information field of N1 bits, where N1 is an integer more than or equal to 1, and the information field of N1 bits indicates that a time domain start position of a downlink data channel in L number of downlink TTIs is the X-th time unit in L number of downlink TTIs in the specified bandwidth.

Or, the indication signaling is RRC signaling carrying an information field of N2 bits, where N2 is an integer more than or equal to 1, and the information field of N2 bits indicates that a time domain start position of a downlink data channel in L number of downlink TTIs is the X-th time unit in L number of downlink TTIs in the specified bandwidth.

Or, the indication signaling is broadcast signaling transmitted once in every M1 slots, where M1 is an integer more than or equal to 1, and a slot includes at least one downlink TTI, and the broadcast signaling indicates that a time domain start position of a downlink data channel in all the L number of downlink TTIs in the M1 slots is the X-th time unit in all the L number of downlink TTIs in the specified bandwidth.

Optionally the processor 160 configured to determine a time domain start position of a downlink data channel in L number of downlink TTIs based upon the indication signaling is configured: to determine respectively based upon the indication signaling that a time domain start position of a downlink data channel in L number of downlink TTIs in each sub-band group is a specified time unit, where each sub-band group includes at least one sub-band, a time unit includes Y number of OFDM symbols, and Y is an integer more than or equal to 1.

Optionally the processor 160 configured to determine respectively based upon the indication signaling that a time domain start position of a downlink data channel in L number of downlink TTIs in each sub-band group is a specified time unit is configured: to determine respectively based upon each information field of N3 bits among information field of Q1*N3 bits carried in the indication signaling that a time domain start position of a downlink data channel in L number of downlink TTIs in a corresponding sub-band group is the X-th time unit, where the indication signaling is DCI carrying the information field of Q1*N3 bits, Q1 is the number of sub-band groups, Q1 and N3 are integers more than or equal to 1, and X is an integer more than or equal to 1; or to determine respectively based upon each information field of N4 bits among information field of Q2*N4 bits carried in the indication signaling that a time domain start position of a downlink data channel in L number of downlink TTIs in a corresponding sub-band group is the X-th time unit, where the indication signaling is RRC carrying the information field of Q2*N4 bits, Q2 is the number of sub-band groups, Q2 and N4 are integers more than or equal to 1, and X is an integer more than or equal to 1; or to determine respectively based upon the indication signaling that a time domain start position of a downlink data channel in L number of downlink TTIs in each sub-band group is the X-th time unit, where the indication signaling is broadcast signaling transmitted once in every M2 slots, M2 is an integer more than or equal to 1, a slot includes at least one downlink TTI, and X is an integer more than or equal to 1.

Optionally the processor 160 configured to determine respectively based upon the indication signaling that a time domain start position of a downlink data channel in L number of downlink TTIs in each sub-band group is a specified time unit is configured: to determine respectively based upon a flag bit corresponding to each information bit among information field of Q3 bits carried in the indication signaling that a time domain start position of a downlink data channel in L number of downlink TTIs in a corresponding sub-band group is the first time unit or the Z1-th time unit, where the indication signaling is DCI carrying the information field of Q3 bits, Q3 is the number of sub-band groups, Q3 is an integer more than or equal to 1, Z1 is a preset value, a value signaled in RRC signaling, or a value signaled in broadcast signaling, and Z1 is an integer more than or equal to 2; or to determine respectively based upon a flag bit corresponding to each information bit among information field of Q4 bits carried in the indication signaling that a time domain start position of a downlink data channel in L number of downlink TTIs in a corresponding sub-band group is the first time unit or the Z2-th time unit, where the indication signaling is RRC signaling carrying the information field of Q4 bits, Q4 is the number of sub-band groups, Q4 is an integer more than or equal to 1, Z2 is a preset value, a value signaled in RRC signaling, or a value signaled in broadcast signaling, and Z2 is an integer more than or equal to 2; or to determine respectively based upon a flag bit corresponding to each information bit among information field of Q5 bits carried in the indication signaling that a time domain start position of a downlink data channel in L number of downlink TTIs in a corresponding sub-band group is the first time unit or the Z3-th time unit, where the indication signaling is broadcast signaling carrying the information field of Q5 bits, Q5 is the number of sub-band groups, Q5 is an integer more than or equal to 1, Z3 is a preset value, a value signaled in RRC signaling, or a value signaled in broadcast signaling, and Z3 is an integer more than or equal to 2.

Optionally the processor 160 configured to determine a time domain start position of a downlink data channel in L number of downlink TTIs based upon the indication signaling is configured: to determine a time domain start position of a downlink data channel in L number of downlink TTIs, from the other resource elements than resource elements occupied by DCI corresponding to the other apparatuses among resource elements for transmitting downlink data, based upon the indication signaling, where the apparatus defaults a time domain start position of a downlink data region as the first time unit in the L number of downlink TTIs, a time unit includes Y number of OFDM symbols, Y is an integer more than or equal to 1, the indication signaling is DCI, and the DCI indicates the resource elements for transmitting downlink data, in the downlink data region in L number of downlink TTIs, and the resource elements occupied by DCI corresponding to the other apparatuses among the resource elements for transmitting downlink data.

Optionally the processor 160 configured to determine a time domain start position of a downlink data channel in L number of downlink TTIs based upon the indication signaling is configured: to determine a time domain start position of a downlink data channel in L number of downlink TTIs based upon scheduling information carried in the indication signaling, where the apparatus defaults that a downlink control region occupies X number of time units in the time domain, where X is an integer more than or equal to 1, a time unit includes Y number of OFDM symbols, and Y is an integer more than or equal to 1; and the apparatus defaults a time domain start position of a downlink data region as the (X+1)-th time unit in the L number of downlink TTIs, the indication signaling is DCI carrying the scheduling information, the scheduling information indicates to the apparatus the resource elements for transmitting downlink data in the downlink control region in the L number of downlink TTIs, and resource elements for transmitting downlink data in the downlink data region.

Optionally the scheduling information is scheduling information in a specified bandwidth or each sub-band group, where each sub-band group includes at least one sub-band.

Optionally the processor 160 configured to determine a time domain start position of a downlink data channel in L number of downlink TTIs based upon the indication signaling is configured: when the indication signaling is DCI, to obtain information field in which every one bit is for each sub-band group, from the DCI, where each sub-band group includes at least one sub-band; for each specific sub-band group on which the DCI is transmitted, to determine respectively based upon an information field of one bit corresponding to the each specific sub-band group that a time domain start position of a downlink data channel in L number of downlink TTIs in the corresponding specific sub-band group is determined from the other resource elements than resource elements occupied for transmitting the DCI, in a downlink control region occupying X number of time units in the time domain, in the corresponding specific sub-band group, or a time domain start position of a downlink data channel in L number of downlink TTIs in the corresponding specific sub-band group is determined as the first resource element after a downlink control region occupying X number of time units in the time domain, in L number of downlink TTIs in the corresponding specific sub-band group, where X is an integer more than or equal to 1, a time unit includes Y number of OFDM symbols, and Y is an integer more than or equal to 1; and for each non-specific sub-band group on which the DCI is not transmitted, to determine respectively based upon an information field of one bit corresponding to the each non-specific sub-band group that a time domain start position of a downlink data channel in L number of downlink TTIs in the corresponding non-specific sub-band group is determined as the first time unit in a downlink control region occupying X number of time units in the time domain, in L number of downlink TTIs in the corresponding non-specific sub-band group, or a time domain start position of a downlink data channel in L number of downlink TTIs in the corresponding non-specific sub-band group is determined as the first resource element after a downlink control region occupying X number of time units in the time domain, in L number of downlink TTIs in the corresponding non-specific sub-band group.

Optionally the resource element is any one of a Physical Resource Block (PRB), a PRB group, a Control Channel Element (CCE), or a CCE group.

Here in FIG. 16, the bus architecture can include any number of interconnecting buses and bridges to particularly link together various circuits including one or more processors represented by the processor 160, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 161 can be a number of elements, e.g., a transmitter and a receiver, which are units for communication with various other devices over a transmission medium. For different user equipments, the user interface can also be an interface via which devices are connected internally and externally as needed, and the connected devices include but will not be limited to a keypad, a monitor, a speaker, a microphone, a joystick, etc.

The processor 160 is responsible for managing the bus architecture and performing normal processes, and the memory can store data for use by the processor 160 in performing the operations.

Figure 17:
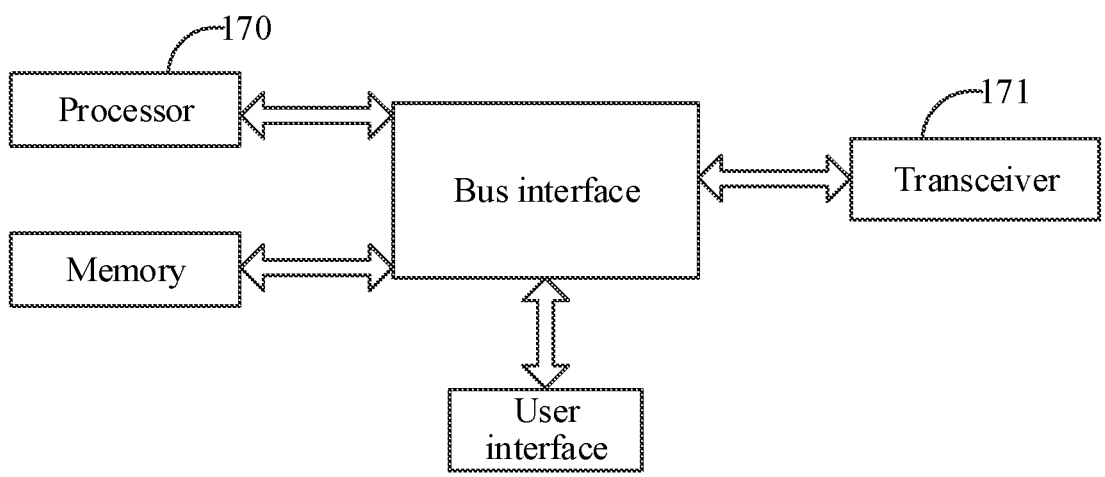
FIG. 17 is a schematic structural diagram of a UE according to another embodiment of the invention.

As illustrated in FIG. 17, a UE according to an embodiment of the invention includes a processor 170 and a transceiver 171.

The transceiver 171 is configured to receive DCI under the control of the processor 170.

The processor 170 is configured to read and execute program in a memory: to determine resource elements occupied by the DCI in a downlink control region based upon the DCI; and to determine a time domain start position of a downlink data channel in L number of downlink Transmission Time Intervals (TTIs) based upon the resource elements occupied by the DCI in the downlink control region, where L is an integer more than or equal to 1.

Optionally the processor 170 configured to determine a time domain start position of a downlink data channel in L number of downlink TTIs based upon the resource elements occupied by the DCI in the downlink control region is configured: to determine at least one specific sub-band group and at least one non-specific sub-band group based upon the resource elements occupied by the DCI in the downlink control region, where the specific sub-band group is a sub-band group on which the DCI is transmitted, and the non-specific sub-band group is a sub-band group on which the DCI is not transmitted; and each sub-band group includes at least one sub-band, the apparatus defaults that a downlink control region in each sub-band group occupies X number of time units in the time domain, a time unit includes Y number of OFDM symbols, X is a preset value, and X and Y are integers more than or equal to 1.

For each specific sub-band group, the processor 170 is configured: to determine a time domain start position of a downlink data channel in L number of downlink TTIs in the specific sub-band group, from the other resource elements than the resource elements in the downlink control region in the specific sub-band group.

For each nonspecific sub-band group, the processor 170 is configured: to determine a time domain start position of a downlink data channel in L number of downlink TTIs in the non-specific sub-band group as the first OFDM symbol in the L number of downlink TTIs in the non-specific sub-band group; or to determine a time domain start position of a downlink data channel in L number of downlink TTIs in the non-specific sub-band group as the (X+1)-th time unit in the L number of downlink TTIs in the non-specific sub-band group.

Here in FIG. 17, the bus architecture can include any number of interconnecting buses and bridges to particularly link together various circuits including one or more processors represented by the processor 170, and one or more memories represented by the memory. The bus architecture can further link together various other circuits, e.g., a peripheral device, a manostat, a power management circuit, etc., all of which are well known in the art, so a further description thereof will be omitted in this context. The bus interface serves as an interface. The transceiver 171 can be a number of elements, e.g., a transmitter and a receiver, which are units for communication with various other devices over a transmission medium. For different user equipments, the user interface can also be an interface via which devices are connected internally and externally as needed, and the connected devices include but will not be limited to a keypad, a monitor, a speaker, a microphone, a joystick, etc.

The processor 170 is responsible for managing the bus architecture and performing normal processes, and the memory can store data for use by the processor 170 in performing the operations.

In summary, in the embodiment of the invention, in order to determine a time domain start position of a downlink data channel in L number of downlink TTIs, a base station transmits generated indication signaling to a UE, and the UE determines a time domain start position of a downlink data channel in L number of downlink TTIs based upon the indication signaling upon reception of the indication signaling. With this method, when a downlink control channel only appears at a part positions of frequency domain, or does not appear in the frequency domain, and does not occupy the entire downlink control region in the time domain, or occupies varying resource elements in the time domain, the base station can notify accurately the UE of a time domain start position of a downlink data channel so that the UE can receive downlink data accurately to thereby improve the efficiency and reliability of receiving the downlink data by the UE so as to improve both the spectrum efficiency and a user experience.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a start position of a downlink data channel, applicable to 5th-Generation (5G) mobile communication system, the method comprising:
generating, by a base station, indication signaling when resources occupied by a downlink control channel is variable in a time domain, wherein the indication signaling indicates a time domain start position of a downlink data channel in L number of downlink Transmission Time Intervals (TTIs), and L is an integer more than or equal to 1; and
transmitting, by the base station, the indication signaling to a UE, wherein the indication signaling is used by the UE to determine the time domain start position of the downlink data channel in L number of downlink TTIs;
wherein when the indication signaling is DCI carrying an information field in which every one bit is for each sub-band group, wherein each sub-band group comprises at least one sub-band; and
for each specific sub-band group on which the DCI is transmitted, an information field of one bit corresponding to the each specific sub-band group indicates that the time domain start position of the downlink data channel in L number of downlink TTIs in corresponding specific sub-band group is determined from resource elements other than resource elements occupied for transmitting the DCI, in a downlink control region occupying X number of time units in the time domain, in the corresponding specific sub-band group, or the time domain start position of the downlink data channel in L number of downlink TTIs in the corresponding specific sub-band group is determined as a first resource element after a downlink control region occupying X number of time units in the time domain, in L number of downlink TTIs in the corresponding specific sub-band group, wherein X is an integer more than or equal to 1, a time unit comprises Y number of OFDM symbols, and Y is an integer more than or equal to 1; and
for each non-specific sub-band group on which the DCI is not transmitted, an information field of one bit corresponding to the each non-specific sub-band group indicates that the time domain start position of the downlink data channel in L number of downlink TTIs in corresponding non-specific sub-band group is determined as a first time unit in a downlink control region occupying X number of time units in the time domain, in L number of downlink TTIs in the corresponding non-specific sub-band group, or the time domain start position of a downlink data channel in L number of downlink TTIs in the corresponding non-specific sub-band group is determined as a first resource element after a downlink control region occupying X number of time units in the time domain, in L number of downlink TTIs in the corresponding non-specific sub-band group.

2. The method according to claim 1, wherein the indication signaling indicates that the time domain start position of the downlink data channel in L number of downlink TTIs is the time domain start position of the downlink data channel in L number of downlink TTIs in each sub-band group, wherein the time domain start position is a specified time unit, each sub-band group comprises at least one sub-band, a time unit comprises Y number of OFDM symbols, and Y is an integer more than or equal to 1.

3. The method according to claim 2, wherein the indication signaling is DCI carrying an information field of Q1*N3 bits, wherein Q1 is a number of sub-band groups, and both Q1 and N3 are integers more than or equal to 1, and each information field of N3 bits among the information field of Q1*N3 bits corresponds respectively to one of the sub-band group, wherein the information field of N3 bits indicates the time domain start position of the downlink data channel in L number of downlink TTIs in a corresponding sub-band group, and the time domain start position is a X-th time unit, wherein X is an integer more than or equal to 1; or the indication signaling is DCI carrying an information field of Q3 bits, wherein Q3 is a number of sub-band groups, and Q3 is an integer more than or equal to 1, and each information bit among the information field of Q3 bits is a flag bit which is set for a sub-band group respectively, wherein a flag bit indicates the time domain start position of the downlink data channel in L number of downlink TTIs in a corresponding sub-band group, and the time domain start position is a first time unit or a Z1-th time unit, wherein Z1 is a preset value, a value signaled in RRC signaling, or a value signaled in broadcast signaling, and Z1 is an integer more than or equal to 2.

4. A method for determining a start position of a downlink data channel, applicable to a 5th-Generation (5G) mobile communication system, the method comprising:

receiving, by a UE, indication signaling transmitted by a base station when resources occupied by a downlink control channel is variable in a time domain; and determining, by the UE, a time domain start position of a downlink data channel in L number of downlink Transmission Time Intervals (TTIs) based upon the indication signaling, wherein L is an integer more than or equal to 1;

wherein determining, by the UE, the time domain start position of the downlink data channel in L number of downlink TTIs based upon the indication signaling comprises:

when the indication signaling is DCI, obtaining, by the UE, an information field in which every one bit is for each sub-band group, from the DCI, wherein each sub-band group comprises at least one sub-band;

for each specific sub-band group on which the DCI is transmitted, determining, by the UE, respectively based upon an information field of one bit corresponding to the each specific sub-band group that the time domain start position of the downlink data channel in L number of downlink TTIs in corresponding specific sub-band group is determined from resource elements other than resource elements occupied for transmitting the DCI, in a downlink control region occupying X number of time units in the time domain, in the corresponding specific sub-band group, or the time domain start position of the downlink data channel in L number of downlink TTIs in the corresponding specific sub-band group is determined as a first resource element after a downlink control region occupying X number of time units in the time domain, in L number of downlink TTIs in the corresponding specific sub-band group, wherein X is an integer more than or equal to 1, a time unit comprises Y number of OFDM symbols, and Y is an integer more than or equal to 1; and for each non-specific sub-band group on which the DCI is not transmitted, determining, by the UE, respectively based upon an information field of one bit corresponding to the each non-specific sub-band group that the time domain start position of the downlink data channel in L number of downlink TTIs in corresponding non-specific sub-band group is determined as a first time unit in a downlink control region occupying X number of time units in the time domain, in L number of downlink TTIs in the corresponding non-specific sub-band group, or the time domain start position of the downlink data channel in L number of downlink TTIs in the corresponding non-specific sub-band group is determined as a first resource element after the downlink control region occupying X number of time units in the time domain, in L number of downlink TTIs in the corresponding non-specific sub-band group.

5. The method according to claim 4, wherein determining, by the UE, the time domain start position of the downlink data channel in L number of downlink TTIs based upon the indication signaling comprises:

determining, by the UE, respectively based upon the indication signaling that the time domain start position of the downlink data channel in L number of downlink TTIs in each sub-band group is a specified time unit, wherein each sub-band group comprises at least one sub-band, a time unit comprises Y number of OFDM symbols, and Y is an integer more than or equal to 1.

6. The method according to claim 5, wherein determining, by the UE, respectively based upon the indication signaling that the time domain start position of the downlink data channel in L number of downlink TTIs in each sub-band group is the specified time unit comprises:

determining, by the UE, respectively based upon each information field of N3 bits among an information field of Q1*N3 bits carried in the indication signaling that the time domain start position of the downlink data channel in L number of downlink TTIs in a corresponding sub-band group is a X-th time unit, wherein the indication signaling is DCI carrying the information field of Q1*N3 bits, Q1 is a number of sub-band groups, Q1 and N3 are integers more than or equal to 1, and X is an integer more than or equal to 1; or determining, by the UE, respectively based upon a flag bit corresponding to each information bit among an information field of Q3 bits carried in the indication signaling that the time domain start position of the downlink data channel in L number of downlink TTIs in a corresponding sub-band group is a first time unit or a Z1-th time unit, wherein the indication signaling is DCI carrying the information field of Q3 bits, Q3 is a number of sub-band groups, Q3 is an integer more than or equal to 1, Z1 is a preset value, a value signaled in RRC signaling, or a value signaled in broadcast signaling, and Z1 is an integer more than or equal to 2.

7. A base station, comprising:

a processor, a transceiver, and a memory, wherein:

the processor is configured to read and execute program in the memory: to generate indication signaling when resources occupied by a downlink control channel is variable in a time domain, and transmit the indication signaling to a UE through the transceiver, wherein the indication signaling is used by the UE to determine the time domain start position of the downlink data channel in L number of downlink TTIs; wherein the indication signaling indicates that a time domain start position of a downlink data channel in L number of downlink Transmission Time Intervals (TTIs), and L is an integer more than or equal to 1;

the transceiver is configured to receive and transmit data under the control of the processor;

wherein the indication signaling indicates the time domain start position of the downlink data channel in L number of downlink TTIs as follows:

the indication signaling is DCI carrying an information field in which every one bit is for each sub-band group, wherein each sub-band group comprises at least one sub-band; and for each specific sub-band group on which the DCI is transmitted, an information field of one bit corresponding respectively to the each specific sub-band group indicates that the time domain start position of the downlink data channel in L number of downlink TTIs in the corresponding specific sub-band group is determined from the resource elements other than resource elements occupied for transmitting the DCI, in a downlink control region occupying X number of time units in the time domain, in the corresponding specific sub-band group, or the time domain start position of the downlink data channel in L number of downlink TTIs in the corresponding specific sub-band group is determined as a first resource element after a downlink control region occupying X number of time units in the time domain, in L number of downlink TTIs in the corresponding specific sub-band group, wherein X is an integer more than or equal to 1, a time unit comprises Y number of OFDM symbols, and Y is an integer more than or equal to 1; and for each non-specific sub-band group on which the DCI is not transmitted, an information field of one bit corresponding respectively to the each non-specific sub-band group indicates that the time domain start position of the downlink data channel in L number of downlink TTIs in the corresponding non-specific sub-band group is determined as a first time unit in a downlink control region occupying X number of time units in the time domain, in L number of downlink TTIs in the corresponding non-specific sub-band group, or the time domain start position of the downlink data channel in L number of downlink TTIs in the corresponding non-specific sub-band group is determined as a first resource element after the downlink control region occupying X number of time units in the time domain, in L number of downlink TTIs in the corresponding non-specific sub-band group.

8. A UE, comprising:

a processor, a transceiver, and a memory, wherein:

the processor is configured to read and execute program in the memory: to receive indication signaling transmitted by a base station when resources occupied by a downlink control channel is variable in a time domain, and to determine a time domain start position of a downlink data channel in L number of downlink Transmission Time Intervals (TTIs) based upon the indication signaling, wherein L is an integer more than or equal to 1; and the transceiver is configured to receive and transmit data under the control of the processor;

wherein the processor is configured to determine the time domain start position of the downlink data channel in L number of downlink TTIs based upon the indication signaling as follows:

when the indication signaling is DCI, to obtain an information field in which every one bit is for each sub-band group, from the DCI, wherein each sub-band group comprises at least one sub-band;

for each specific sub-band group on which the DCI is transmitted, to determine respectively based upon an information field of one bit corresponding to the each specific sub-band group that the time domain start position of the downlink data channel in L number of downlink TTIs in the corresponding specific sub-band group is determined from the resource elements other than resource elements occupied for transmitting the DCI, in a downlink control region occupying X number of time units in the time domain, in the corresponding specific sub-band group, or the time domain start position of the downlink data channel in L number of downlink TTIs in the corresponding specific sub-band group is determined as the first resource element after a downlink control region occupying X number of time units in the time domain, in L number of downlink TTIs in the corresponding specific sub-band group, wherein X is an integer more than or equal to 1, a time unit comprises Y number of OFDM symbols, and Y is an integer more than or equal to 1; and for each non-specific sub-band group on which the DCI is not transmitted, to determine respectively based upon an information field of one bit corresponding to the each non-specific sub-band group that the time domain start position of the downlink data channel in L number of downlink TTIs in the corresponding non-specific sub-band group is determined as first time unit in a downlink control region occupying X number of time units in the time domain, in L number of downlink TTIs in the corresponding non-specific sub-band group, or the time domain start position of the downlink data channel in L number of downlink TTIs in the corresponding non-specific sub-band group is determined as first resource element after the downlink control region occupying X number of time units in the time domain, in L number of downlink TTIs in the corresponding non-specific sub-band group.

* * * * *